United States Patent
Uehara

(10) Patent No.: US 8,149,359 B2
(45) Date of Patent: Apr. 3, 2012

(54) DISPLAY PANEL, DISPLAY DEVICE, AND TERMINAL DEVICE

(75) Inventor: Shinichi Uehara, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 0 days.

(21) Appl. No.: 13/185,024

(22) Filed: Jul. 18, 2011

(65) Prior Publication Data

US 2011/0273769 A1    Nov. 10, 2011

Related U.S. Application Data

(63) Continuation of application No. 11/939,657, filed on Nov. 14, 2007, now Pat. No. 7,995,166.

(30) Foreign Application Priority Data

May 7, 2007   (JP) .................................. 2007-122831
Oct. 17, 2007  (JP) .................................. 2007-270252

(51) Int. Cl.
*G02F 1/1335*    (2006.01)

(52) U.S. Cl. ............................. 349/113; 349/95; 349/15

(58) Field of Classification Search ...................... 349/95
See application file for complete search history.

(56) References Cited

U.S. PATENT DOCUMENTS

| 5,833,507 | A | * | 11/1998 | Woodgate et al. | ............... 445/24 |
| 6,980,176 | B2 | * | 12/2005 | Matsumoto et al. | ............... 345/6 |
| 7,965,365 | B2 | * | 6/2011 | Uehara et al. | ................. 349/146 |
| 2004/0169831 | A1 | | 9/2004 | Uehara et al. | |

FOREIGN PATENT DOCUMENTS

| JP | 06-332354 | 12/1994 |
| JP | 2004-280079 | 10/2004 |

* cited by examiner

*Primary Examiner* — Wen-Ying P Chen
(74) *Attorney, Agent, or Firm* — Young & Thompson

(57) ABSTRACT

A display panel, a display device, and a terminal device, which can achieve a high image quality by decreasing deterioration of the image quality that may be caused due to combining a reflection plate including an uneven structure with an image distributing device, are provided. The display panel includes a lenticular lens for distributing light emitted from each of pixels towards different directions from each other along an arranging direction (a first direction) of a pixel for displaying an image for a first viewpoint and a pixel for displaying an image for a second viewpoint within a pixel unit, wherein a reflection plate including an uneven structure is formed in each of the pixels, and a layout pattern of the uneven structure on the reflection plate is different to the lenticular lens.

22 Claims, 50 Drawing Sheets

DISPLAY PANEL, DISPLAY DEVICE, AND TERMINAL DEVICE

CROSS-REFERENCE TO RELATED APPLICATIONS

This application is based upon and claims the benefit of priority from Japanese patent application No. 2007-122831, filed on May 7, 2007, and Japanese patent application No. 2007-270252, filed on Oct. 17, 2007, the disclosure of which is incorporated herein in its entirety by reference.

BACKGROUND OF THE INVENTION

1. Field of the Invention

The present invention relates to a display panel, a display device, and a terminal device, which are provided with an optical device for distributing images and are capable of displaying images towards each of a plurality of viewpoints. More specifically, the present invention relates to a display panel, a display device, and a terminal device, which can provide an excellent display quality particularly with reflective display, and can be applied preferably to high-definition and transflective types.

2. Description of the Related Art

Due to the technical developments in these days, display panels are used in various places by being loaded on various kinds of devices from large-scaled terminal devices such as monitors and TV receiver sets, medium-scaled devices such as notebook personal computers, cash dispensers, vending machines, to small-scaled terminal devices such as personal TVs, PDAs (personal digital assistances: personal information terminals), portable telephones, and portable game machines.

Particularly, a liquid crystal display device using a liquid crystal has advantages of being thin, light, small, low power consumption, and the like, so that it is loaded on many kinds of such terminal devices.

With a current display device, the same content as that of a front direction can be visually recognized even if it is observed from other directions than the front direction. In the meantime, there has been investigated a display device that is capable of visually recognizing different images depending on the directions from which the display device is viewed, and it is expected to be a display device of next generation. An example of such display device, i.e. a device that is capable of displaying different images towards each of viewpoints in a plurality of directions, may be a stereoscopic image display device.

As depicted in Japanese Unexamined Patent Publication 2004-280079 (Patent Document 1), it is necessary as a function of the stereoscopic image display device to present different images for viewpoints on the right and left sides, i.e. to present a parallactic image for both eyes on the right and left sides.

There have been many stereoscopic image displaying methods investigated as the methods for achieving such function in a concrete way. Those methods can be broadly classified into methods that use special eyeglasses and methods that do not use any special glasses. Among those, the method using the eyeglasses includes an anaglyph method that utilizes differences in colors, a polarizing eyeglass method using polarization, and the like. This type of methods cannot avoid a trouble of wearing eyeglasses substantially, so that there have actively been investigated the methods using no eyeglasses recently.

The no-eyeglass methods include a lenticular lens method, a parallax barrier method, and the like. As depicted in Japanese Unexamined Patent Publication 2004-280079 (Patent Document 1), the lenticular lens method is a method that uses a lenticular lens as a measure for separating an image for a plurality of viewpoints. In a more strict sense, to separate the image for a plurality of viewpoints means to separate the light of a plurality of pixels to each of different viewpoint directions by the lenticular lens. In the present invention, the former expression may be used to indicate the function of the latter. Regarding the lenticular lens, one of its face is formed with a plane surface, and a plurality of semicylindrical convex parts (cylindrical lenses) extending in one direction are formed on the opposite face in such a manner that the longitudinal direction of the convex parts become in parallel to each other.

In a lenticular lens type stereoscopic image display device, a lenticular lens and a display panel are disposed in this order from the near side towards the far side when viewed from an observer (user) side. The pixels of the display panel are located on a focal plane of the lenticular lens.

Further, in the display panel, pixels for displaying an image for the right eye and pixels for displaying an image for the left eye are arranged alternately. Here, a group of pixels arranged neighboring to each other corresponds to each of the convex part of the lenticular lens. With this, the light from each pixel is distributed by the convex part of the lenticular lens to the directions towards the right and left eyes, so that the right and left eyes can recognize different images from each other. As a result, the observer can recognize a stereoscopic image.

Meanwhile, the parallax barrier method is a method that uses, as an image separating device, a barrier (light shielding plate) with a large number of thin stripe openings (i.e. slits) formed thereon. Groups of pixels for displaying an image for the left eye and pixels for displaying an image for the right eye are arranged by being corresponded to the slits of the parallax barrier. As a result, the right eye of the observer (user) cannot visually recognize the pixels for displaying the image for the left eye because those pixels are blocked by the barrier. Thus, the right eye visually recognizes only the pixels for displaying the image for the right eye. Similarly, the left eye of the user cannot visually recognize the pixels for displaying the image for the right eye, and visually recognizes only the pixels for displaying the image for the left eye. As a result, the user can recognize a stereoscopic image when a parallactic image is displayed.

When the above-described parallax barrier method is devised for the first time, the parallax barrier is disposed between the pixels and the eyes, which becomes an offense to the eyes, thereby lowering the visibility. However, it becomes possible to arrange the parallax barrier on the backside of the display panel in accordance with the materialization of the recent liquid crystal display devices. Thus, the visibility has been improved.

Therefore, the parallax barrier type stereoscopic image display device is currently being investigated actively. However, the lenticular lens method is a method for changing the traveling directions of the light, while the parallax barrier method is a method for "shielding" the unnecessary light rays. Thus, the lenticular lens method has such an advantage that there is no deterioration in the brightness of the display screen generated theoretically. Therefore, the lenticular lens method is being investigated to be applied to portable apparatuses where high luminance display and low power consumption performance are considered important in particular.

Further, as another example of the device that is capable of displaying different images to each of a plurality of viewpoints, there has been developed a plural-image simultaneous-display device capable of simultaneously displaying a plurality of different images at a plurality of different viewpoints (see Japanese Unexamined Patent Publication H6-332354 (Patent Document 2), for example. This is a display that displays different images for each of the observing directions simultaneously under a same condition by utilizing the image distributing function of the lenticular lens.

This enables a single plural-image simultaneous-display device to simultaneously provide images different from each other for a plurality of users that are located in different directions different from each other with respect to the display device.

Patent Document 2 describes that the use of the plural-image simultaneous-display device allows reductions in the setting space and the cost for electricity, compared to a case where regular single-image display devices are prepared for the number of images that are to be displayed simultaneously.

As described, the display devices where an optical device for distributing the images such as the lenticular lens, the parallax barrier, or the like is provided are being investigated actively for displaying different images from each other towards different viewpoints. However, the inventors of the present invention has found and pointed out that there are various problems to be generated by just simply providing the optical device.

As a way of example, in a case of using a transflective display panel or a reflective display panel where a reflection plate with uneven structures, in other words, structures having rough surface is provided to the pixels as depicted in Patent Document 1, there may be generated an area where the display luminance is decreased partially depending on the observing positions. If the observing position is changed, display may be viewed as if it is turned dark at the areas where the luminance is deteriorated. In some cases, patterns of Fraunhofer lines may be observed by being superimposed on the image.

This change in the luminance of the display causes a problem that the observed display quality is deteriorated. The reason for causing this problem is that the reflection angle changes depending on the tilt angle of an oblique surface that forms the uneven structure, when external light converged by the lenticular lens is reflected by the uneven structure formed on the reflection plate.

Patent Document 1 therefore proposes: a method for disposing the reflection plate and the lens in such a manner that the focal distance of the lenticular lens becomes different from the distance between the reflection plate and the lens; a method for setting the oblique surface of the uneven structure so that the uneven structure reflects, for a plurality of times, the light converged by the lenticular lens; and a method for setting the uneven structure so that the probability of having an oblique surface with a certain tilt angle existing in the uneven structure within the pixels becomes uniform in the arranged direction of the cylindrical lenses.

The above-described methods for solving the problem include the image distributing device, and those methods can be preferably applied to the display panel using the reflection plate with the uneven structure. However, those methods also have the following issues to overcome.

That is, with the method for disposing the reflection plate and the lens in such a manner that the focal distance of the lenticular lens becomes different from the distance between the reflection plate and the lens, the condition of the lenticular lens serving as the image distributing device becomes different from the optimum condition for distributing images, which brings a problem of deteriorating the effect of image distribution. This problem becomes a big issue for achieving high definition for which the pixel pitch needs to be set small even though the pitch of the uneven structure is wide.

Further, with the method for setting the oblique surface of the uneven structure in such a manner that the uneven structure reflects, for a plurality of times, the light converged by the lenticular lens, the angle of the oblique surface that forms the uneven structure needs to be set as optimum. Thus, it is necessary to develop and employ a process suited for the optimization.

Furthermore, with the method for setting the uneven structure so that the probability of having an oblique surface with a certain tilt angle existing in the uneven structure within the pixels becomes uniform in the arranged direction of the cylindrical lenses, it is necessary to optimize the uneven structure for reducing influences of the unevenness in each pixel. It is hard to apply this method to a case for achieving high definition where the pixel pitch needs to be set small even though the pitch of the uneven structure is wide, and to a case where the method is to be applied to a transflective display panel in which it is relatively difficult to secure the area of the reflection plate in each pixel, since margins for optimization of the uneven structure becomes narrowed in those cases.

These problems tend to be eased by micronizing the uneven structure. However, the uneven structure is normally fabricated by using photolithography. Therefore, it becomes necessary to improve the performances of an exposing device and photoresist for achieving micronization, and to develop an exclusive process as well. Thus, it is not easy to achieve the micronization.

SUMMARY OF THE INVENTION

The present invention has been designed to overcome the foregoing problems, and it relates to a display panel, a display device, and a terminal device including an optical device for image distribution, which are capable of performing reflective display of an image towards each of a plurality of viewpoints. It is an exemplary object of the present invention to provide a display panel, a display device, and a terminal device, which, in addition to having an excellent display quality in the reflective display, can be applied to transflective types and can be easily made into having high definition even with a conventional unevenness manufacturing technique without spoiling the performance of the optical device for image distribution in particular.

The display panel according to an exemplary aspect of the invention includes: a plurality of pixel units arranged in matrix, each containing at least a pixel for displaying an image for a first viewpoint and a pixel for displaying an image for a second viewpoint; and an image distributing device, in other words, an image splitter for distributing light emitted from each of the pixels towards different directions from each other along an arranging direction (a first direction) of the pixel for displaying the image for the first viewpoint and the pixel for displaying the image for the second viewpoint within the pixel unit, wherein a reflection plate with an uneven structure is formed in each of the pixels, and a plurality of pixels that display images for a same viewpoint include a pixel having a different layout pattern of the uneven structure on the reflection plate.

The present invention includes the pixels having different layout patterns of the uneven structures on the reflection plates with respect to the image distributing device. Thus, as an exemplary advantage according to the invention, by using the pixels that are different from each other, it is possible to compensate deterioration of the image quality caused due to combining the image distributing device and the uneven structure of the reflection plate. As a result, it becomes possible to suppress such a phenomenon that the luminance of display is partially deteriorated depending on the observing positions. Therefore, a high image quality can be achieved, thereby providing an excellent display quality in reflective display.

As another exemplary advantage according to the invention, when the image distributing device is a cylindrical lens, for example, the focal distance of the image distributing device can be set as the distance between the vertex of the lens and the pixel for displaying the image for the first viewpoint and the pixel for displaying the image for the second viewpoint. As a result, it is possible to set the optimum condition with which the distributing performance of the image distributing device can be exhibited to the maximum, and there is no adverse effect imposed upon the image distribution effect.

As still another exemplary advantage according to the invention, the present invention can prevent deterioration of the image quality and achieve a high image quality by changing the layout patterns of the uneven structures in each pixel, so that no special micronization is required for the uneven structure itself. As a result, a related uneven structure manufacturing technique can be employed.

As further exemplary advantage according to the invention, even in a case of high-definition pixels, the layout patterns in each pixel may be changed in the same manner to compensate the deterioration with each other so as to achieve a high image quality. Therefore, it is easy to deal with the realization of high definition.

EXEMPLARY EMBODIMENTS

Hereinafter, a display panel, a display device, and a terminal device according to an exemplary embodiment of the present invention will be described in a specific manner by referring to FIG. 1-FIG. 4.

Figure 1:
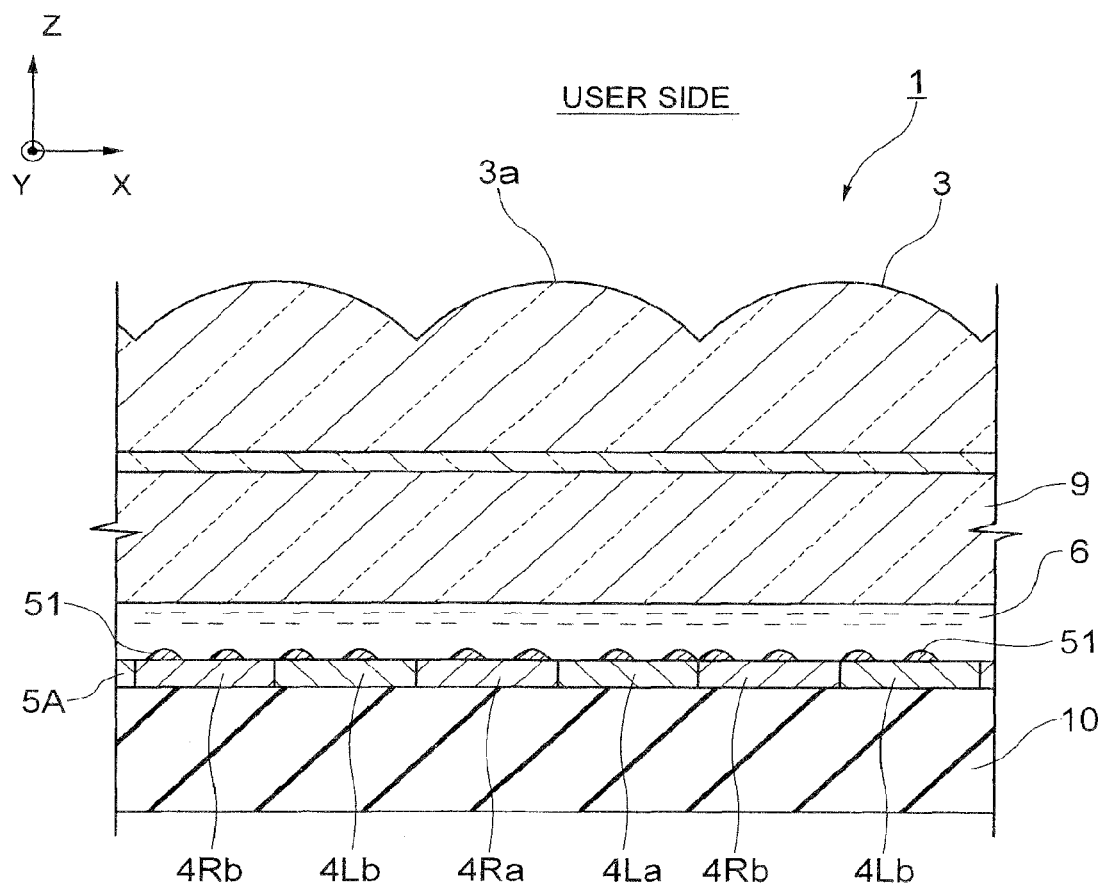
FIG. 1 is a sectional view showing a display panel according to a first exemplary embodiment of the present invention.
Figure 2:
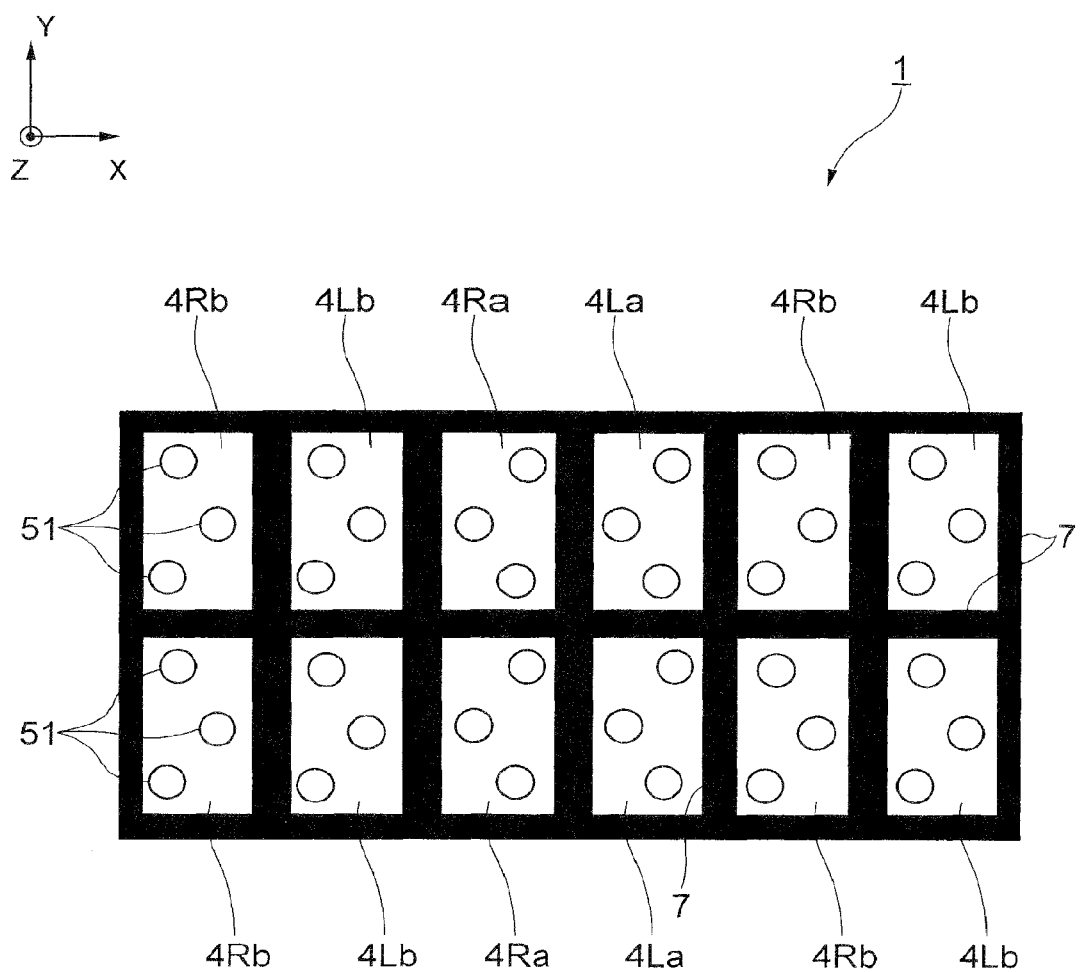
FIG. 2 is a top plan view showing pixels of the display panel shown in FIG. 1.
Figure 3:
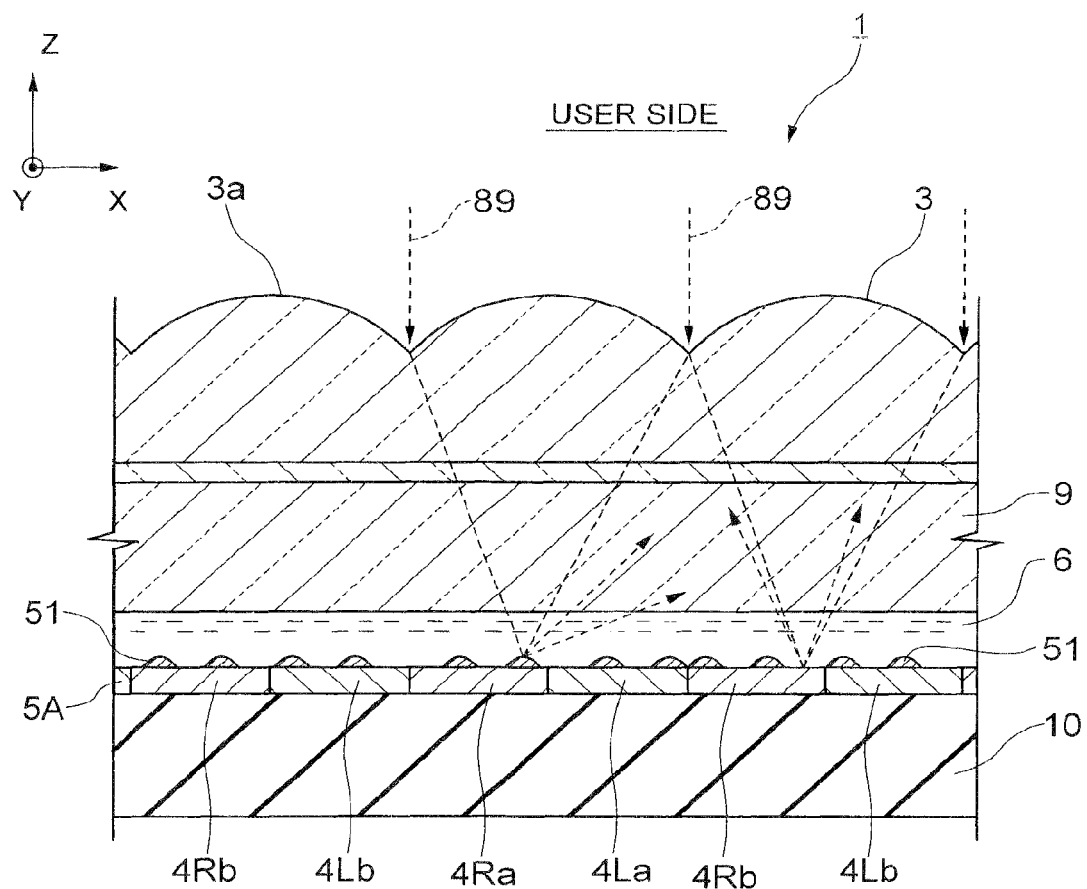
FIG. 3 is an illustration of an optical model of the display panel according to the first exemplary embodiment, which is taken along a segment that is in parallel to the X-axis.
Figure 4:
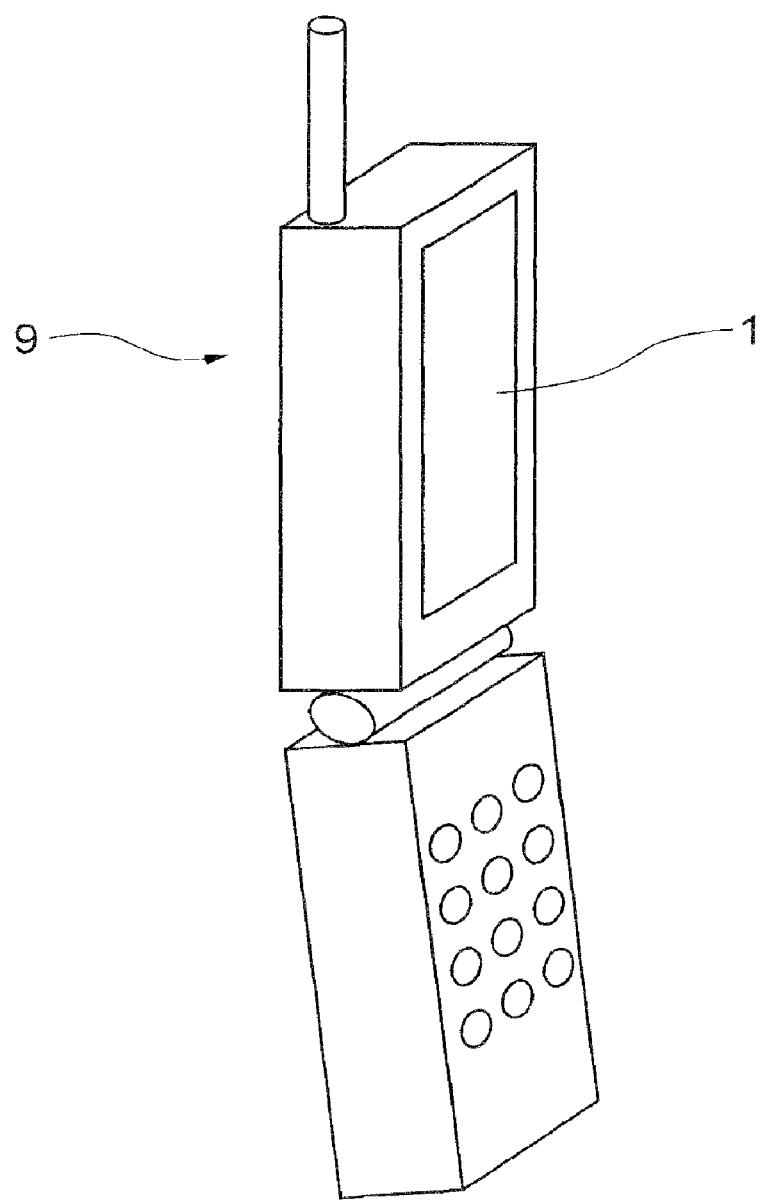
FIG. 4 is a perspective view showing a terminal device according to the first exemplary embodiment.

First, a display panel, a display device, and a terminal device according to a first exemplary embodiment of the present invention will be described. FIG. 1 is a sectional view showing a display panel 1 according to the first exemplary embodiment, FIG. 2 is a top plan view showing pixels of the display panel 1 shown in FIG. 1, FIG. 3 is a sectional view showing actions of the display panel 1, and FIG. 4 is a perspective view showing the terminal device that uses the display panel 1 according to this exemplary embodiment.

As shown in FIG. 1, the display panel according to the first exemplary embodiment is a reflective display panel 1 that includes a lenticular lens 3 as an image distributing device for distributing the light emitted from the pixels of the display panel to directions different from each other.

The lenticular lens 3 is disposed on the display face side of the display panel 1, i.e. on a user side. FIG. 1 schematically shows a section taken at the center part of the screen of the display panel 1.

The display panel 1 is a liquid crystal display panel using a liquid crystal as an electrooptic device for converting electric signals to be displayed. It is a display panel for displaying stereoscopic images, in which pixel pairs (pixel units) each formed with a pixel for the left eye and a pixel for the right eye are provided in matrix.

Further, in order to achieve reflective display, a reflection plate 5A including convex structures 51 is formed in each pixel. The surface of the reflection plate 5A functions as a diffuse reflection surface because of the convex structures 51.

That is, external light that makes incident on the reflection plate 5A from a specific direction is diffusedly reflected by the convex structures 51 on the surface of the reflection plate 5A towards various directions including a direction of an observer (user). This makes it possible to use the display panel by avoiding glare of a light source pattern formed on the surface and the like of the display panel, thereby achieving a bright reflective display.

Furthermore, when the light source such as the external light emits diffused light, the use of the convex structures 51 can increase components of the light reflected towards the front direction compared to a case of using simple mirror reflection. Therefore, a bright reflective display can be achieved.

The lenticular lens 3 is an optical device for image separation being provided for separating the light from the pixels on the right and left sides, and it is a lens array where a large number of cylindrical lenses 3a are arranged one dimensionally. The light can be distributed in directions different from each other through separating the light with the cylindrical lenses 3a. With this, the lenticular lens 3 can function as the image distributing device.

The cylindrical lens 3a has a semicylindrical convex part, and it is a one-dimensional lens having a lens effect only in the direction orthogonal to its longitudinal direction. The direction towards which the cylindrical lenses 3a extend, i.e. the longitudinal direction, is a direction that is orthogonal to the arranged direction of the cylindrical lenses 3a on the display face.

The cylindrical lenses 3a are arranged by being corresponded to each pixel unit that includes a pair of left and right pixels. In this exemplary embodiment, the pixel unit corresponding to the center of the screen is specifically referred to as a left-eye pixel 4La and a right-eye pixel 4Ra.

The pixel unit including the left-eye pixel and the right-eye pixel is repeatedly arranged in the arranged direction of the cylindrical lenses 3a. The left-eye pixel and the right-eye pixel of a pixel unit adjacent to the pixel unit that includes the left-eye pixel 4La and the right-eye pixel 4Ra in the arranged direction are referred to as 4Lb and 4Rb, respectively.

With this, the pixel units which are placed on the right and left sides of the pixel unit including the left-eye pixel 4La and the right-eye pixel 4Ra are both configured with the left-eye pixel 4Lb and the right-eye pixel 4Rb.

Considering it from the pixel unit including the left-eye pixel 4Lb and the right-eye pixel 4Rb, the pixel units each including the left-eye pixel 4La and the right-eye pixel 4Ra are arranged on both sides thereof.

As shown in FIG. 2, the pixel unit including the left-eye pixel 4La and the right-eye pixel 4Ra is repeatedly arranged in the longitudinal direction of the cylindrical lens 3a to form lines of the left-eye pixels 4La and right-eye pixels 4Ra. Similarly, regarding the pixel unit including the left-eye pixel 4Lb and the right-eye pixel 4Rb, the pixel unit thereof is repeatedly arranged in the longitudinal direction to form lines of the left-eye pixels 4Lb and right-eye pixels 4Rb.

A focal distance of the cylindrical lens 3 is set as a distance between the principal point of the cylindrical lens 3, i.e. the vertex of the lens, and a pixel plane. The pixel plane is a plane where the pixels such as the left-eye pixels 4La and the right-eye pixels 4Ra are arranged. Further, in the exemplary embodiment of the present invention, the distance between the principal point of the lens and the pixel plane is defined as a lens-pixel distance. By setting the focal distance of the cylindrical lens 3a to be equal to the lens-pixel distance, it becomes possible to exhibit the greatest possible effect of the lenticular lens 3 as the image distributing device.

In this Application, XYZ Cartesian coordinates are set in a following manner for convenience. That is, in the direction towards which the left-eye pixel 4La and the right-eye pixel 4Ra are repeatedly arranged, a direction from the right-eye pixel 4Ra towards the left-eye pixel 4La is defined as +X direction, and the opposite direction as –X direction. Further, +X direction and –X direction are generally termed as X-axis direction that is a first direction, and the X-axis direction is considered the image distributing direction of the image distributing device.

Further, the longitudinal direction (direction orthogonal to the face of the paper in FIG. 1) of the cylindrical lens 3a is defined as Y-axis direction that is a second direction. The Y-axis direction is a direction orthogonal to the image distributing direction.

Furthermore, a direction orthogonal to both the X-axis direction and the Y-axis direction is defined as Z-axis direction. Regarding the Z-axis direction, a direction from the left-eye pixel 4La or the right-eye pixel 4Ra towards the lenticular lens 3 is defined as +Z direction, and the opposite direction thereof is defined as −Z direction. The +Z direction is the front direction, i.e. the direction towards the user. The +Y direction is a direction where the right-hand coordinate system applies. That is, under a state where a right hand of a person is held with the back of the hand facing downwards, the middle finger comes in a state raised towards the +Z direction when the thumb is pointing in the +X direction and the forefinger is pointing the +Y direction.

When the XYZ Cartesian coordinates are set in the manner as described above, the arranged direction of the cylindrical lenses 3a becomes the X-axis direction, and the left-eye pixels 4La and the right-eye pixels 4Ra are repeatedly arranged in lines, respectively, in the Y-axis direction.

Similarly, the left-eye pixels 4Lb and the right-eye pixels 4Rb are repeatedly arranged in lines, respectively, in the Y-axis direction. Further, arranged cycle of the pixel pairs in the X-axis directions is set to be substantially equal to the arranged cycle of the cylindrical lenses 3a. A line that is formed in the Y-axis direction with pairs of pixels arranged in the X-axis direction corresponds to a single cylindrical lens 3a.

As shown in FIG. 1 and FIG. 2, the left-eye pixel 4La and the right-eye pixel 4Ra have different positional relations with respect to the corresponding cylindrical lens 3a, so that the pixels work as the left-eye pixel and the right-eye pixel, respectively. The convex structures 51 on the reflection plates 5A are arranged in a same pattern in both of the pixels 4La and 4Ra.

Further, regarding the left-eye pixel 4Lb and the right-eye pixel 4Rb, the convex structures 51 on the reflection plates 5A are also arranged in a same pattern in both of the pixels 4Lb and 4RB. However, the convex structures 51 of the left-eye pixel 4Lb and the right-eye pixel 4Rb are formed in a different pattern from that of the convex structures 51 of the left-eye pixel 4La and the right-eye pixel 4Ra. Looking into the layout pattern of the convex structure 51 in each pixel in particular, the convex structures 51 of the left-eye pixel 4Lb and the right-eye pixel 4Rb are formed by being corresponded to a place where the convex structures 51 of the left-eye pixel 4La and the right-eye pixel 4Ra are not formed.

That is, comparing the pixel unit including the left-eye pixel 4La and the right-eye pixel 4Ra with the pixel unit including the left-eye pixel 4Lb and the right-eye pixel 4Rb, it can be seen that the convex structures 51 are arranged to interpolate and compensate with each other.

In the exemplary embodiments of the present invention, the expressions "interpolation" and "compensation" are used hereinafter. These expressions mean that the uneven structure and the oblique surface structure formed thereby are located at different positions in each pixel, when comparing the reflection plates in two kinds of pixels.

Further, looking into boundary lines between each of the neighboring pixels, each of the boundary lines is formed in parallel to the X-axis direction or Y-axis direction.

Furthermore, between each of the pixels such as the left-eye pixel 4La and the right-eye pixel 4Ra and between the left-eye pixel 4La and the left-eye pixel 4La, etc., an optical shielding part 7 also referred to as a black matrix (see FIG. 2; black-painted part) is provided. This optical shielding part 7 is provided for preventing displays of neighboring pixels from being influenced by each other and for securing a space for providing a wiring to transmit display signals to the pixels.

In FIG. 1, reference numeral 6 indicates a liquid crystal, 9 indicates a lens, and 10 indicates a substrate.

Next, actions of the display panel 1 according to the exemplary embodiment that is configured in the aforementioned manner will be described.

FIG. 3 is an illustration showing an optical model at a section of the display panel 1 of FIG. 1 that is cut along a segment in parallel to the X-axis.

As shown in FIG. 3, the display panel 1 of this exemplary embodiment is of a reflective type as described above, so that it utilizes the external light for achieving display.

The actions thereof will therefore be described by looking into light 89 of a certain parallel light component among the external light making incident on the reflective liquid crystal display device. The light 89 making incident on the lenticular lens 3 is converged by the lenticular lens 3. As described above, the focal distance of the lenticular lens 3 is set to form the focal point on the reflection plate 5A.

Looking first into the light making incident on the right-eye pixel 4Ra, the light 89 converged by the lenticular lens 3 forms the focal point on the surface of the reflection plate 5A. When the focal point is at the oblique surface of the convex structure 51, in other words, the slope surface of the convex structure 51, the light is reflected towards an oblique direction by the oblique surface. Thus, the reflected light travels in a direction that is different from the direction of the user, thereby having almost no contribution to the display. That is, it is not visually recognized by the user.

In the meantime, when looking into the light 89 making incident on the right-eye pixel 4Rb, there is no convex structure 51 formed in the right-eye pixel 4Rb at a place that corresponds to the place of the right-eye pixel 4Ra where the convex structure is formed. Therefore, the light 89 converged by the lenticular lens 3 forms the focal point at a part where the oblique surface of the convex structure 51 of the right-eye pixel 4Rb is not formed, i.e. on the surface of the reflection plate 5. Thus, compared to the case where the oblique surface is formed, the reflected light is reflected more to the direction of the user, thereby contributing to the display. That is, the reflected light can be visually recognized by the user.

As described above, under a condition shown in FIG. 3, the right-eye pixel 4Ra is visually recognized as dark by the user, while the right-eye pixel 4Rb is visually recognized as bright.

That is, there is observed a condition where the pixel visually recognized as bright and the pixel visually recognized as dark are arranged alternately in the X-axis direction in which the cylindrical lenses 3a are arranged. Further, the pixels visually recognized as bright are arranged in a normally lined state in the Y-axis direction, and the pixels visually recognized as dark are also arranged in a normally lined sate in the Y-axis direction.

Therefore, when the entire display face is observed in a micro sense, the pixels visually recognized as bright and the pixels visually recognized as dark respectively form a longitudinal line extending in the Y-axis direction, and the lines exist in every single pixel unit in the X-axis direction. Normally, however, the definition and visually recognizable distance with which such micro pattern such as the single pixel unit is not visually recognized are set in the display panel, so that the user cannot observe the micro longitudinal lines separately. That is, the bright lines and the dark lines compensate with each other, so that it is possible to achieve a uniform display with no bright and dark stripes formed therein in a macro sense.

As described above, the convex structures are arranged in each pixel in a distributed manner. Thus, if the Y coordinate in the sectional view of the display panel cut along the segment in parallel to the X-axis is different, the X coordinate of the convex structure becomes also different.

That is, even though the explanations above describe the behaviors of the reflected light at a certain Y coordinate, it is practically necessary to expand the explanations two-dimensionally on an XY plane for comprehension.

With the first exemplary embodiment, the lenticular lens 3 as the image distributing device is a set of one-dimensional lenses that have the image distribution effect only in the X-axis direction, and do not have the image distribution effect in the Y-axis direction. Thus, for the Y-axis direction, it can be considered the same as a display panel that has no image distribution effect. That is, regarding the Y-axis coordinate of the convex structure, the user cannot visually recognize that it is at different coordinate as long as it is within a range of a single pixel at least. Thus, the existing probability of the convex structure becomes an important factor. In other words, the important factor is about what proportion the oblique surfaces of the convex structures exist on a segment, when each pixel is cut along that segment which is in parallel to the Y-axis.

Specifically, when there are many oblique surfaces existed at a certain X-axis coordinate, it is considered that the oblique surfaces are dominant. Thus, it can be considered as an oblique surface in the one-dimensional model described above.

Meanwhile, when there are more plane surfaces at a certain X-axis coordinate, it can be considered as a plane surface. Further, in an intermediate case, e.g. when the oblique surfaces and the plane surfaces exist equally, it can be handled in accordance with the existing probability of the oblique surface or the plane surface.

Next, a terminal device to which the display panel 1 of the first exemplary embodiment is loaded will be described by referring to FIG. 4.

FIG. 4 shows a portable telephone 9 as the aforementioned terminal device. Regarding the relation between the display panel 1 and the portable telephone 9, the X-axis direction of the display panel 1 is a lateral direction of a screen of the portable telephone 9, and the Y-axis direction of the display panel 1 is a longitudinal direction of the screen of the portable telephone 9.

As described above, FIG. 1 is a schematic illustration showing a sectional view taken at the center of the screen of the display panel 1 viewed from −Y direction. The display panel 1 is set in the portable telephone 9 in the manner described above, so that FIG. 1 illustrates a schematic illustration when the sectional view at the center of the screen of the portable telephone 9 is viewed from the main body side where push buttons are loaded, i.e. from the bottom side under a normal use condition.

The display panel 1 of the first exemplary embodiment has the structures and functions such as those described above, so that the following effects can be achieved.

(1) The display panel 1 is a reflective display panel that includes the lenticular lens 3 having the one-dimensional image distribution effect. The reflection plates 5 of the pixels configuring each of the pixel units that are adjacent in the image distributing direction include the convex structures 51 that compensate with each other. Therefore, deterioration of the image quality caused due to combining the lenticular lens 3, the reflection plates 5A, and the convex structures 51 can be suppressed by compensating it with the pixel units neighboring to each other in the image distributing direction. As a result, a high-quality image can be obtained.

(2) With the display panel 1 of the first exemplary embodiment, the optical device is not only capable of achieving high-quality image in the reflective display but also capable of setting the image distributing optical device to be under a condition with which the distributing performance thereof can be exhibited to the maximum. In addition, there is no adverse effect on the image distribution effect.

(3) The layout of the convex structures 51 in each pixel is changed in the display panel 1 of the first exemplary embodiment, however, no special micronization is required for the convex structure 51 itself. Therefore, widely-used manufacturing technique for making the uneven structures can be employed.

(4) Even in the case of high-definition pixels, it is possible with the display panel 1 of the first exemplary embodiment to compensate the influences of the convex structures by changing the layout of the convex structures of each pixel in the same manner as described above. This makes it possible to achieve a high-quality image so that it is easy to deal with the realization of high definition.

(5) In the display panel 1 of the first exemplary embodiment, the pixels configuring each of the pixel units include the reflection plate 5A of the same convex structure. Thus, when the user visually recognize a certain pixel unit, the reflected light from the left-eye pixel 4La and the right-eye pixel 4Ra, etc. of the pixel unit can be made into a same condition. Therefore, a sense of discomfort felt by the user can be eased, thereby making it possible to achieve a high image quality. It is because when the user observes display areas of different brightness with both eyes, there is felt confusion when the eyesight of both eyes comes together. Thus, the user recognizes it as if the display areas are flashing and feels a sense of discomfort.

The display panel of the exemplary embodiment has been described as a display panel including an image distributing device, in which the reflection plates of the pixels that configure the neighboring pixel units in the image distributing direction include the convex structures for compensating with each other. Looking into the image distributing devices such as the lenticular lens and the parallax barrier that is to be described later, the pixels arranged by being corresponded to the optical elements of the image distributing devices, e.g. each of the cylindrical lenses and the slits, have uneven shapes of different patterns in accordance with the relative positional relations with respect to the optical elements of the image distributing devices. More preferably, each of the pixels having the same relative positional relation with respect to each optical element of the image distributing devices has the uneven reflection plate for compensating with each other. Further, each of the pixels emitting light towards the observing position on an observing plane has a reflection plate with a different uneven shape. More preferably, each of the pixels has an uneven reflection plate for compensating with each other.

The first exemplary embodiment is structured in the manner described above and is capable of achieving the above-described functions and effects. However, it is not intended to be limited to the above-described exemplary embodiment. The structures, the functions, and the like may be modified within the sprit and scope of the present invention.

For example, in the explanation of the functions of the first exemplary embodiment, there is studied the light 89 of certain parallel light components among the external light that makes incident on the display panel 1. However, there are many cases such as a case where not only the parallel light but also diffused light makes incident on the display panel, etc., as an environment for using the display panel practically. As evident from the above explanations, however, the point of the present invention becomes prominent when the light close to the parallel light such as the external light or the spotlight makes incident. Thus, the effects of the present invention can especially be exhibited prominently under such condition. Further, the present invention can achieve an extremely high improving effect in the image quality when a lighting device that emits substantially parallel light is provided to the display device.

Further, in the first exemplary embodiment, it has been described that the pixels of the neighboring pixel units in the image distributing direction (X-axis direction) of the image distributing device include the reflection plate 5A with the structures for compensating with each other in each pixel unit. However, the exemplary embodiment of the present invention is not limited only to that. It may be structured to compensate with each other within three or more pixel units.

This is especially effective for a case where it is not possible to compensate with each other only with two kinds of convex patterns of the reflection plates and it is necessary to achieve still higher image quality.

Furthermore, the pixel unit may be formed within a square. To form the unit within a square means that the pitch of the pixel unit in the X-axis direction is the same as the pitch in the Y-axis direction. In other words, in the direction along which the pixel unit is repeatedly arranged, the pitches thereof are all the same.

The reflection plate 5A is described to include the convex structures 51. However, to include the convex structures 51 means that the reflection plate 5A has an uneven shape, and the convex part thereof is referred to as the convex structure 51. Thus, it is evident that the exemplary embodiment of the present invention can be applied in the same manner with the reflection plate 5A including concave structures. Further, the lens surface can be placed on the inner side in that case, so that the lens surface can be protected from having scratches and smudges.

For the lenticular lens 3 of the first exemplary embodiment, it has been described about the structure where the lens surface is placed on the plane in +Z direction that is the direction towards the user side. However, the exemplary embodiment of the present invention is not limited to that. The lens surface may be placed on the plane in the −Z direction that is the direction towards the display panel side. In that case, the lens-pixel distance can be reduced, which is advantageous for achieving the high definition.

Further, it has been described that the lenticular lens 3 is used for the image separating device of the exemplary embodiment. However, the exemplary embodiment of the present invention is not limited only to that. The present invention can also be applied to the parallax barrier method that uses a slit array as the image separating device.

While the lenticular lens 3 has a three-dimensional shape having a structure in the height direction, the above-described parallax barrier has a plane two-dimensional shape. Therefore, the parallax barrier can be fabricated easily by using photolithography, thereby enabling reduction of the cost. As described above, however, there is no light loss caused by the image separating device when the lenticular lens 3 is used. Therefore, the lenticular method is advantageous in regards to achieving the bright reflective display.

Furthermore, even though the portable telephone 9 is used as an example of the terminal device in the first exemplary embodiment, the present invention is not limited to that. The present invention can also be applied to various kinds of portable terminal devices such as PDAs, personal TV sets, game machines, digital cameras, digital video cameras, and notebook personal computers.

Moreover, the present invention can be applied not only to the portable terminal devices but also to various kinds of fixed-type terminal devices such as cash dispensers, vending machines, monitors, and TV receiver sets.

Further, it has been described that a reflective liquid crystal display panel is used as the display panel of the first exemplary embodiment. However, the exemplary embodiment of the present invention is not limited to that. The present invention can also be applied effectively to a display panel that uses a reflection plate with an uneven structure. For example, it can be applied to a case of using a transflective liquid crystal display panel that is capable of not only the reflective display but also the transmissive display.

Examples of such transflective liquid crystal display panel may be a slight reflective liquid crystal display panel having a larger ratio of the transmission area and a slight transmissive liquid crystal display panel having a larger ratio of the reflection area. The exemplary embodiment of the present invention can be applied effectively to the slight reflective liquid crystal display panel in particular, in which the area for the reflective display is smaller than the area for transmissive display. This is because the area of the reflection plate becomes smaller when the area for the reflective display becomes reduced. Thus, the layout of the convex structures becomes restricted by a great extent, so that it is difficult to achieve compensation only with each of the pixels.

Figure 5:
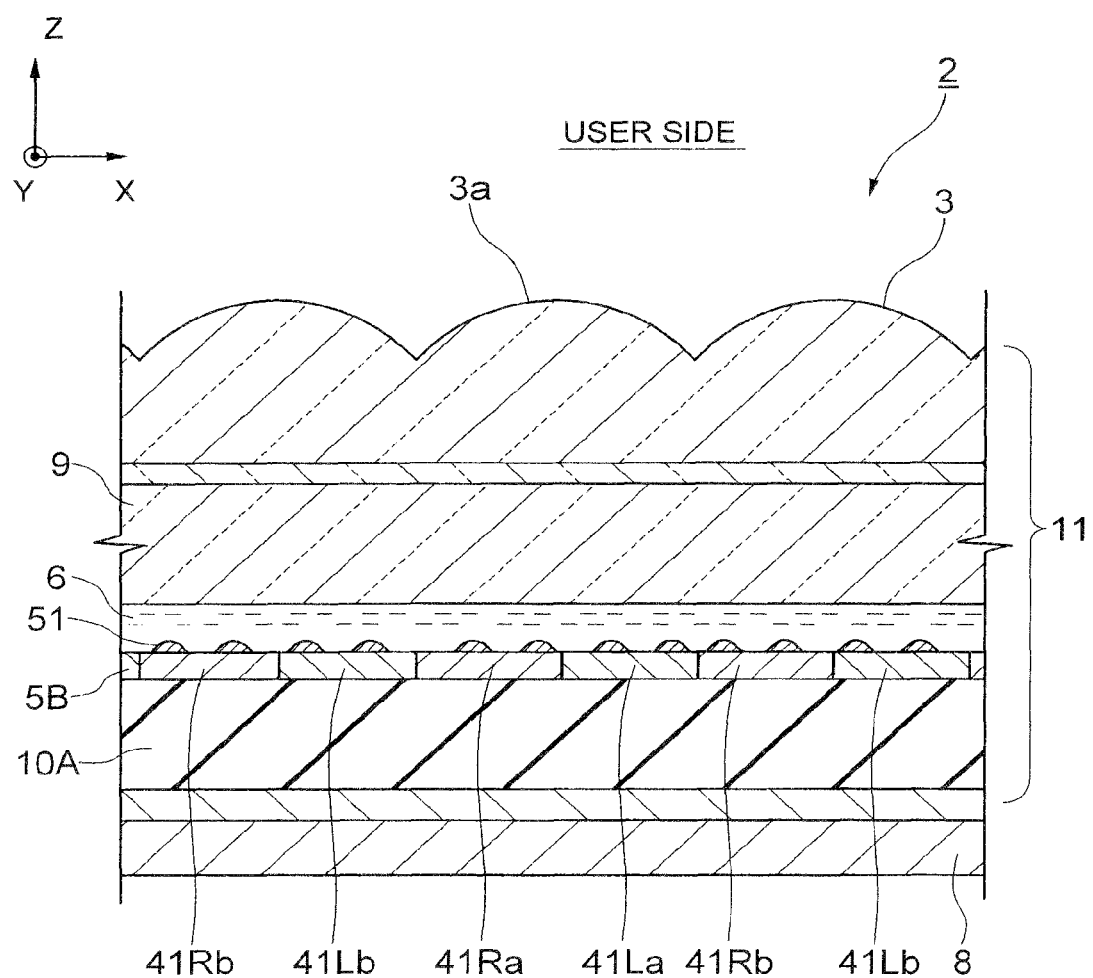
FIG. 5 is a sectional view showing a display device according to a second exemplary embodiment of the present invention.
Figure 6:
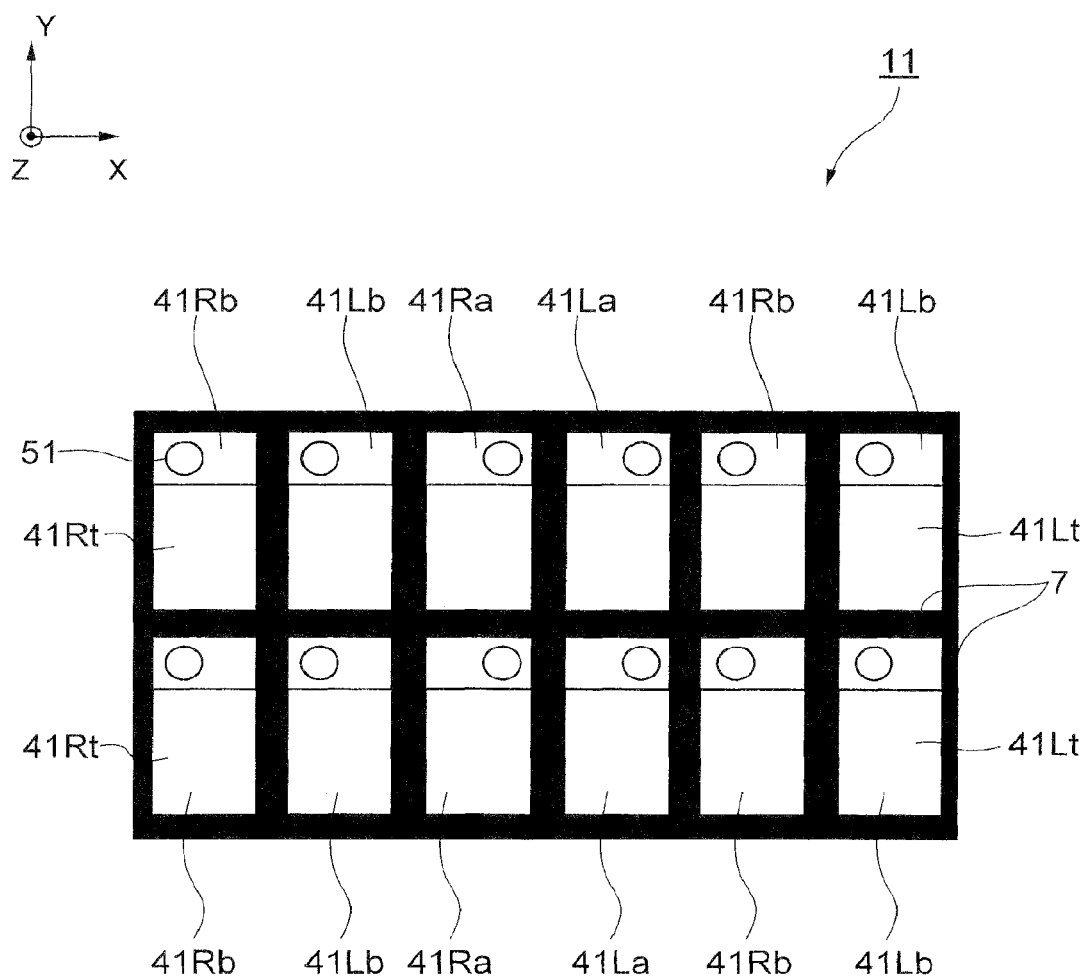
FIG. 6 is a top plan view showing pixels of a display panel that is used in the display device according to the second exemplary embodiment.

Next, a second exemplary embodiment of the present invention will e described by referring to FIG. 5 and FIG. 6.

The same numeral references as those of the first exemplary embodiment are applied to the same structures and members of the second exemplary embodiments as well as third to twelfth exemplary embodiments to be described later, and detailed explanations thereof are omitted or simplified. Further, the actions of the lens are the same as those described in the first exemplary embodiment, so that the explanation thereof will be omitted.

FIG. 5 is a sectional view showing a display device according to the second exemplary embodiment, and FIG. 6 is a top plan view showing pixels of a display panel according to the second exemplary embodiment.

As shown in FIG. 5 and FIG. 6, a display panel 11 of the second exemplary embodiment is a slight reflective liquid crystal display panel.

As shown in FIG. 5, in the display device 2 of the second exemplary embodiment, a backlight unit 8 is disposed on the back face side of the display panel 11, i.e. on the −Z side. The display panel 11 is a slight reflective liquid crystal display panel 11 with a larger display area for transmissive display than a reflection plate, as described above. The backlight unit 8 is a plane-type light source that emits the light for the transmissive display. In FIG. 5, numeral reference 10A indicates a semitransparent substrate, for example.

FIG. 5 shows a section cut at the reflective display area of the slight reflective liquid crystal display panel 11.

Further, the display panel 11 of the second exemplary embodiment has a transmissive display area in each pixel unit, and each of these transmissive display areas is a left-eye pixel transmissive display area 41Lt or a right-eye pixel transmissive display area 41Rt in accordance with the positional relations with respect to the cylindrical lenses 3a that configure the lenticular lens 3.

Regarding the transmissive display area and the reflective display area, the reflective display area occupies about one fourth of each pixel on the +Y direction side, and the transmissive display area occupies the remaining three fourths on the −Y direction side. The convex structures 51 on a reflection plate 5B in the reflective display area are disposed in the same manner as that of the first exemplary embodiment described above.

That is, a left-eye pixel 41La and a right-eye pixel 41Ra are in different positional relations with respect to the corresponding cylindrical lenses 3a, so that each works as the left-eye pixel or the right-eye pixel. The convex structures 51 on the reflection plate 5B are arranged in a same pattern in both pixels.

Similarly, regarding the left-eye pixel 41Lb and the right-eye pixel 41Rb, the convex structures 51 on the reflection plate 5B are arranged in a same pattern in both pixels. However, the convex structures 51 in the left-eye pixel 41La and the right-eye pixel 41Ra are formed in a different pattern from that of the convex structures 51 in the left-eye pixel 41Lb and the right-eye pixel 41Rb. Considering the layout pattern of the convex structures 51 in each pixel in particular, the convex structures 51 of the left-eye pixel 41Lb and the right-eye pixel 41Rb are formed by being corresponded to places where the convex structures 51 of the left-eye pixel 41La and the right-eye pixel 41Ra are not formed.

That is, comparing the pixel unit including the left-eye pixel 41La and the right-eye pixel 41Ra with the pixel unit including the left-eye pixel 41Lb and the right-eye pixel 41Rb, it can be seen that the convex structures 51 are arranged to compensate with each other. In the second exemplary embodiment, the transmissive display area occupies most part of the pixels, so that the area of the reflection plate 5B becomes small. As a result, there is only one row of the convex structures 51 arranged in the Y-axis direction.

The display panel 11 of the display device 2 in the second exemplary embodiment has the structures and functions such as those described above, so that the following effects can be achieved.

(6) With the second exemplary embodiment, it is possible to achieve compensation between the neighboring pixel units with the convex structures 51 on the reflection plates 5B. Therefore, deterioration of the image quality caused due to combining the image distributing device and the convex structures 51 of the reflection plates 5B can be suppressed. When the second exemplary embodiment is not applied, it is necessary to micronize the convex structures or to design the layout so as to decrease the image distribution effect of the image distributing device. However, improvements of the process are required for the former case, and the widely-used uneven structure manufacturing technique is not sufficient for that. Further, the image distribution effect is spoiled in the latter case. Particularly, this exemplary embodiment can improve the reflective display and the performance of the transmissive display is not deteriorated.

(7) Further, as described above, since it is possible to achieve compensation between the neighboring pixel units by the convex structures 51, the display panel 11 of the exemplary embodiment is not only capable of exhibiting an excellent image display quality in the reflective display but also capable of easily achieving high definition as well as dealing with the transflective type even with the widely-used uneven structure manufacturing technique without spoiling the performance of the optical device for distributing images in particular.

The display panel 11 of this exemplary embodiment can be applied in the same manner to a reflective display panel other than a liquid crystal display panel. Further, a driving method of the liquid crystal display panel may be an active matrix type such as a TFT (Thin Film Transistor) type and a TFD (Thin Film Diode) type, or a passive matrix type such as an STN (Super Twisted Nematic liquid crystal) type.

Next, a third exemplary embodiment of the present invention will be described by referring to FIG. 7-FIG. 9.

Figure 7:
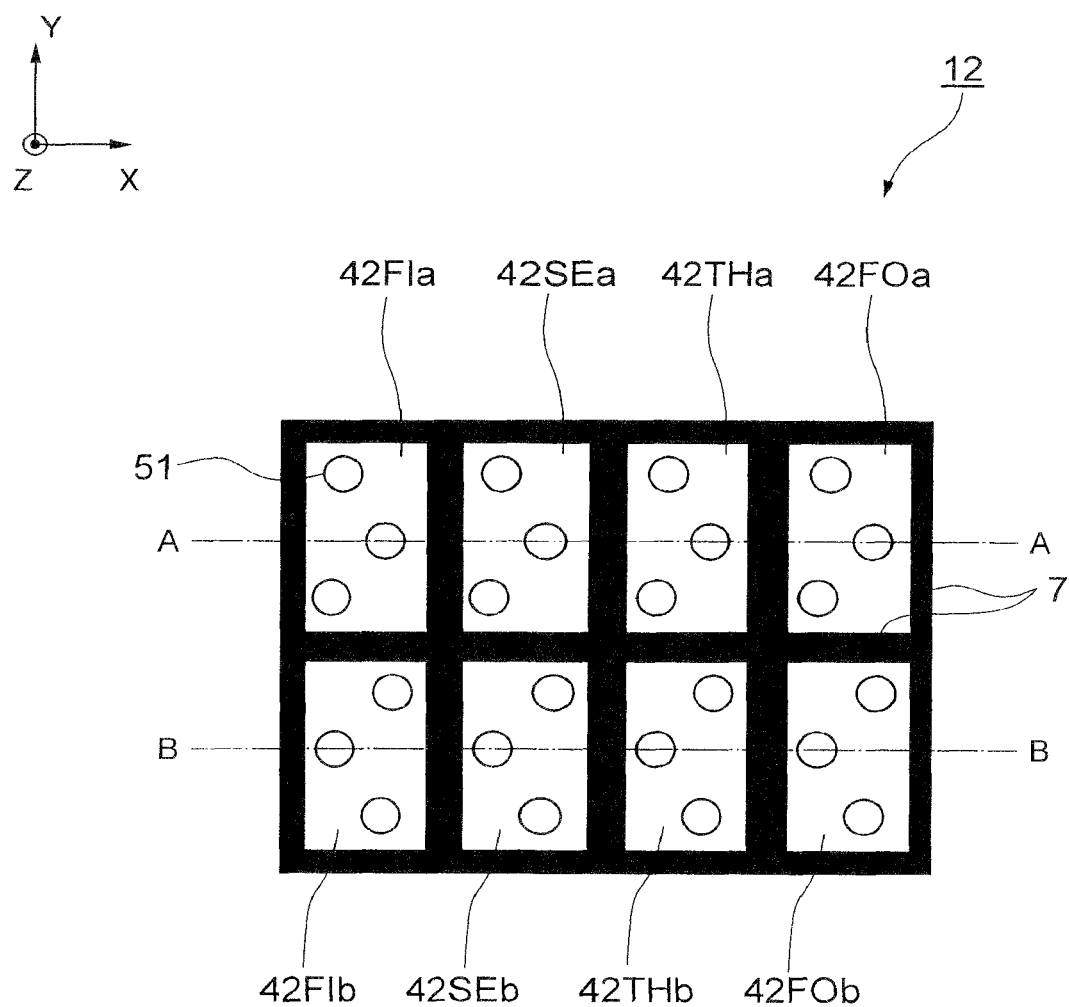
FIG. 7 is a top plan view showing pixels of a display panel according to a third exemplary embodiment of the present invention.
Figure 8:
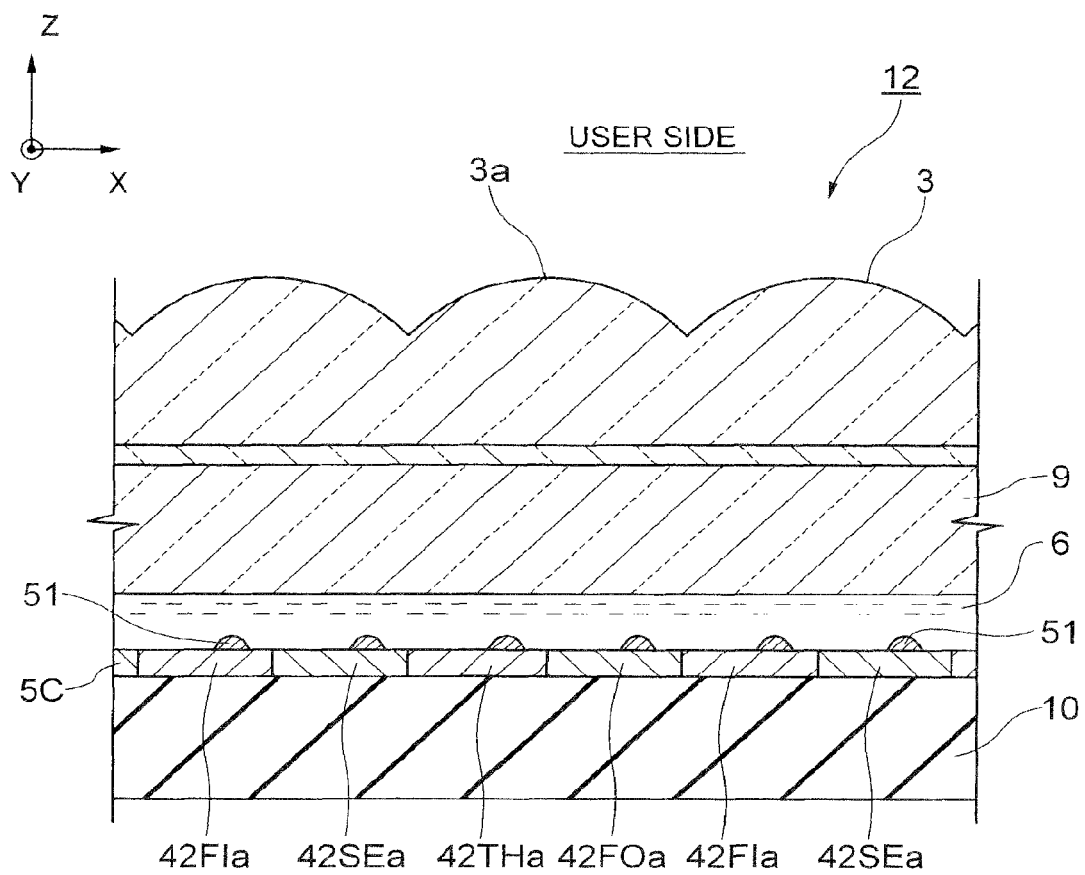
FIG. 8 is a sectional view showing the display panel taken along the line A-A shown in FIG. 7.
Figure 9:
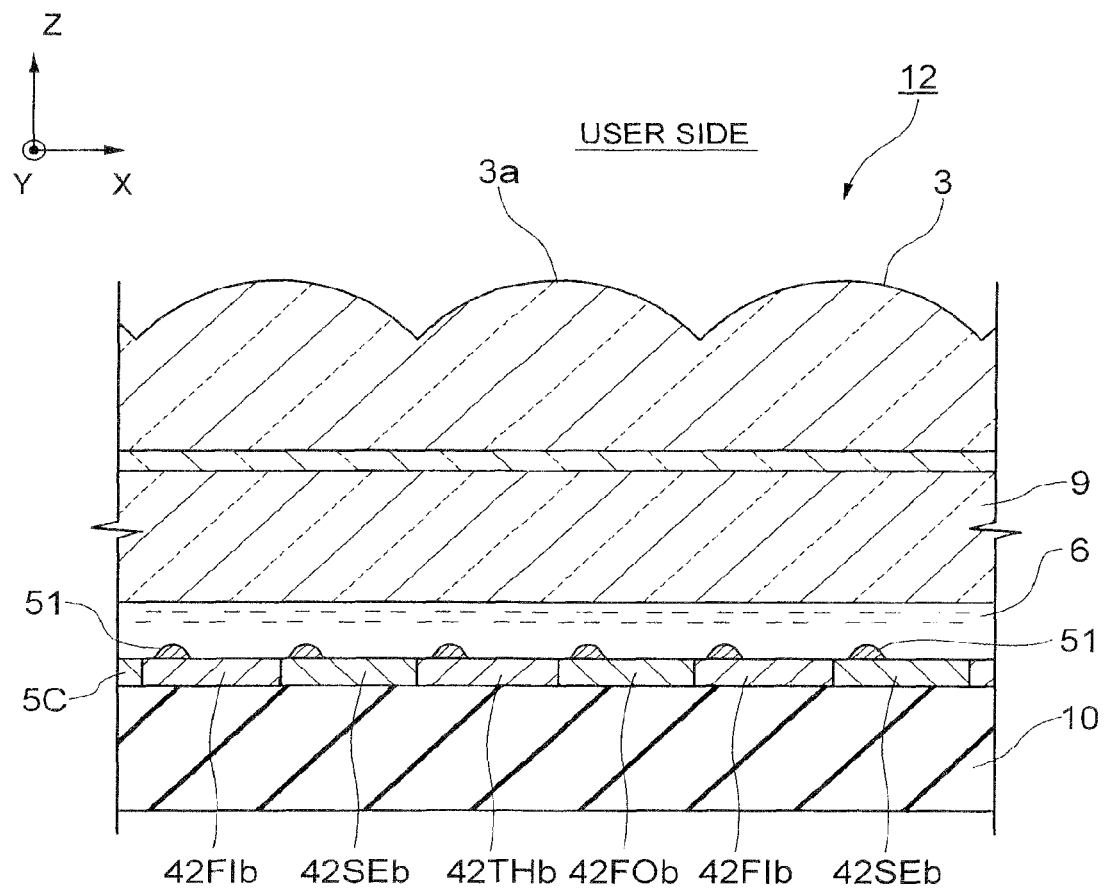
FIG. 9 is a sectional view showing the display panel taken along the line B-B shown in FIG. 7.

FIG. 7 is a top plan view showing pixels of a display panel 12 according to the third exemplary embodiment, FIG. 8 is a sectional view showing the display panel 12 taken along the line A-A shown in FIG. 7, and FIG. 9 is a sectional view showing the display panel 12 taken along the line B-B shown in FIG. 7.

In the first exemplary embodiment described above, the pixel unit includes a left-eye pixel and a right-eye pixel, and the convex structures of the reflection plates are arranged to compensate with each other for the pixel units that are arranged in the image distributing direction.

Meanwhile, in the third exemplary embodiment, the pixel unit includes four pixels, i.e. a first viewpoint pixel, a second viewpoint pixel, a third viewpoint pixel, and a fourth viewpoint pixel.

Further, each of convex structures 51 on reflection plates 5C in the pixel units that are arranged in the image distributing direction (X-axis direction) is arranged in a same pattern. In the meantime, it is a feature of this exemplary embodiment that the reflection plates 5C of the pixel units that are arranged in a direction (Y-axis direction) that is orthogonal to the image distributing direction on the display face are arranged in such a manner that the convex structures 51 thereof compensate with each other.

That is, as shown in FIG. 7, in the display panel 12 according to the third exemplary embodiment, each pixel unit including a first viewpoint pixel 42FIa, a second viewpoint pixel 42SEa, a third viewpoint pixel 42THa, and a fourth viewpoint pixel 42FOa is arranged by being corresponded to a cylindrical lenses 3a of a lenticular lens 3.

Each of the pixels 42FIa, 42SEa, 42THa, and 42FOa are arranged towards the X-axis direction to utilize the image distribution effect of the lenticular lens 3. Therefore, the light from each of the pixels 42FIa, 42SEa, 42THa, and 42FOa is emitted towards each viewpoint by the image distribution effect of the lens.

As the pixel units neighboring to each other in the X-axis direction, the pixel unit including the first viewpoint pixel 42FIa, the second viewpoint pixel 42SEa, the third viewpoint pixel 42THa, and the fourth viewpoint pixel 42FOa is repeatedly placed.

Furthermore, as shown in FIG. 7 and FIG. 8, the first viewpoint pixel 42FIa, the second viewpoint pixel 42SEa, the third viewpoint pixel 42THa, and the fourth viewpoint pixel 42FOa include the convex structures 51 on the reflection plates 5C, and the layout patterns thereof in the four pixels are the same.

Meanwhile, as shown in FIG. 7 and FIG. 9, a pixel unit including a first viewpoint pixel 42FIb, a second viewpoint pixel 42SEb, a third viewpoint pixel 42THb, and a fourth viewpoint pixel 42FOb is arranged as the pixel unit that is adjacent in the Y-axis direction to the pixel unit including the first viewpoint pixel 42FIa, the second viewpoint pixel 42SEa, the third viewpoint pixel 42THa, and the fourth viewpoint pixel 42FOa.

The patterns of the convex structures 51 on the reflection plates 5C vary in the two kinds of pixel units lined in the Y-axis direction, which are patterns to compensate with each other. In the Y-axis direction, the two kinds of pixel units are placed repeatedly.

The display panel 12 of the third exemplary embodiment has the structures and functions such as those described above, so that the following effects can be achieved in addition to the effects substantially the same as those described in (1)-(4).

(8) The display panel 12 of the third exemplary embodiment has the four viewpoints, i.e. the first viewpoint pixel 42FIa, the second viewpoint pixel 42SEa, the third viewpoint pixel 42THa, and the fourth viewpoint pixel 42FOa. With this, it becomes possible to achieve different displays for the four viewpoints. Thus, when displaying a stereoscopic image in particular, the image can be viewed stereoscopically in a wider range of angles than the case of two viewpoints on the right and left sides.

(9) The display panel 12 of the third exemplary embodiment achieves compensations by using the neighboring pixels in the Y-axis direction. Thus, it can be preferably applied to multiple-viewpoint display panel that has a large number of viewpoints, thereby enabling a high image quality.

When increasing the number of viewpoints, it is necessary to arrange a large number of pixels in the X-axis direction. Thus, the pitch of arranging the pixel units in the X-axis directions tends to become wider, so that the compensation effect becomes deteriorated in a method where the neighboring pixel units in the X-axis direction are used to compensate with each other. However, such problem can be overcome with the third exemplary embodiment, since it is structured in the above-described manner.

(10) For example, when the pixel pitch in the X-axis direction is set smaller than that in the Y-axis direction in accordance with the increased number of viewpoints, the pixel density in the X-axis direction becomes high and the flexibility of the layout of the convex structures becomes decreased while the issue of widened pitch of the pixel units in the X-axis direction can be eased. As a result, the problem caused due to combining the convex structures and the image distributing device becomes more serious. However, the third exemplary embodiment can achieve compensation by using the neighboring pixels in the manner as described, so that influences of such problem can be suppressed. That is, this exemplary embodiment can be preferably applied to a case especially where the pixel pitch in the image distributing direction of the image distributing device such as the lenticular lens is smaller than the pixel pitch in the direction that is orthogonal to the image distributing direction.

The third exemplary embodiment has been described by referring to the case of a quadruple-lens type stereoscopic display device including four pixels provided in a single pixel unit. However, the exemplary embodiment of the present invention is not limited only to the case of having that number of viewpoints. The present invention can also be applied in the same manner to a case where a single unit includes different numbers of pixels.

That is, the present invention can be applied to N-lens type stereoscopic display device (N is an integer larger than 2). Furthermore, N is not limited to an integer. For example, the present invention can also be applied in the same manner to a case where N is a fraction.

Next, a fourth exemplary embodiment of the present invention will be described by referring to FIG. 10-FIG. 12.

Figure 10:
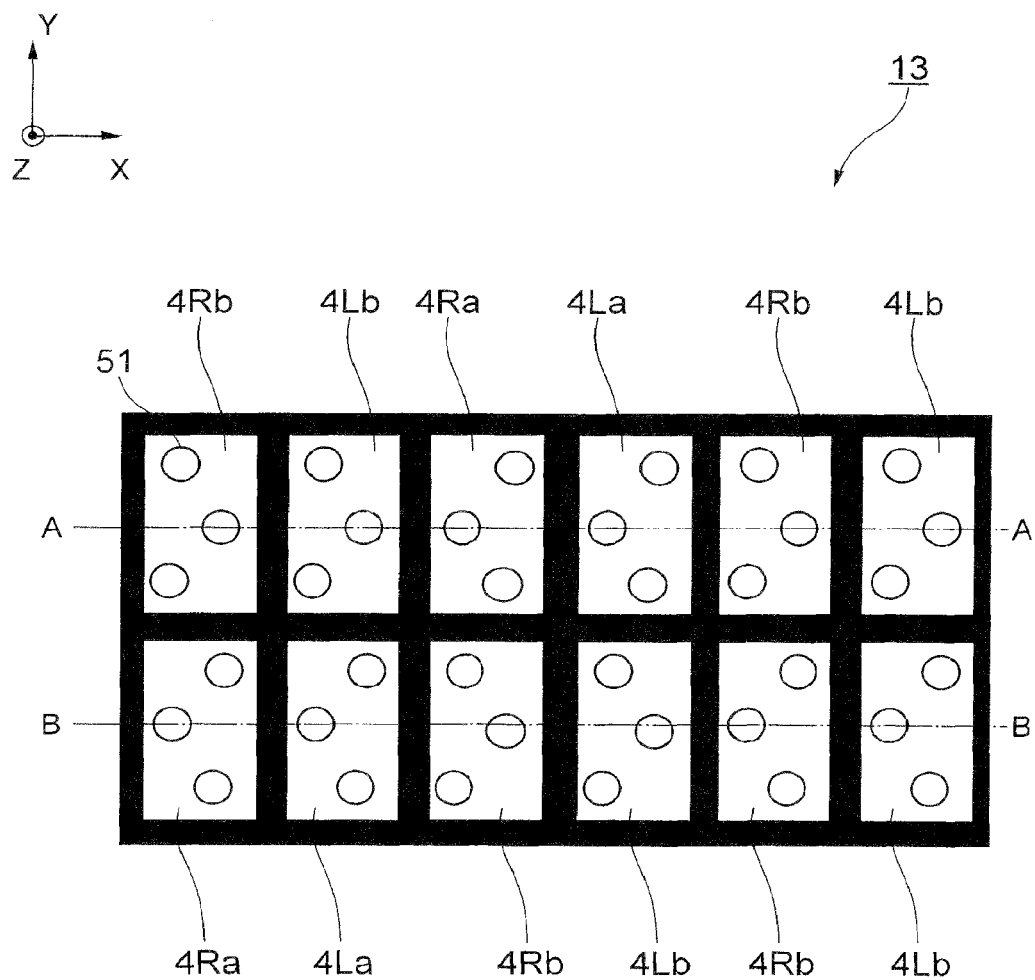
FIG. 10 is a top plan view showing pixels of a display panel according to a fourth exemplary embodiment of the present invention.
Figure 11:
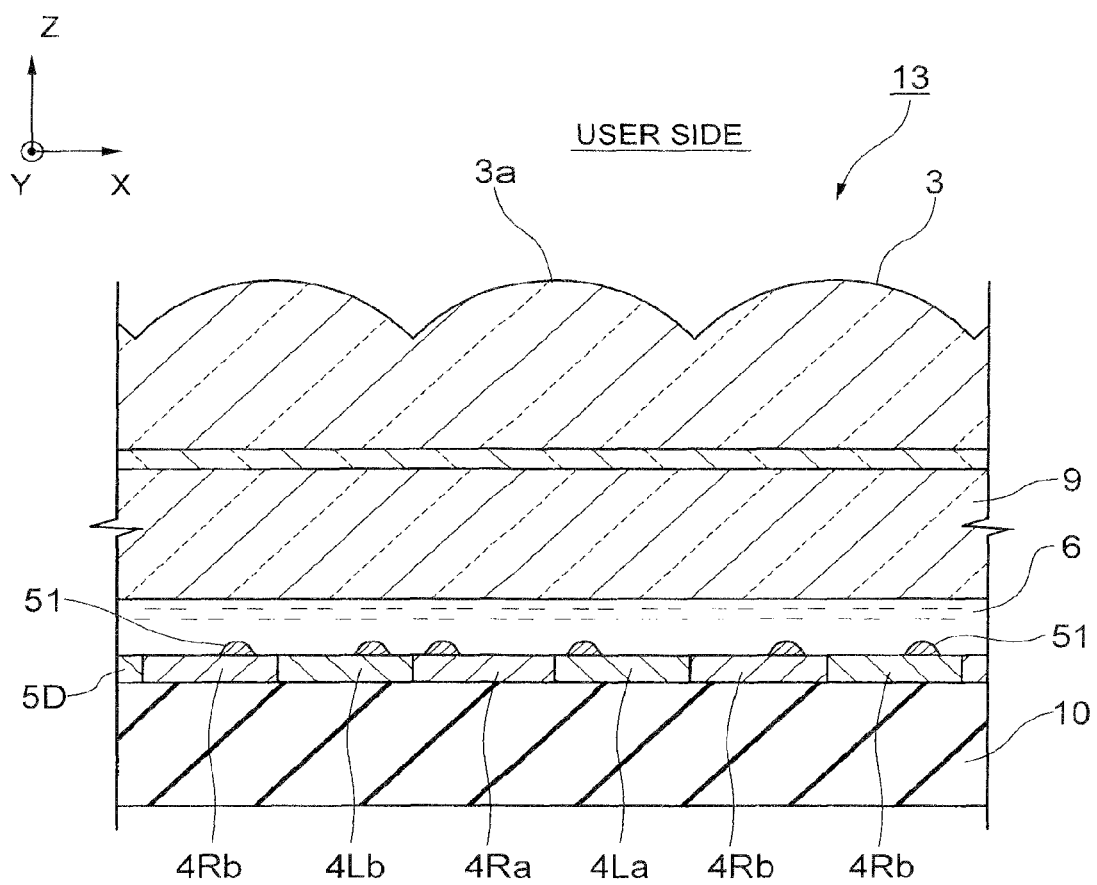
FIG. 11 is a sectional view showing the display panel taken along the line A-A shown in FIG. 10.
Figure 12:
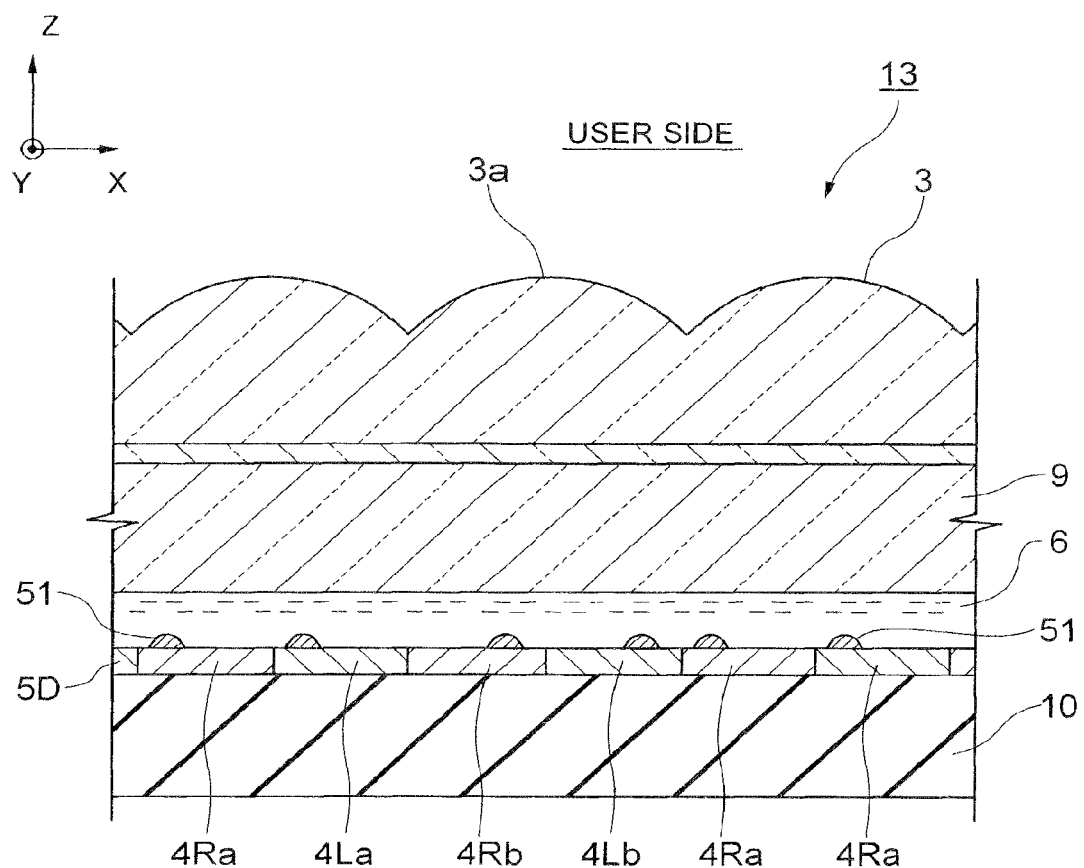
FIG. 12 is a sectional view showing the display panel taken along the line B-B shown in FIG. 10.

FIG. 10 is a top plan view showing pixels of a display panel according to the fourth exemplary embodiment, FIG. 11 is a sectional view showing the display panel taken along the line A-A shown in FIG. 10, and FIG. 12 is a sectional view showing the display panel taken along the line B-B shown in FIG. 10.

In the first exemplary embodiment of the present invention described above, the pixel unit includes a left-eye pixel and a right-eye pixel, and the convex structures 51 on the reflection plates 5A are arranged in a relation to compensate with each other for the pixel units that are lined in the image distributing direction (X-axis direction).

Meanwhile, in the fourth exemplary embodiment, reflection plates 5D of the neighboring pixel units in the image distributing direction are formed to include the uneven structures 51 in a pattern to compensate with each other. Further, the reflection plates 5D of the neighboring pixel units in the direction (Y-axis direction) that is orthogonal to the image distributing direction (X-axis direction) is also formed to include the uneven structures 51 in a pattern to compensate with each other.

That is, it is a feature of the fourth exemplary embodiment that the convex structures 51 of the reflection plates 5D in the neighboring pixel units in the longitudinal and horizontal directions are arranged to compensate with each other, and that the two kinds of pixel units including different convex structures 51 of the reflection plates 5D form a checkerwise pattern.

That is, as shown in FIG. 10, in a display panel 13 according to this exemplary embodiment, each pixel unit including a left-eye pixel and a right-eye pixel is arranged by being corresponded to a cylindrical lens 3a of a lenticular lens 3. Looking into the X-axis direction that is the image distributing direction of the lenticular lens 3, the pixel unit including the left-eye pixel 4La and the right-eye pixel 4Ra and the pixel unit including the left-eye pixel 4Lb and the right-eye pixel 4Rb are arranged alternately.

These pixels are completely the same as those of the first exemplary embodiment described above. The patterns of the convex structures 51 of the reflection plates 5D are different, which are patterns to compensate with each other.

Next, looking into the Y-axis direction that is orthogonal to the image distributing direction (X-axis direction), a pixel unit including a left-eye pixel 4Lb and a right-eye pixel 4Rb is arranged next to a pixel unit including a left-eye pixel 4La and a right-eye pixel 4Ra. These two kinds of pixel units are also arranged in the Y-axis direction alternately.

As a result, the two kinds of pixel units including different patterns of the convex structures 51 on the reflection plates 5D are arranged to form the checkerwise pattern.

The display panel 13 of the fourth exemplary embodiment has the structures and functions such as those described above, so that the following effects can be achieved in addition to the effects substantially the same as those described in (1)-(4).

(11) Since the patterns of the convex structures 51 on the reflection plates 5D in the display panel 13 are in the patterns to compensate with each other in the X-axis direction as well as the Y-axis direction, deterioration of the image quality can be suppressed by using not only the compensation effect of the pixel units that are adjacent in the X-axis direction but also the compensation effect of the pixel units that are adjacent in the Y-axis direction. As a result, the effect of the compensations can be exhibited more significantly than that of the first exemplary embodiment described above. Therefore, it is possible to achieve a high image quality.

Next, a fifth exemplary embodiment of the present invention will be described by referring to FIG. 13-FIG. 15.

Figure 13:
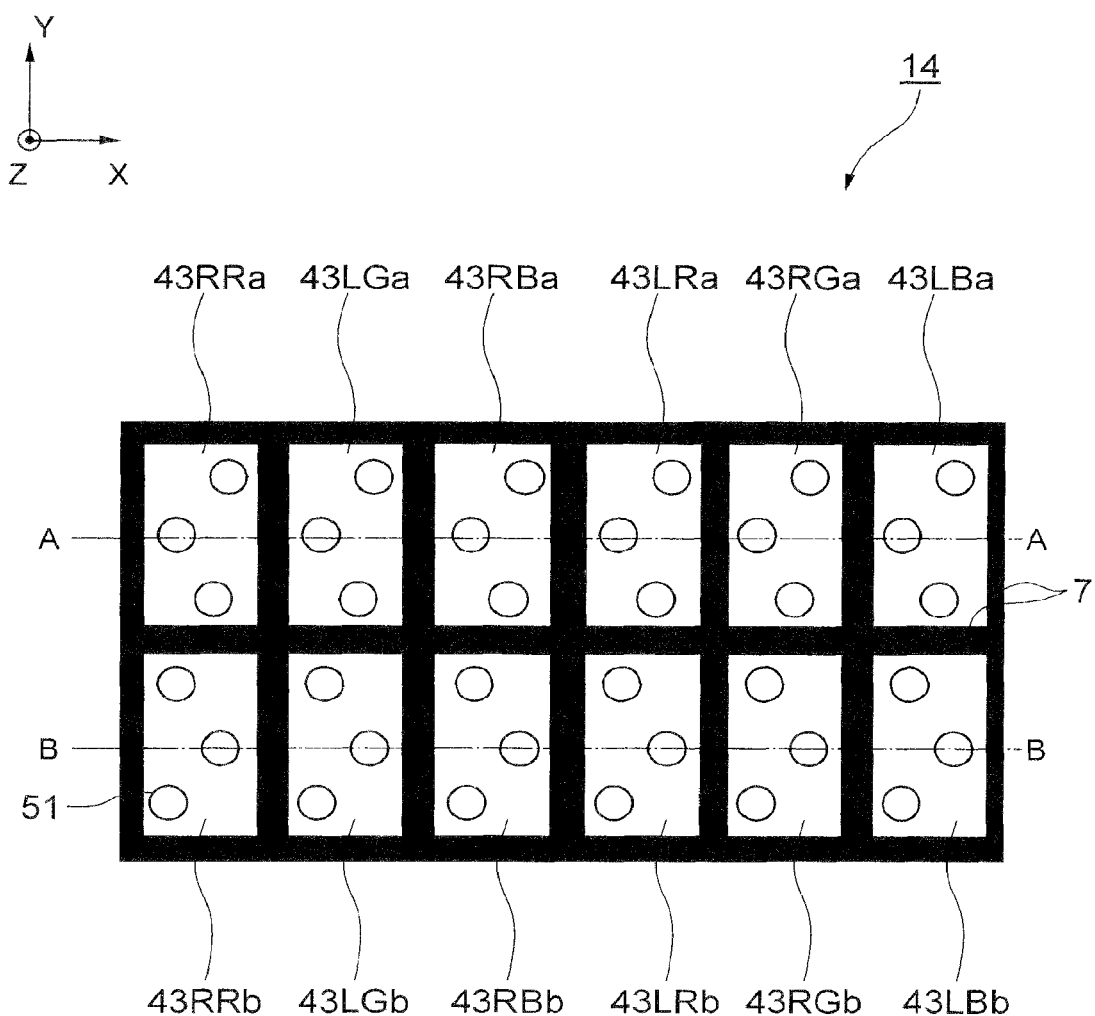
FIG. 13 is a top plan view showing pixels of a display panel according to a fifth exemplary embodiment of the present invention.
Figure 14:
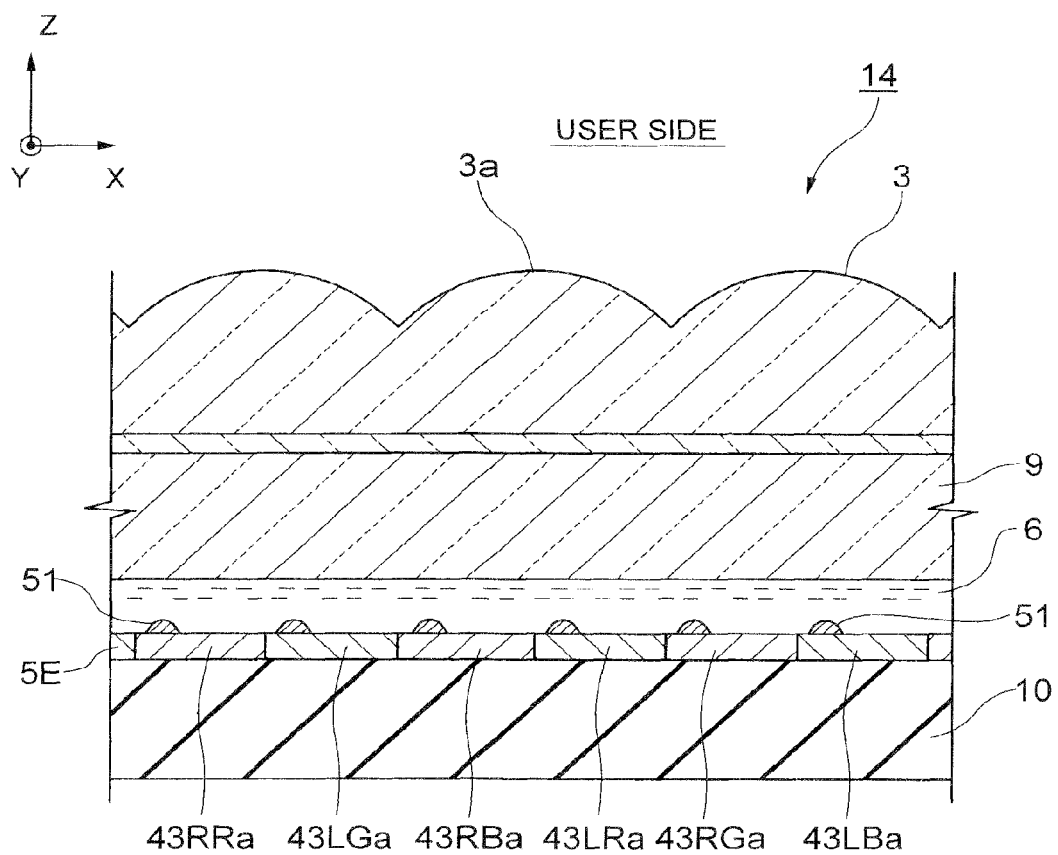
FIG. 14 is a sectional view showing the display panel taken along the line A-A shown in FIG. 13.
Figure 15:
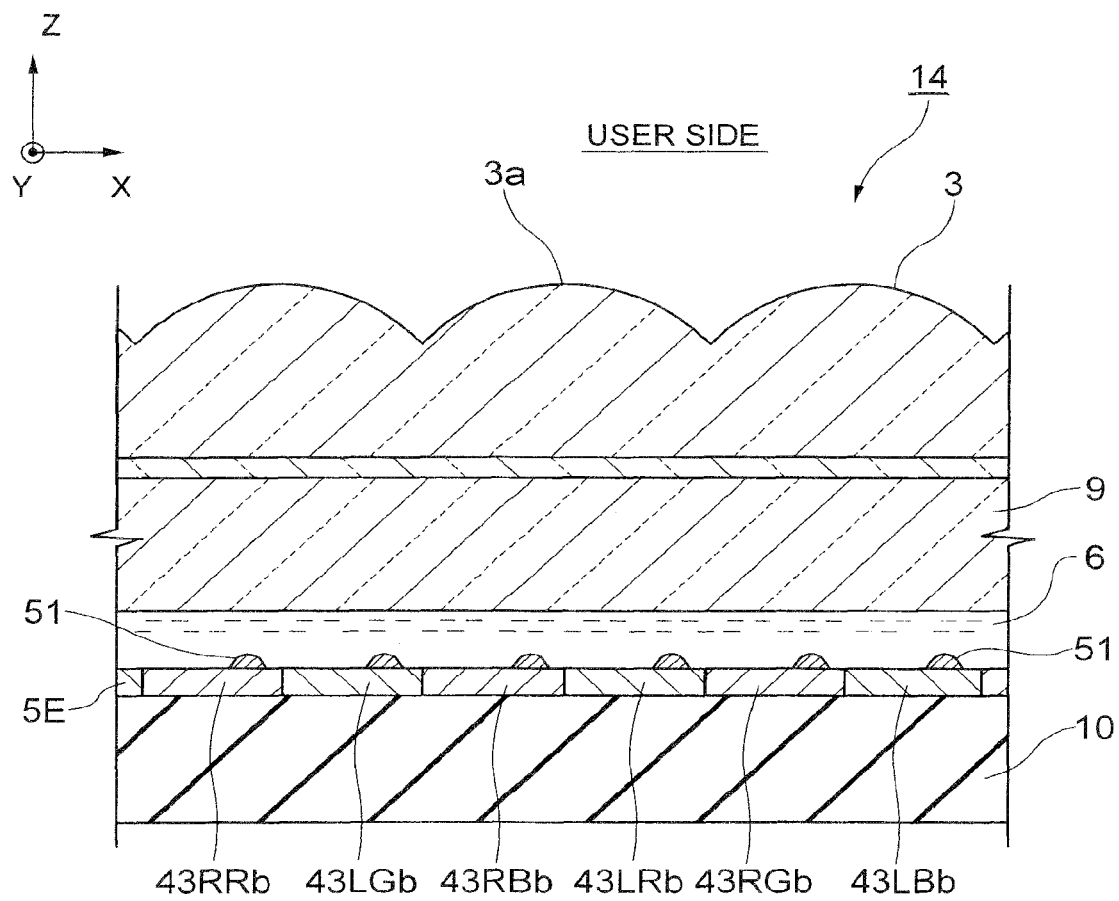
FIG. 15 is a sectional view showing the display panel taken along the line B-B shown in FIG. 13.

FIG. 13 is a top plan view showing pixels of a display panel according to this exemplary embodiment, FIG. 14 is a sectional view showing the display panel taken along the line A-A shown in FIG. 13, and FIG. 15 is a sectional view showing the display panel taken along the line B-B shown in FIG. 13.

The fifth exemplary embodiment is largely different from the above-described first exemplary embodiment in respect that there are pixels for color display being provided in the fifth exemplary embodiment so that color reflective display can be achieved. For the layout of colors in the fifth exemplary embodiment, the three primary colors of red, blue, and green are arranged alternately towards the image distributing direction (X-axis direction). Further, convex structures 51 on reflection plates 5E are arranged to compensate with each other only in a direction that is orthogonal to the image distributing direction.

That is, as shown in FIG. 13 and FIG. 14, in a display panel 14 according to the fifth exemplary embodiment, a right-eye red pixel 43RRa and a left-eye green pixel 43LGa are arranged by being corresponded to a certain cylindrical lens 3a of a lenticular lens 3.

Further, a right-eye blue pixel 43RBa and a left-eye red pixel 43LRa are arranged by being corresponded to the neighboring cylindrical lens 3a of the certain cylindrical lens 3a. In the same manner, a right-eye green pixel 43RGa and a left-eye blue pixel 43LBa are arranged by being corresponded to the cylindrical lens 3 that is next to the aforementioned neighboring lens 3.

Further, as shown in FIG. 13 and FIG. 15, a right-eye pixel 43RRb is arranged next to the right-eye red pixel 43RRa in −Y direction. As a result, the right-eye red pixel 43RRa and the right-eye red pixel 43RRb are arranged alternately in the Y-axis direction.

In the same manner, the left-eye green pixel 43LGb, the right-eye blue pixel 43RBb, the left-eye red pixel 43LRb, the right-eye green pixel 43RGb, and the left-eye blue pixel 43LBb are arranged, respectively, in the −Y direction of the left-eye green pixel 43LGa, in the −Y direction of the right-eye blue pixel 43RBa, in the −Y direction of the left-eye red pixel 43LRa, in the −Y direction of the right-eye green pixel 43RGa, and in the −Y direction of the left-eye blue pixel 43LBa, in an alternate manner, towards the Y-axis direction. The right-eye red pixel 43RRa and the right-eye pixel 43RRb are arranged in such a manner that convex structures 51 of reflection plates 5E compensate with each other.

Further, it is the same for the relations between the left-eye green pixel 43LGa and the left-eye green pixel 43LGb, the right-eye blue pixel 43RBa and the right-eye blue pixel 43RBb, the left-eye red pixel 43LRa and the left-eye red pixel 43LRb, the right-eye green pixel 43RGa and the right-eye green pixel 43RGb, the left-eye blue pixel 43LBa and the left-eye blue pixel 43LBb.

For the colors of each pixel, a color filter is provided to each pixel, for example, to utilize the light absorption power of the color filters.

The display panel 14 of the fifth exemplary embodiment has the structures and functions such as those described above, so that the following effects can be achieved in addition to the effects substantially the same as those described in (1)-(4).

(12) In the display panel 14 of this exemplary embodiment, the color filter is provided to each pixel. Thus, color display can also be achieved by the light absorption power of the color filters. Particularly, when the convex structures 51 of the reflection plates 5E are arranged to compensate with each other in a direction (Y-axis direction) that is orthogonal to the direction (X-axis direction) of the layout of the colors as in the structure of the fifth exemplary embodiment, it is possible to prevent generation of differences in each color that may be caused due to the differences in the convex structures 51. Therefore, a high image quality can be achieved.

Next, a sixth exemplary embodiment of the present invention will be described by referring to FIG. 16-FIG. 18.

Figure 16:
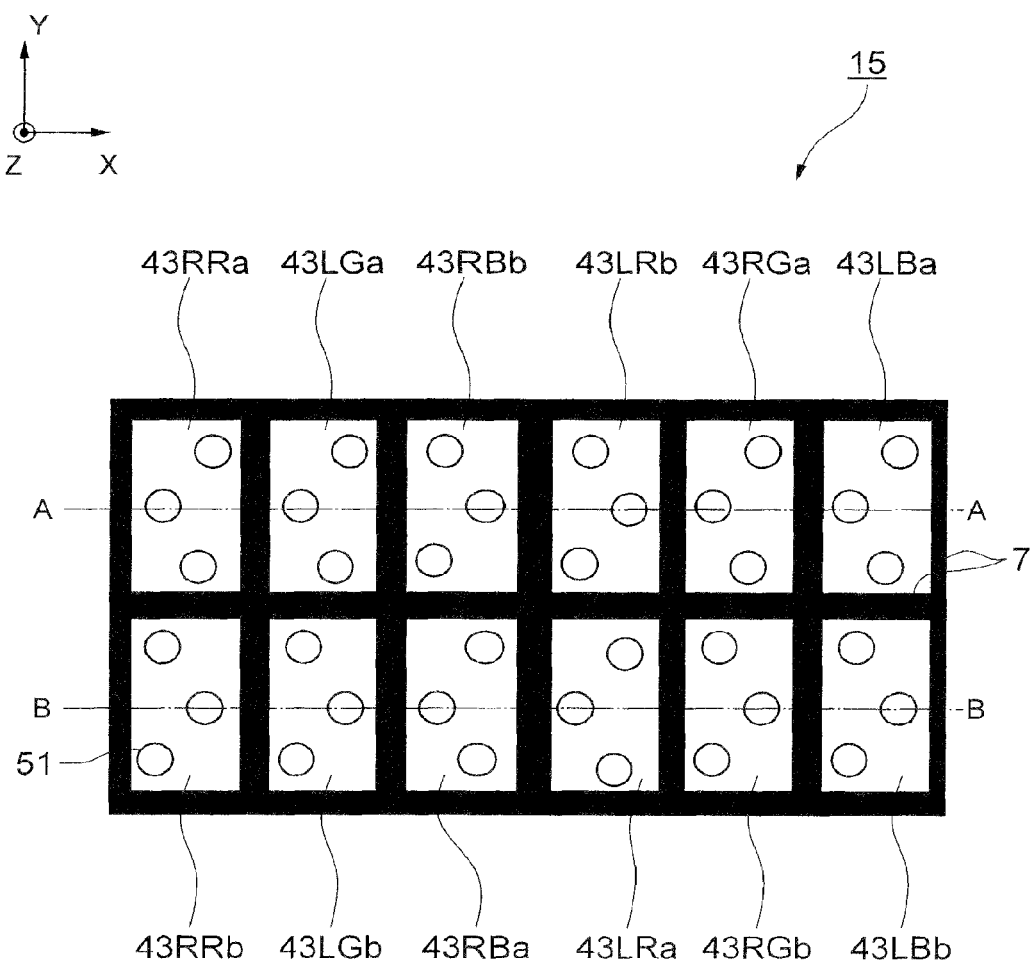
FIG. 16 is a top plan view showing pixels of a display panel according to a sixth exemplary embodiment of the present invention.
Figure 17:
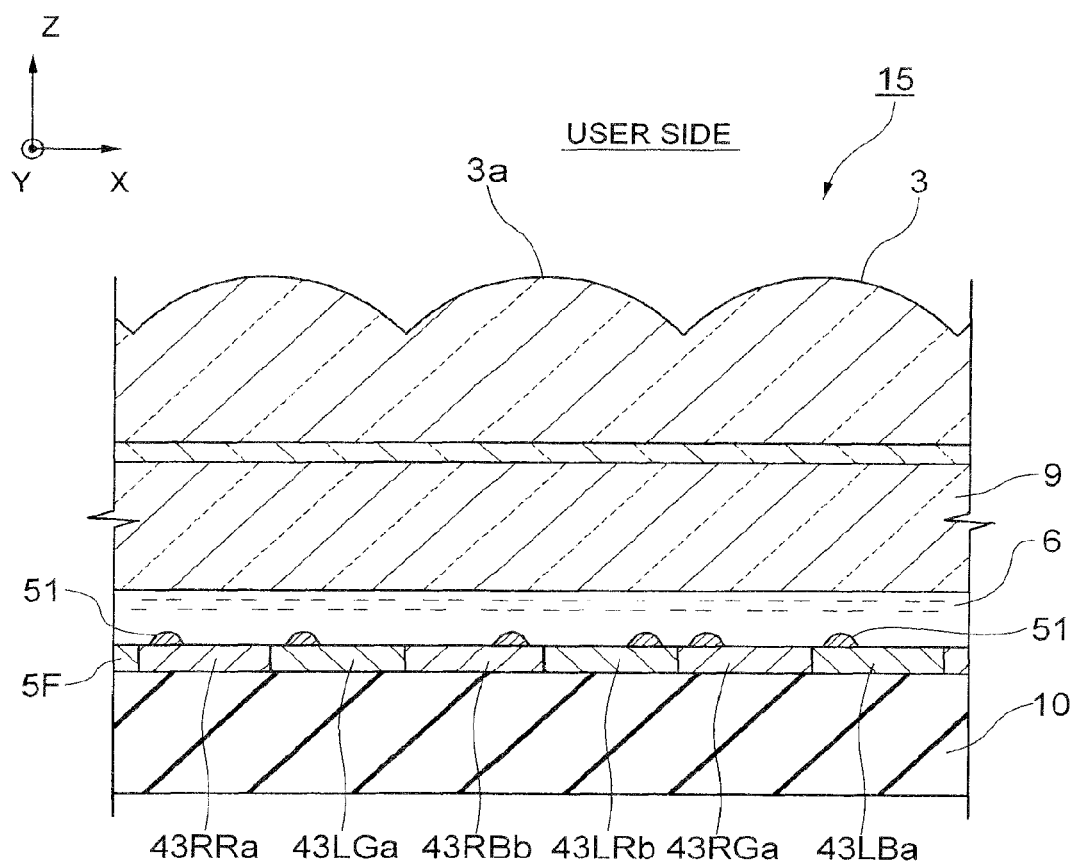
FIG. 17 is a sectional view showing the display panel taken along the line A-A shown in FIG. 16.
Figure 18:
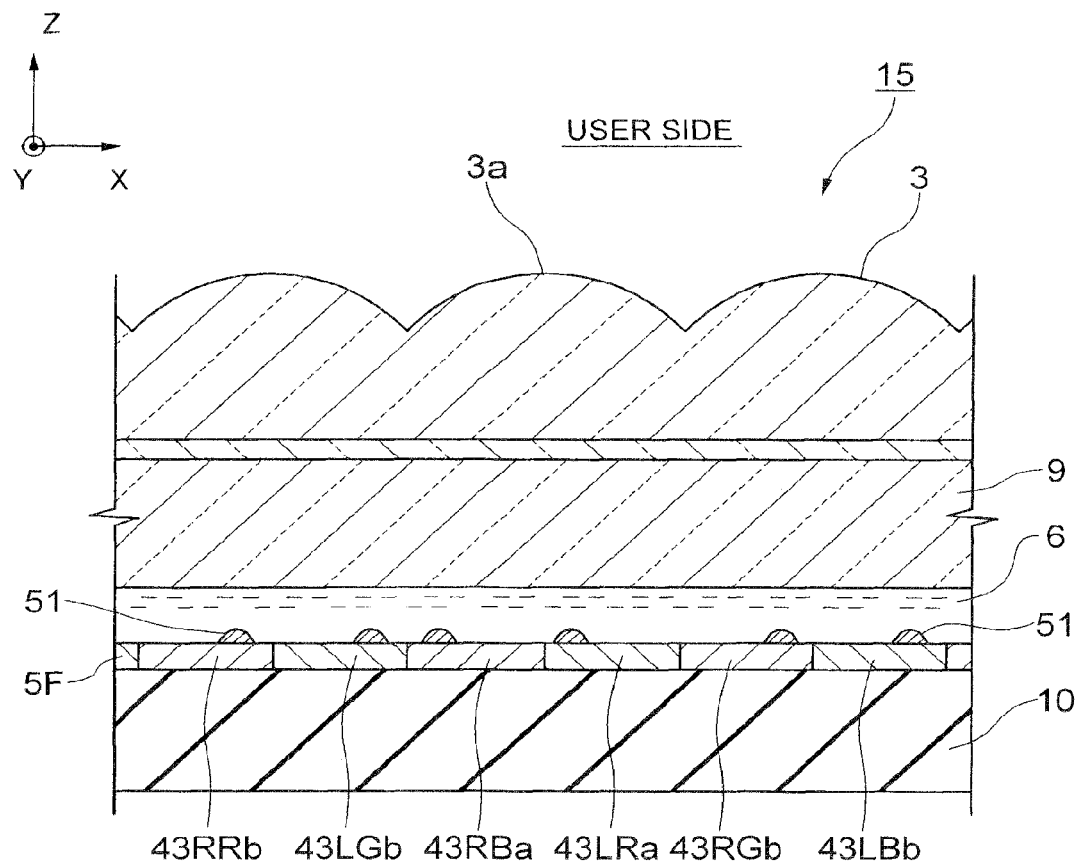
FIG. 18 is a sectional view showing the display panel taken along the line B-B shown in FIG. 16.

FIG. 16 is a top plan view showing pixels of a display panel 15 according to the sixth exemplary embodiment, FIG. 17 is a sectional view showing the display panel 15 taken along the line A-A shown in FIG. 16, and FIG. 18 is a sectional view showing the display panel 15 taken along the line B-B shown in FIG. 16.

Compared to the above-described fifth exemplary embodiment, the sixth exemplary embodiment has a different layout pattern for the color display pixels. That is, although the layout of the colors is the same as that of the fifth exemplary embodiment, convex structures 51 on reflection plates 5F are arranged to compensate with each other not only in the direction (Y-axis direction) that is orthogonal to the image distributing direction (X-axis direction) but also in the image distributing direction (X-axis direction).

As shown in FIG. 16 and FIG. 17, in the display panel 15 according to the sixth exemplary embodiment, a right-eye red pixel 43RRa and a left-eye green pixel 43LGa are arranged by being corresponded to a certain cylindrical lens 3a of a lenticular lens 3. Further, a right-eye blue pixel 43RBa and a left-eye red pixel 43LRb are arranged by being corresponded to a neighboring cylindrical lens 3a of the certain cylindrical lens 3a. In the same manner, a right-eye green pixel 43RGa and a left-eye blue pixel 43LBa are arranged by being corresponded to a cylindrical lens 3a that is next to the aforementioned neighboring lens 3a.

Further, as shown in FIG. 16 and FIG. 18, a right-eye red pixel 43RRb and a left-eye green pixel 43LGb are arranged, respectively, in the −Y direction of the right-eye red pixel 43RRa and in the −Y direction of the left-eye green pixel 43LGa.

Further, a right-eye blue pixel 43RBa and a left-eye red pixel 43LRa are arranged, respectively, in the −Y direction of the right-eye blue pixel 43RBb and in the −Y direction of the left-eye red pixel 43LRb. Furthermore, a right-eye green pixel 43RGb and a left-eye blue pixel 43LBb are arranged, respectively, in the −Y direction of the right-eye green pixel 43RGa and in the −Y direction of the left-eye blue pixel 43LBa.

That is, the convex structures 51 on the reflection plates 5F of the left-eye pixel and the right-eye pixel as a pair are in the same pattern, but the pair units are so arranged that the patterns of the convex structures 51 in the neighboring units compensate with each other.

Structures of this exemplary embodiment other than those described above are the same as the structures of the above-described fifth exemplary embodiment.

The display panel 15 of the sixth exemplary embodiment has the structures and functions such as those described above, so that the following effects can be achieved in addition to the effects substantially the same as those described in (1)-(4), and (11).

(13) Compared to the fifth exemplary embodiment of the present invention described above, the display panel 15 of the sixth exemplary embodiment has the uneven structures in different patterns also in the layout direction of the colors, thereby increasing a possibility of generating differences in the colors that may be caused due to the differences in the uneven structures. However, the influence of the uneven structures can be compensated two-dimensionally. In addition, it is compensated with the layout where the spatial frequency becomes the highest, so that the highest compensation effect can be exhibited.

Next, a seventh exemplary embodiment of the present invention will be described by referring to FIG. 19-FIG. 21.

Figure 19:
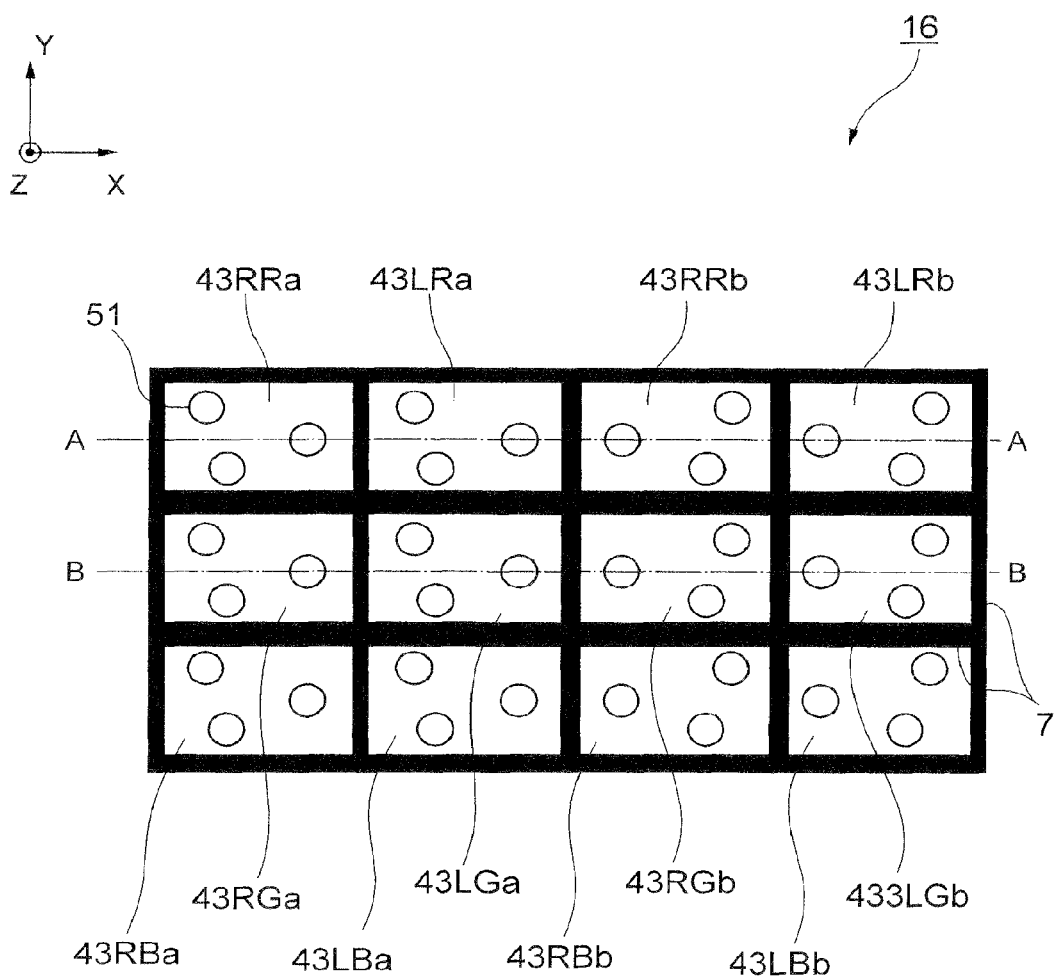
FIG. 19 is a top plan view showing pixels of a display panel according to a seventh exemplary embodiment of the present invention.
Figure 20:
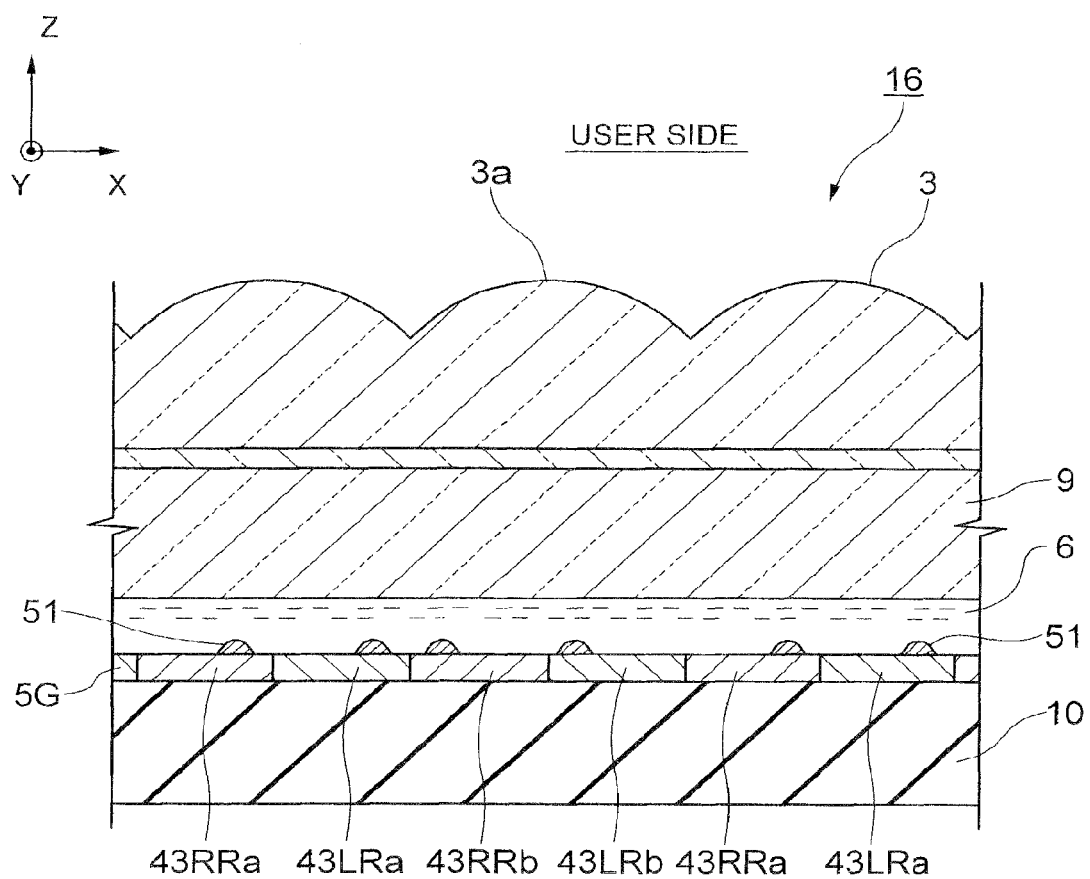
FIG. 20 is a sectional view showing the display panel taken along the line A-A shown in FIG. 19.
Figure 21:
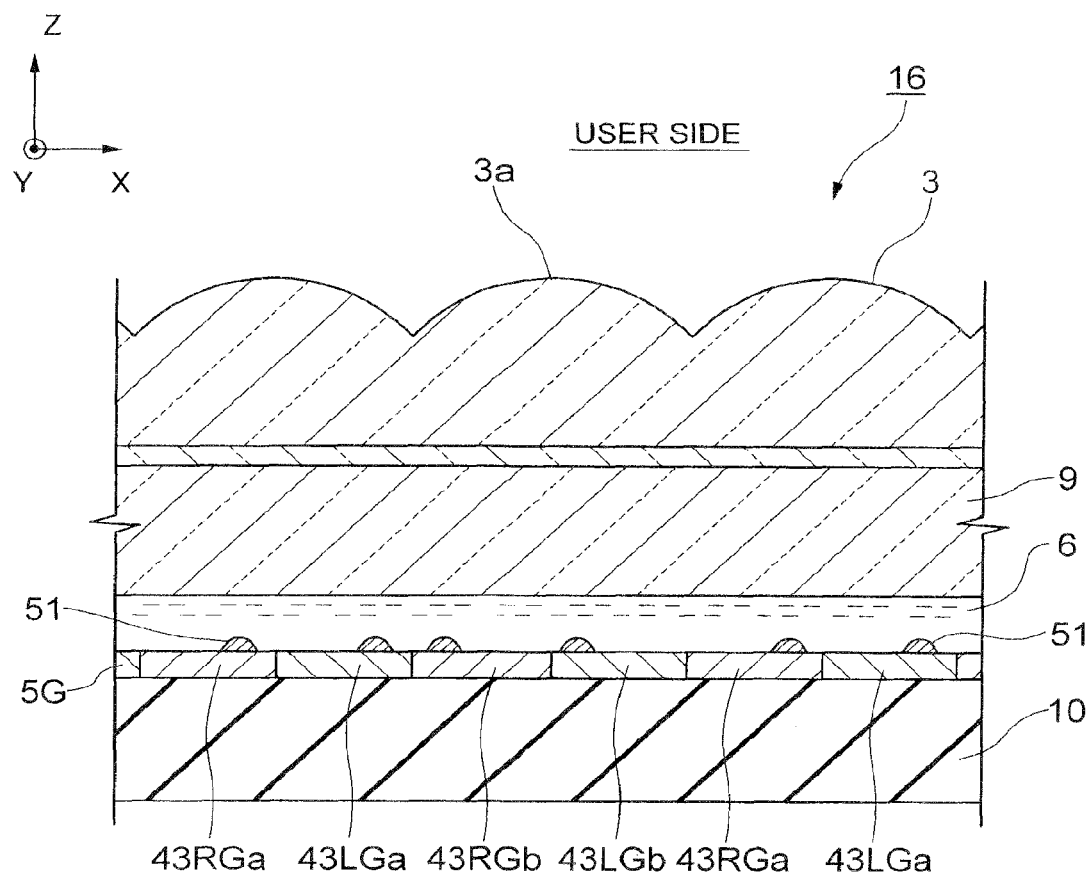
FIG. 21 is a sectional view showing the display panel taken along the line B-B shown in FIG. 19.

FIG. 19 is a top plan view showing pixels of a display panel 16 according to the seventh exemplary embodiment, FIG. 20 is a sectional view showing the display panel 15 taken along the line A-A shown in FIG. 19, and FIG. 21 is a sectional view showing the display panel 15 taken along the line B-B shown in FIG. 19.

Compared to the above-described fifth exemplary embodiment, the seventh exemplary embodiment has a different layout pattern for the color display pixels. That is, the layout of the colors is different from that of the fifth exemplary embodiment, and the three primary colors of red, blue, and green are arranged alternately in the direction (Y-axis direction) that is orthogonal to the image distributing direction (X-axis direction). Further, convex structures 51 on reflection plates 5G are arranged to compensate with each other in the image distributing direction.

As shown in FIG. 19 and FIG. 20, in the display panel 16 according to the seventh exemplary embodiment, a right-eye red pixel 43RRa and a left-eye red pixel 43LRa are arranged by being corresponded to a certain cylindrical lens 3a of a lenticular lens 3. Further, a right-eye red pixel 43RRb and a left-eye red pixel 43LRb are arranged by being corresponded to a neighboring cylindrical lens 3a of the certain cylindrical lens 3a.

Further, a right-eye green pixel 43RGa, a left-eye green pixel 43LGa, a right-eye green pixel 43RGb, and a left-eye green pixel 43LGb are arranged, respectively, in the −Y direction of the right-eye red pixel 43RRa, in the −Y direction of the left-eye red pixel 43LRa, in the −Y direction of the right-eye red pixel 43RRb, and in the −Y direction of the left-eye red pixel 43LRb. Further, next to those pixels in the −Y direction, a right-eye blue pixel 43RBa, a left-eye blue pixel 43LBa, a right-eye blue pixel 43RBb, and a left-eye blue pixel 43LBb are arranged, respectively. The pixels of these three colors, i.e. red, blue, and green, are arranged repeatedly in the Y-axis direction.

Further, as shown in FIG. 20 or FIG. 21, convex structures 51 on the reflection plates 5G are arranged to compensate with each other in the image distributing direction (X-axis direction). That is, including a right-eye pixel and a left-eye pixel as a pair, different patterns of the convex structures are arranged alternately for the neighboring pairs in the X-axis direction.

Structures of this exemplary embodiment other than those described above are the same as the structures of the above-described fourth exemplary embodiment.

The display panel 16 of the seventh exemplary embodiment has the structures and functions such as those described above, so that the following effects can be achieved in addition to the effects substantially same as those described in (1)-(4), and (10).

(14) In the display panel 16 of the seventh exemplary embodiment, pixels of each color are repeatedly arranged in the direction that is orthogonal to the X-axis direction, thereby making it possible to achieve color display. Further, the seventh exemplary embodiment is not only capable of suppressing deterioration of the image quality by using the compensation effect of the neighboring pairs of right and left pixels in the X-axis direction but also capable of increasing the proportion of the area to be used for display in each pixel. Therefore, a bright display can be achieved.

(15) Compared to the sixth exemplary embodiment described above, the display panel 16 of the seventh exemplary embodiment can achieve the same-level high-definition with a still larger pitch, i.e. with the lens pitch of three times as large. With this, molding of the lens becomes easy so that the cost can be reduced.

(16) In the display panel 16 of the seventh exemplary embodiment, a margin of error regarding the positional alignment between the lenses and the pixels becomes expanded by three times. Therefore, the manufacturing yield of the display panels can be improved.

Next, an eighth exemplary embodiment of the present invention will be described by referring to FIG. 22-FIG. 24.

Figure 22:
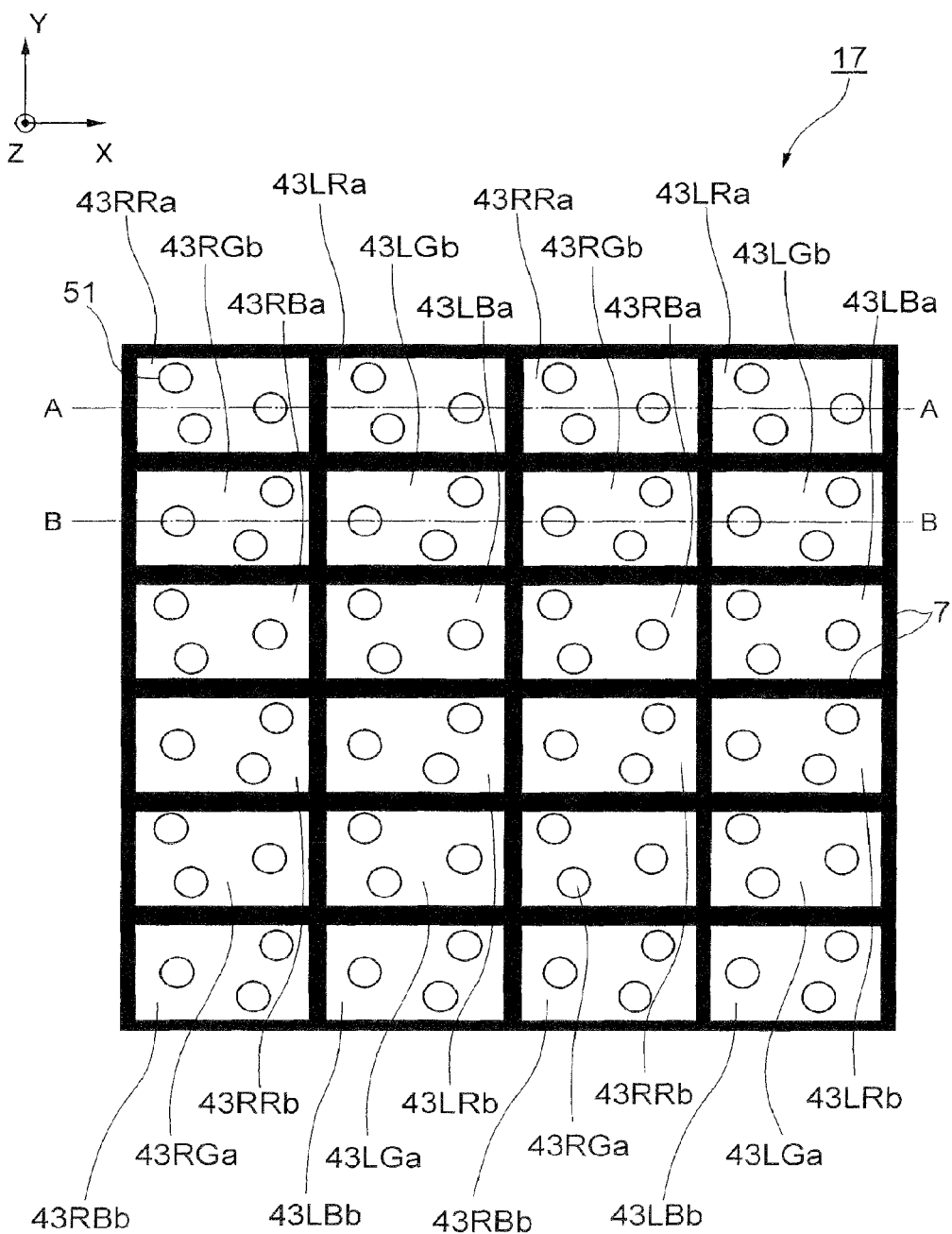
FIG. 22 is a top plan view showing pixels of a display panel according to an eighth exemplary embodiment of the present invention.
Figure 23:
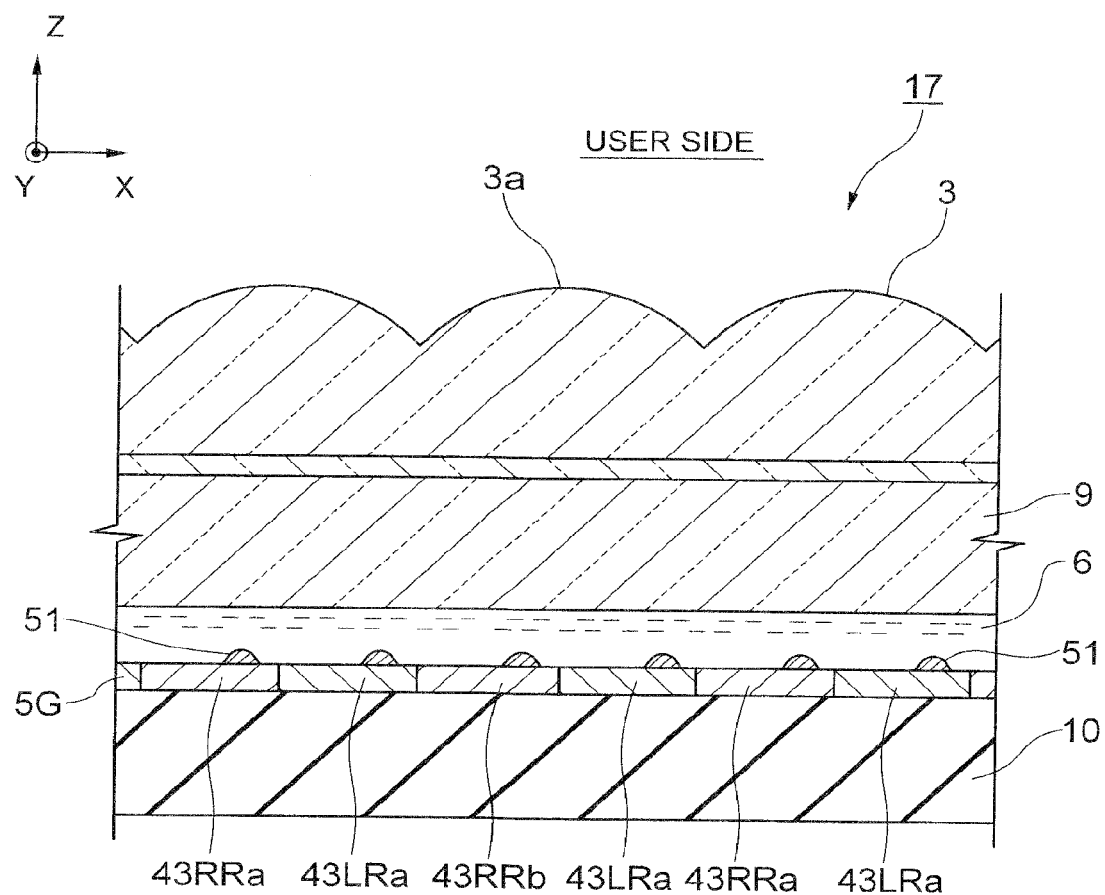
FIG. 23 is a sectional view showing the display panel taken along the line A-A shown in FIG. 22.
Figure 24:
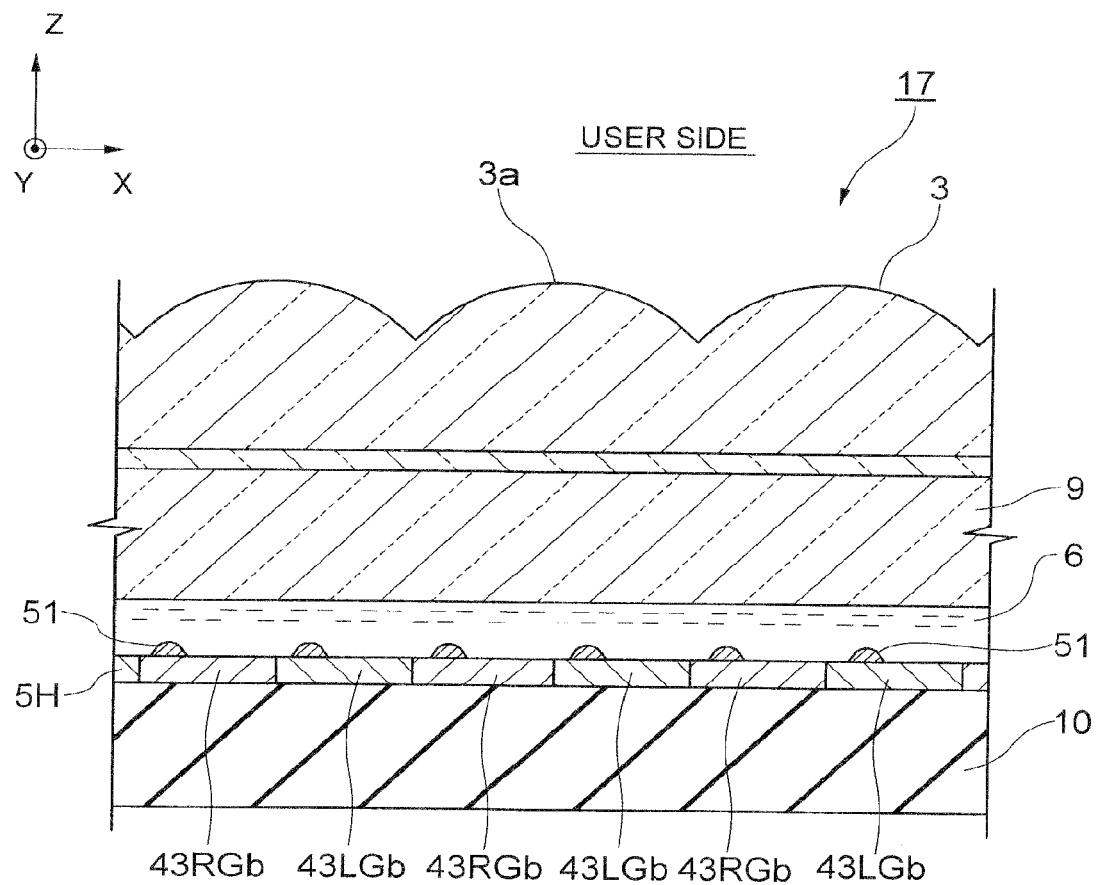
FIG. 24 is a sectional view showing the display panel taken along the line B-B shown in FIG. 22.

FIG. 22 is a top plan view showing pixels of a display panel 17 according to the eighth exemplary embodiment, FIG. 23 is a sectional view showing the display panel 17 taken along the line A-A shown in FIG. 22, and FIG. 24 is a sectional view showing the display panel 17 taken along the line B-B shown in FIG. 22.

Compared to the above-described seventh exemplary embodiment, in the eighth exemplary embodiment, the layout pattern of convex structures 51 on reflection plates 5H is different even though the layout of the colors is the same. That is, regarding the layout of the colors, the three primary colors of red, blue, and green are alternately arranged in the direction (Y-axis direction) that is orthogonal to the image distributing direction (X-axis direction). Further, the convex structures 51 on the reflection plates 5H are also arranged to compensate with each other in the Y-axis direction that is orthogonal to the X-axis direction.

As shown in FIG. 22 and FIG. 23, in the display panel 17 according to the eighth exemplary embodiment, a right-eye red pixel 43RRa and a left-eye red pixel 43LRa are arranged by being corresponded to a certain cylindrical lens 3a of a lenticular lens 3. Further, a right-eye green pixel 43RGb is arranged next to the right-eye red pixel 43RRa in the −Y direction and, further towards the −Y direction, a right-eye blue pixel 43RBa, a right-eye red pixel 43RRb, a right-eye green pixel 43RGa, and a right-eye blue pixel 43RBb are arranged in line in this order.

Further, from the left-eye red pixel 43LRa towards the −Y direction, a left-eye green pixel 43LGb, a left-eye blue pixel 43LBa, a left-eye red pixel 43LRb, a left-eye green pixel 43LGa, and a left-eye blue pixel 43LBb are arranged in line in this order.

Structures of the eighth exemplary embodiment other than those described above are the same as the structures of the above-described seventh exemplary embodiment.

The display panel 17 of the eighth exemplary embodiment has the structures and functions such as those described above, so that the following effects can be achieved in addition to the effects substantially same as those described in (1)-(4), and (13)-(15).

(17) In the display panel 17 of the eighth exemplary embodiment, pixels of each color are repeatedly arranged in the Y-axis direction that is orthogonal to the X-axis direction. By including the two of the color pixels as a pair, the influence of the convex structures 51 can be decreased. Particularly, the effect can be exhibited in a case where the pitch of each pixel in the Y-axis direction is smaller than the pitch in the X-axis direction. Therefore, in addition to the feature of the seventh exemplary embodiment, it is possible with the eighth exemplary embodiment to exhibit the effect in the case where the pitch of each pixel in the Y-axis direction is smaller than the pitch in the X-axis direction.

The pitch in the Y-axis direction becomes smaller than the pitch in the X-axis direction particularly in the twin-lens (on the right and left sides) type display panel, so that the compensation of the convex structures 51 can be achieved with the finest pitch. Thus, the compensation effect can be increased to the optimum. This means that the eighth exemplary embodiment can be preferably applied to a display panel of low resolution having relatively a large pixel pitch.

In the eighth exemplary embodiment, the convex structures 51 of the reflection plate 5H are arranged to compensate with each other between the neighboring pixels lined in the Y-axis direction that is orthogonal to the image distributing direction. However, the exemplary embodiment of the present invention is not limited only to that. It is also possible to arrange those to compensate with each other by being corresponded to the layout cycle of the colors.

That is, it is possible to arrange a set of neighboring red, blue, and green pixels lined in the Y-axis direction and a neighboring set of red, blue, and green pixels lined in the Y-axis direction to compensate with each other. With this, the layout of the convex structures of each of the color pixels of red, blue, and green can be made the same, so that an adverse effect to the colors can be decreased.

The method of treating the colors insets is advantageous particularly in a high-definition display panel, because when the pixel pitch becomes smaller, the range of the neighboring pixels to compensate with each other can be made narrower. Therefore, especially, even when the red, blue, and green pixels are treated in sets, the difference therebetween cannot be visually recognized. As a result, the effect of improving the colors can be exhibited significantly.

Furthermore, the eighth exemplary embodiment may be combined with the above-described seventh exemplary embodiment to make a checkerwise layout for enabling compensation in the image distributing direction as well. With this, the effect of improving the image quality can be exhibited further.

Next, a ninth exemplary embodiment of the present invention will be described by referring to FIG. 25-FIG. 27.

Figure 25:
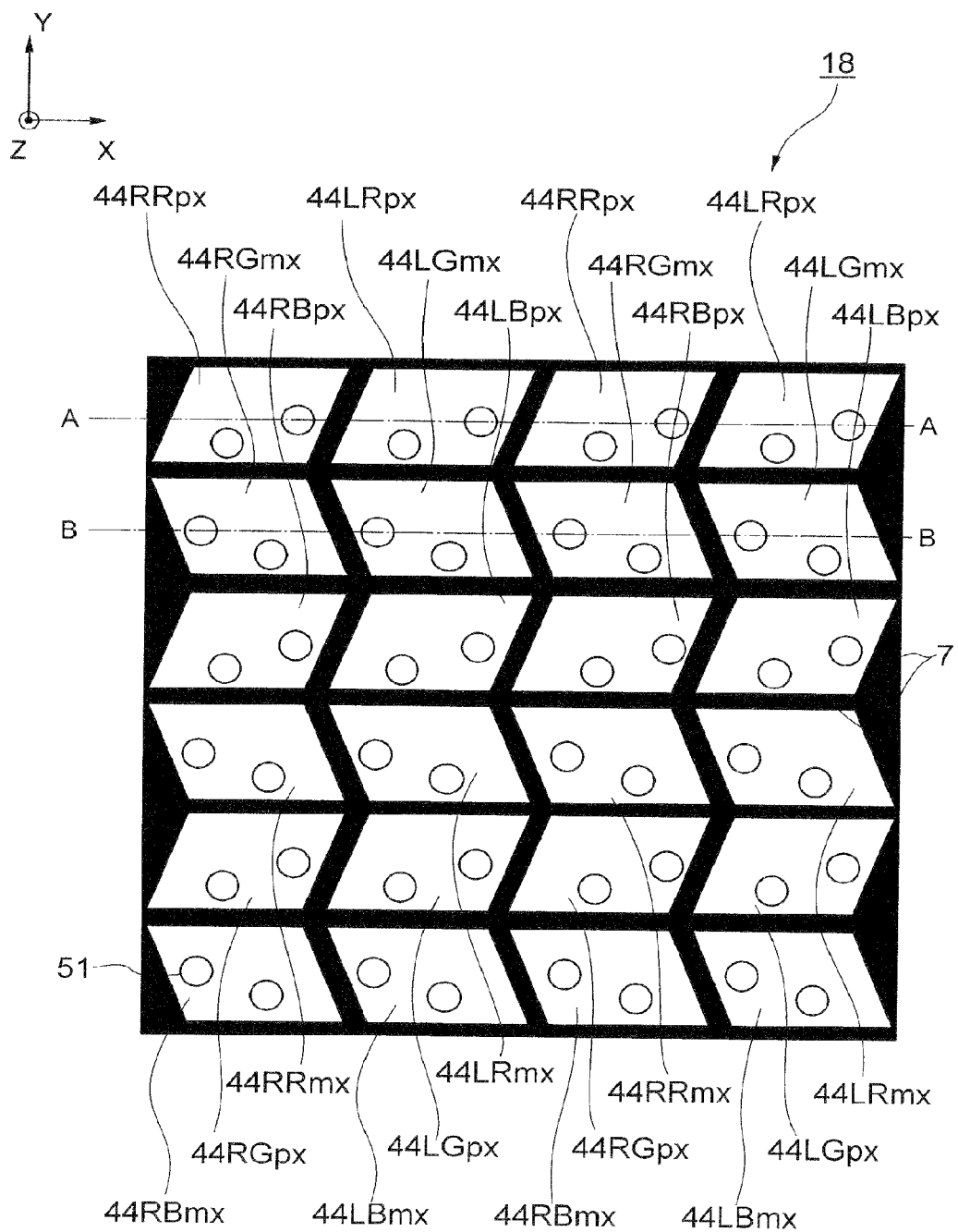
FIG. 25 is a top plan view showing pixels of a display panel according to a ninth exemplary embodiment of the present invention.
Figure 26:
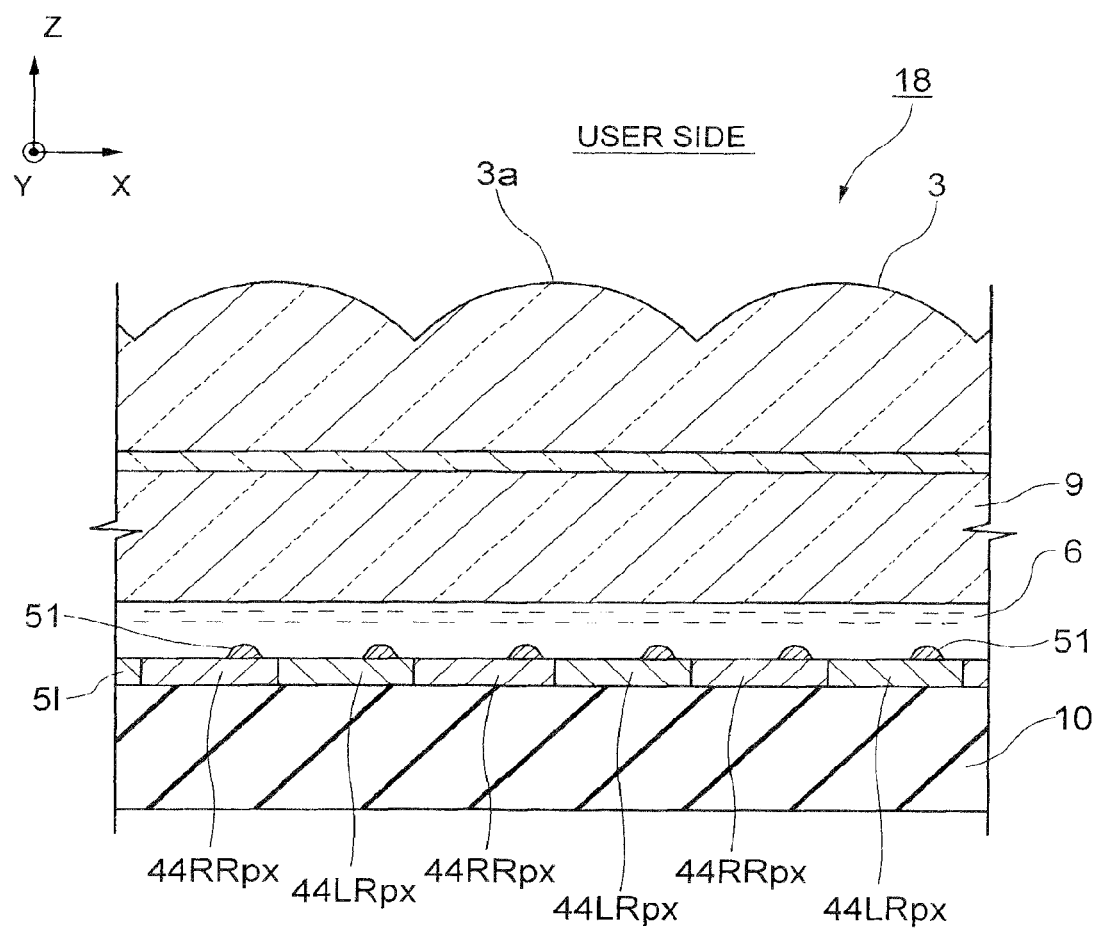
FIG. 26 is a sectional view showing the display panel taken along the line A-A shown in FIG. 25.
Figure 27:
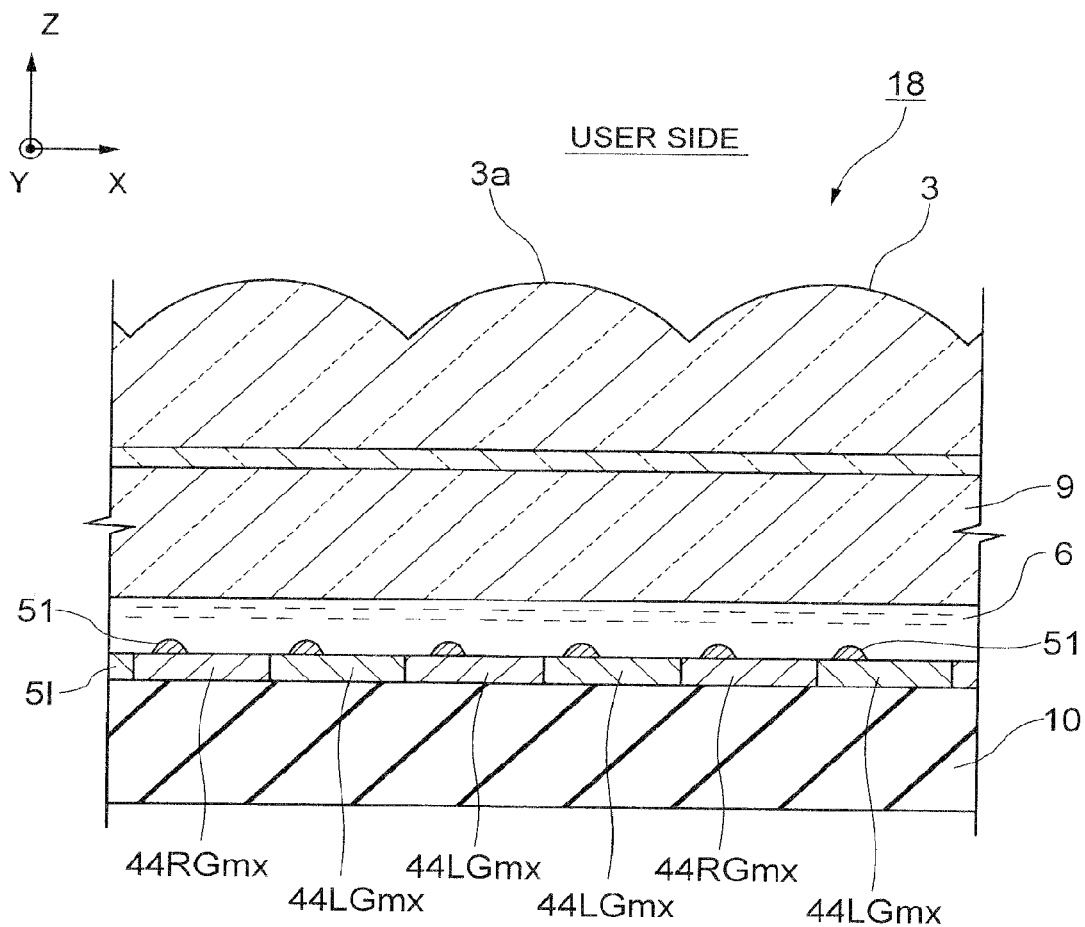
FIG. 27 is a sectional view showing the display panel taken along the line B-B shown in FIG. 25.

FIG. 25 is a top plan view showing pixels of a display panel 18 according to the ninth exemplary embodiment, FIG. 26 is a sectional view showing the display panel 18 taken along the line A-A shown in FIG. 25, and FIG. 27 is a sectional view showing the display panel 18 taken along the line B-B shown in FIG. 25.

Compared to the above-described eighth exemplary embodiment, in the ninth exemplary embodiment, the shape of the pixel and the layout pattern of convex structures on reflection plates is different even though the layout of the colors is the same. That is, regarding the layout of the colors, the three primary colors of red, blue, and green are alternately arranged in the direction (Y-axis direction) that is orthogonal to the image distributing direction (X-axis direction).

In the meantime, the shape of the pixel in the ninth exemplary embodiment is basically a parallelogram, whereas it is basically a quadrilateral in the above-described eighth exemplary embodiment. Further, for convex structures 51 on reflection plates 5I, basically one kind of layout pattern is arranged symmetrically. However, those convex structures in the same pattern are arranged to have relatively different positional relations with respect to cylindrical lenses 3a that configure a lenticular lens 3 as the image distributing device, thereby exhibiting the effects of compensating with each other in the Y-axis direction that is orthogonal to the X-axis direction.

As shown in FIG. 25 and FIG. 26, in the display panel 18 according to the ninth exemplary embodiment, a right-eye red pixel 44RRpx and a left-eye red pixel 44LRpx are arranged by being corresponded to a prescribed cylindrical lens 3a of the lenticular lens 3.

The boundary line between the two pixels and the neighboring pixels in the X-axis direction is tilted from the Y-axis direction. As a way of example, it is rotated by substantially fifteen degrees from the +Y direction towards the +X direction.

Further, the boundary line between those pixels and the neighboring pixels in the Y-axis direction is formed in parallel to the X-axis direction. That is, each of these pixels 44RRpx and the like has a parallelogram shape. As a result, the area of the pixels 44RRpx and the like contributing to display forms a parallelogram shape as well.

A right-eye green pixel 44RGmx is arranged next to the right-eye red pixel 44RRpx in the −Y direction, and a left-eye green pixel 44LGmx is arranged next to the left-eye red pixel 44LRpx in the −Y direction. Compared to the two red pixels neighboring to each other in the +Y direction, the two green pixels are formed by having the boundary line between with the neighboring pixel in the X-axis direction rotated substantially by fifteen degrees from the +Y direction towards the −X direction. The tilt direction is an opposite direction from that of the red pixels described above.

Further, a right-eye blue pixel 44RBpx is arranged next to the right-eye green pixel 44RGmx in the −Y direction, and a left-eye blue pixel 44LBpx is arranged next to the left-eye green pixel 44LGmx in the −Y direction. The two blue pixels are formed by having the boundary line between with the neighboring pixel in the X-axis direction rotated substantially by fifteen degrees from the +Y direction towards the +X direction, and the blue pixels are in the same shape as that of the red pixel. In the ninth exemplary embodiment, as described above, the boundary lines between the neighboring pixels in the X-axis direction are arranged by being tilted in different directions for every other line. Thus, considering the neighboring pixels in the Y-axis direction, there is formed a pair of two pixels.

Further, in the −Y direction of the right-eye blue pixel 44RBpx and the left-eye blue pixel 44LBpx, a right-eye red pixel 44RRmx and a left-eye red pixel 44LRmx, a right-eye green pixel 44RGpx and a left-eye green pixel 44LGpx, and a right-eye blue pixel 44RBmx and a left-eye blue pixel 44LBmx are arranged, respectively, in this order.

As shown in FIG. 26 and FIG. 27, the pixel whose boundary line between with the neighboring pixel in the image distributing direction (X-axis direction) is tilted from the +Y direction towards the +X direction and the pixel whose boundary line is tilted from the +Y direction towards the −X direction are arranged in such a manner that the layout patterns of the convex structures thereof are to be in a line-symmetrical relation with respect to a segment that extends towards the direction (Y-axis direction) orthogonal to the image distributing direction (X-axis direction). Structures of the ninth exemplary embodiment other than those described above are the same as the structures of the above-described eighth exemplary embodiment.

The display panel 18 of the ninth exemplary embodiment has the structures and functions such as those described above, so that the following effects can be achieved in addition to the effects substantially same as those described in (1)-(4), and (16).

(18) In the display panel 18 of the ninth exemplary embodiment, the display area of each pixel 44RRpx and the like is formed in a parallelogram shape, and those pixels are arranged in a zigzag manner in the Y-axis direction. Further, the pixels as a pair in the Y-axis direction are arranged in such a manner that the layout pattern of the convex structures thereof are to be in a line-symmetrical relation with respect to a segment that extends towards the direction orthogonal to the image distributing direction. As a result, it becomes possible to exhibit a compensation effect for decreasing the influence of the convex structures 51 by using the pixels neighboring to each other in the Y-axis direction.

(19) In the display panel 18, the display area of each pixel 44RRpx and the like is formed in a parallelogram shape, and those pixels are arranged in a zigzag manner in the Y-axis direction. Thus, the neighboring pixels in the Y-axis direction can be arranged in parallel to the Y-axis direction, so that a sense of discomfort felt by the user can be eased compared to the case where the pixels are arranged obliquely. It is because when the pixels are arranged obliquely, the oblique directivity is visually recognized by the user so that the user feels a sense of discomfort.

(20) In the display panel 18 of the ninth exemplary embodiment, particularly the boundary lines between the neighboring pixels in the image distributing direction (X-axis direction) are tilted from the Y-axis direction. With this, the influence of non-display areas existing between the neighboring pixels can be decreased, thereby making it possible to improve the visibility.

(21) In the display panel 18 of the ninth exemplary embodiment, the length of the display area pixels cut at a segment extending in the direction (Y-axis direction) that is orthogonal to the image distributing direction (X-axis direction) can be designed to be constant at arbitrary positions in the X-axis direction. In that case, the influence of the non-display area can be eliminated completely regardless of the observing positions, so that a high-quality display can be achieved.

(22) The display panel 18 of the ninth exemplary embodiment can be applied preferably to a multi-domain type liquid crystal mode in particular, thereby making it possible to achieve a wide viewing angle display where there is no tonal reversal generated over a wide range of angles. This is because of the following reasons. That is, in the multi-domain type liquid crystal mode, a wide viewing angle can be achieved through driving the liquid crystal molecules in various directions. For that, advantages such as improving the transmittance can be obtained by arranging the side of the display area in a tilted manner.

Examples of the above-described liquid crystal mode may be an in-plane switching mode as well as a fringe field switching mode and an advanced fringe field switching mode which are lateral electric field modes like the in-plane switching mode. The ninth exemplary embodiment can be applied thereto in the same manner. Further, the exemplary embodiment can also be applied preferably to a liquid crystal mode which generates distribution of the transmittance within a single pixel by utilizing the electrode structure of the display pixels, the uneven structures, and the like.

Furthermore, in addition to each of the above-described ones, examples of the above-described liquid crystal modes may be a multi-domain vertical alignment mode, a patterned vertical alignment mode, an advanced super V mode, and the like.

In the ninth exemplary embodiment, it has been described that the layout patterns of the convex structures 51 of the neighboring pixels as a pair in the Y-axis direction are arranged to be in a line-symmetrical relation with respect to a segment that extends towards the direction (Y-axis direction) that is orthogonal to the image distributing direction (X-axis direction). However, this exemplary embodiment of the present invention is not limited only to that. It is also possible to achieve the same effect even if the layout patterns are arranged to be in a rotationally symmetric relation.

When arranging the patterns to be in line symmetry as described above, it is preferable to avoid including the convex structures arranged at positions away from a symmetry axis on the right and left sides thereof by the same distance, since the effect of symmetric layout cannot be exhibited fully with such layout. This includes a case where the distance from the symmetric axis is "0".

The same is true for the case of the rotational symmetry, since the rotation axis becomes the symmetry axis.

Next, a tenth exemplary embodiment of the present invention will be described by referring to FIG. 28-FIG. 30.

Figure 28:
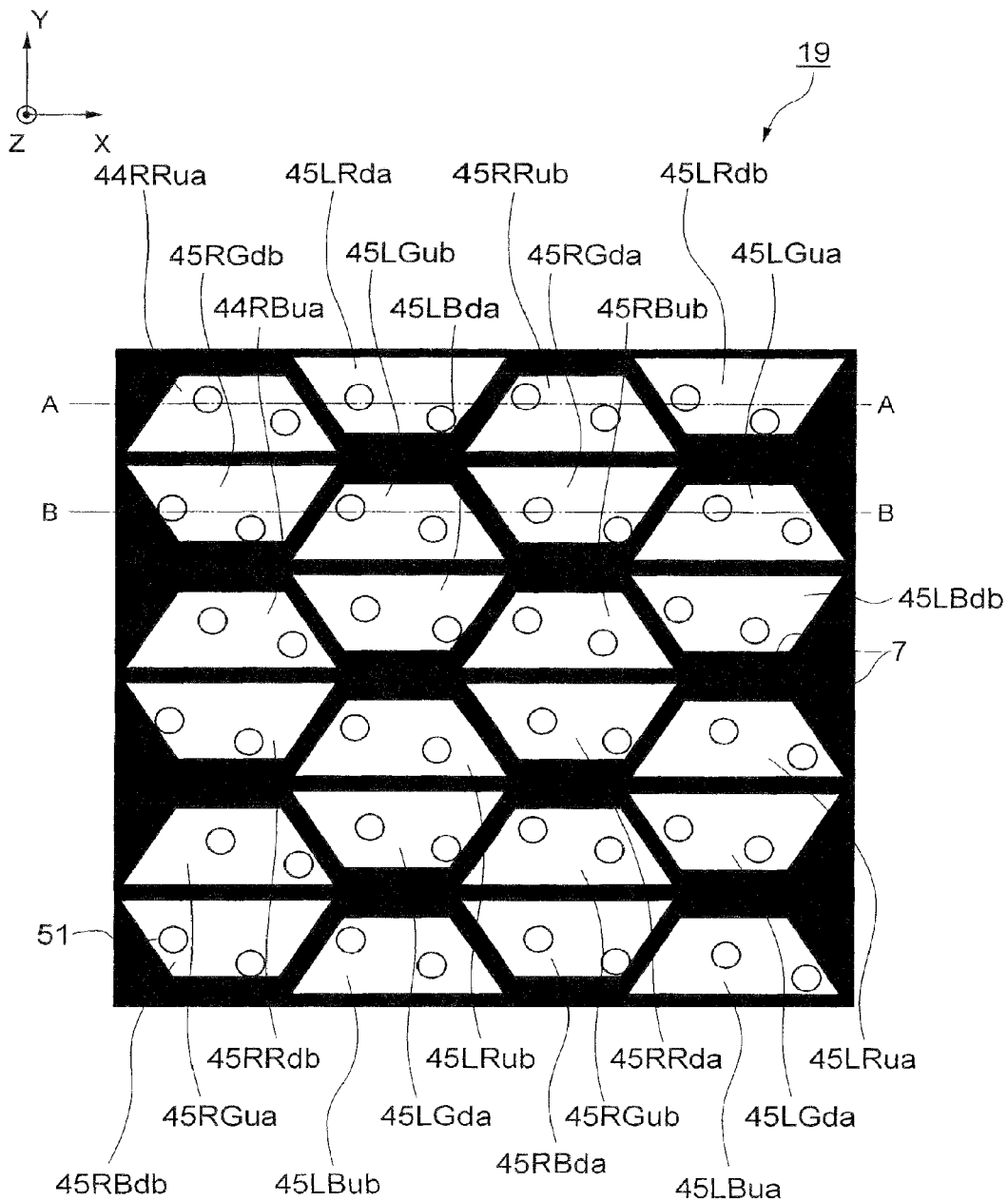
FIG. 28 is a top plan view showing pixels of a display panel according to a tenth exemplary embodiment of the present invention.
Figure 29:
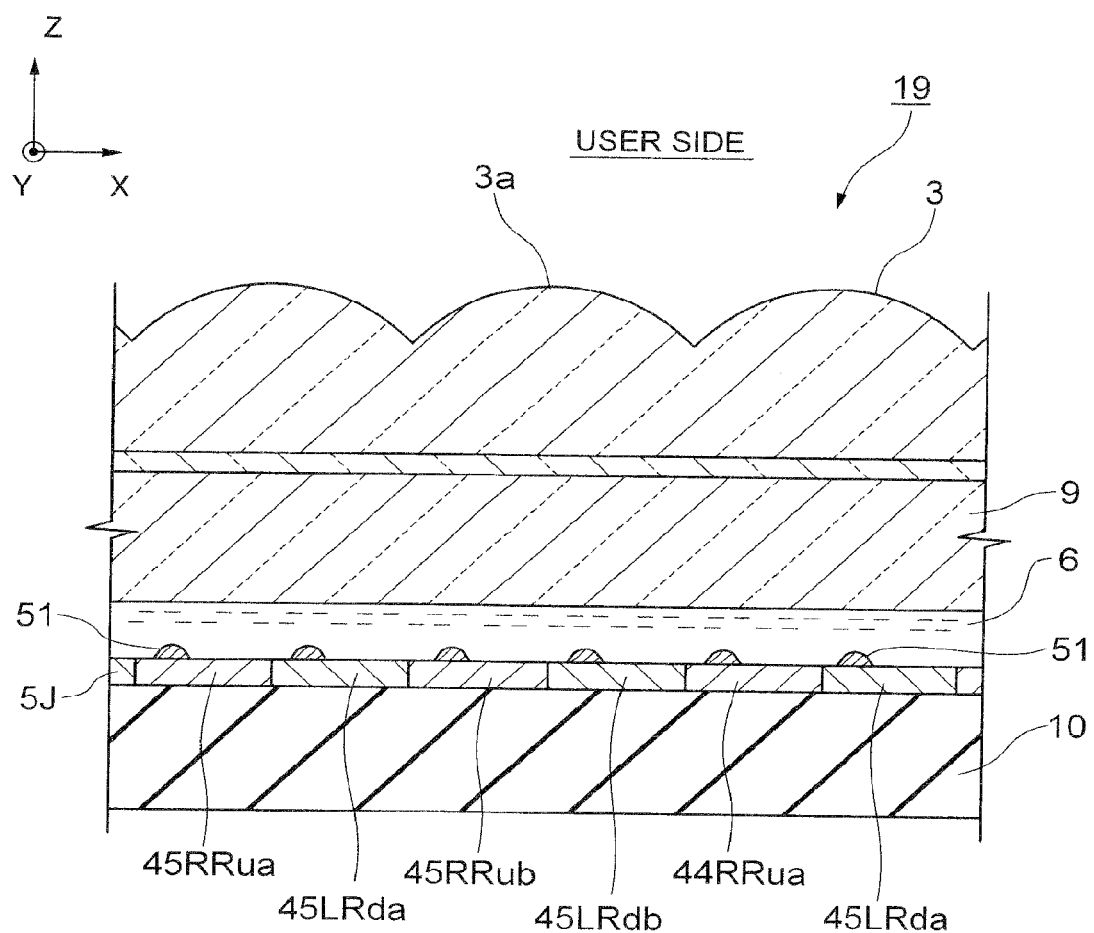
FIG. 29 is a sectional view showing the display panel taken along the line A-A shown in FIG. 28.
Figure 30:
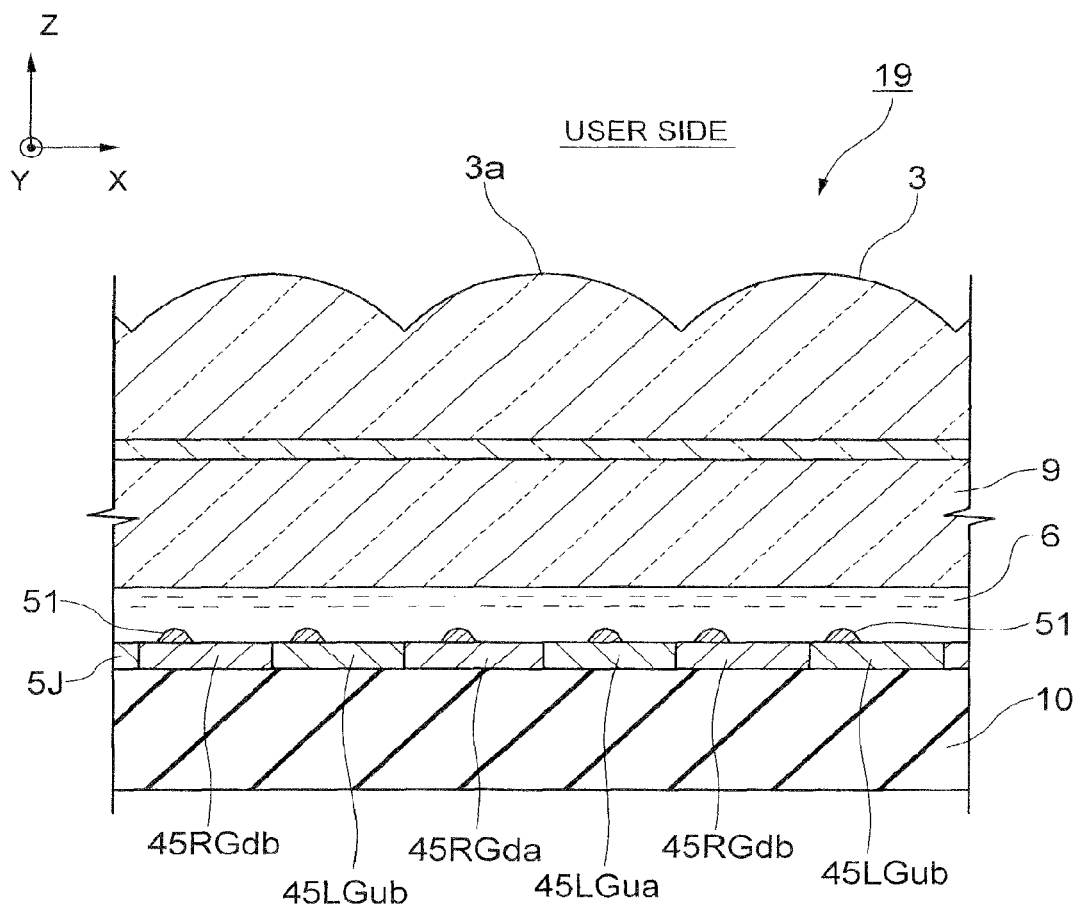
FIG. 30 is a sectional view showing the display panel taken along the line B-B shown in FIG. 28.

FIG. 28 is a top plan view showing pixels of a display panel 19 according to the tenth exemplary embodiment, FIG. 29 is a sectional view showing the display panel 19 taken along the line A-A shown in FIG. 28, and FIG. 30 is a sectional view showing the display panel 19 taken along the line B-B shown in FIG. 28.

Compared to the above-described ninth exemplary embodiment, in the display panel 19 of the tenth exemplary embodiment, the layout pattern of convex structures 51 on reflection plates 5J is different even though the layout of the colors is the same. That is, regarding the layout of the colors, the three primary colors of red, blue, and green are alternately arranged in the direction (Y-axis direction) that is orthogonal to the image distributing direction (X-axis direction).

Further, the shape of the pixel in the tenth exemplary embodiment is basically a trapezoid, whereas it is basically a parallelogram in the above-described ninth exemplary embodiment.

In the display panel 19 of the tenth exemplary embodiment, for the convex structures 51 on the reflection plates 5J, basically one kind of layout pattern is arranged in a rotationally symmetric manner. However, those are arranged at relatively different positions with respect to the cylindrical lenses 3a that configure the lenticular lens 3 as the image distributing device, thereby exhibiting the effects of compensating with each other in the X-axis direction as well as the Y-axis direction.

That is, as shown in FIG. 28 and FIG. 29, in the display panel 19 according to the tenth exemplary embodiment, a right-eye red pixel 45RRua and a left-eye red pixel 45LRda are arranged by being corresponded to a prescribed cylindrical lens 3a of a lenticular lens 3. The right-eye red pixel 45RRua has a trapezoid shape, and it is arranged with the upper side facing in the +Y direction. Similarly, the left-eye red pixel 45LRda has a trapezoid shape, and it is arranged with the lower side facing in the +Y direction.

Now, the rule of naming the pixels in the tenth exemplary embodiment will be described. Referring to the right-eye red pixel 45RRua, for example, the first "R" following numerical figure "45" indicates that it is a pixel for the right eye, and the next "R" following the first "R" indicates that it is a pixel for red. Further, "u" following the latter "R" indicates that the trapezoid-shaped pixel is arranged with the upper side facing in the +Y direction, and the last letter "a" indicates the layout type of the convex structures on the reflection plate.

For the left-eye pixel, "L" comes after the numerical figure "45", and G or B is used for the green pixel or the blue pixel. For the pixel arranged with the lower side of the trapezoid facing in the +Y direction, a letter "d" is used instead of "u". The pixel with a last letter "b" instead of "a" indicates that the layout of the convex structures on the reflection plate is a pattern "b" that is different from the pattern "a" mentioned above. Regarding the pattern "a" and the pattern "b", the convex structures thereof are arranged to be in a rotational symmetric relation.

Referring to FIG. 28 according to this rule of naming, it can be seen that a right-eye green pixel 45RGdb and a left-eye green pixel 45LGub are arranged next to the right-eye red pixel 45RRua and the left-eye red pixel 45LRda, respectively, on the −Y direction side. That is, the neighboring pixels in the Y-axis direction are arranged to have the upper sides thereof or the lower sides thereof facing with each other, and the convex structures 51 on the reflection plates 5J are arranged in the layout patterns to be rotationally symmetrical. However, the convex structures 51 on the reflection plates 5J of the left-eye pixel and the right-eye pixel are arranged to be in the same layout pattern.

Similarly, a right-eye blue pixel 45RBua and a left-eye blue pixel 45LBda, a right-eye red pixel 45RRdb and a left-eye red pixel 45LRub, a right-eye green pixel 45RGua and a left-eye green pixel 45LGda, a right-eye blue pixel 45RBdb and a left-eye blue pixel 45LBub are arranged in this order next to the right-eye green pixel 45RGdb and the left-eye green pixel 45LGub, respectively, in the −Y direction. That is, looking into the pattern of the convex structures 51 on the reflection plates 5J, there generates a compensation effect for decreasing the influence of the convex structures for the direction that is orthogonal to the image distributing direction.

In the tenth exemplary embodiment, the boundary lines between the neighboring pixels in the image distributing direction (X-axis direction) are arranged by being tilted from the Y-axis direction as in the case of the ninth exemplary embodiment described above. For the tilt angles with respect to the Y-axis direction, the clockwise tilted direction and the counterclockwise tilted direction are employed alternately for each pixel, thereby forming zigzag lines extending towards the Y-axis direction.

In the above-described ninth exemplary embodiment, the zigzag lines are all the same. However, in the tenth exemplary embodiment, the twisting directions of the zigzag become opposite from each other between the neighboring pixels since the pixels are in the trapezoid shape.

Further, a right-eye red pixel 45RRub and a left-eye red pixel 45LRdb are arranged for the cylindrical lens 3a that is next to the cylindrical lens 3a to which the right-eye red pixel 45RRua and the left-eye reed pixel 45LRda correspond. That is, the patterns of the convex structures 51 on the reflection plates 5J differ in the pixels that correspond to the neighboring cylindrical lenses 3a, thereby exhibiting a compensation effect for the image distributing direction as well.

Thereafter, a right-eye green pixel 45RGda and a left-eye green pixel 45LGua, a right-eye blue pixel 45RBub and a left-eye blue pixel 45LBdb, a right-eye red pixel 45RRda and a left-eye red pixel 45LRua, a right-eye green pixel 45RGub and a left-eye green pixel 45LGdb, a right-eye blue pixel 45RBda and a left-eye blue pixel 45LBua are arranged next to each other on the −Y direction side in this order.

Structures of the tenth exemplary embodiment other than those described above are the same as the structures of the above-described seventh exemplary embodiment.

The display panel 19 of the tenth exemplary embodiment has the structures and functions such as those described above, so that the following effects can be achieved in addition to the effects substantially the same as those described in (1)-(4), and (16).

(23) In the display panel 19 of the tenth exemplary embodiment, the convex structures 51 on the reflection plates 5J are arranged in a rotationally symmetrical manner in the X-axis direction and the Y-axis direction as well. Thus, the compensation effect for decreasing the influence of the convex structures 51 can be exhibited two-dimensionally, which makes it possible to achieve a high image quality.

(24) In the display panel 19 of the tenth exemplary embodiment, the display area of each pixel is formed in a trapezoid shape. Thus, the influence of the non-display areas existing between the neighboring pixels can be decreased, so that the visibility can be improved. In addition, the area contributing to display can be secured sufficiently large, so that a bright display can be achieved.

The tenth exemplary embodiment has been described by referring to the case of a reflective display panel. However, when it is applied to a case of a transflective display panel, a reflective display area may be provided on the upper side of each pixel, and a transmissive display area may be provided on the lower side thereof.

With this, the reflection areas can be arranged collectively in the pixels neighboring to each other in the Y-axis direction. Therefore, formation of the reflection plate and the like becomes easy, which makes it easy to achieve high definition.

Further, inversely from the above-described case, the transmissive display area may be provided on the upper side of each pixel, and the reflective display area may be provided on the lower side thereof.

Next, an eleventh exemplary embodiment of the present invention will be described by referring to FIG. 31-FIG. 34.

Figure 31:
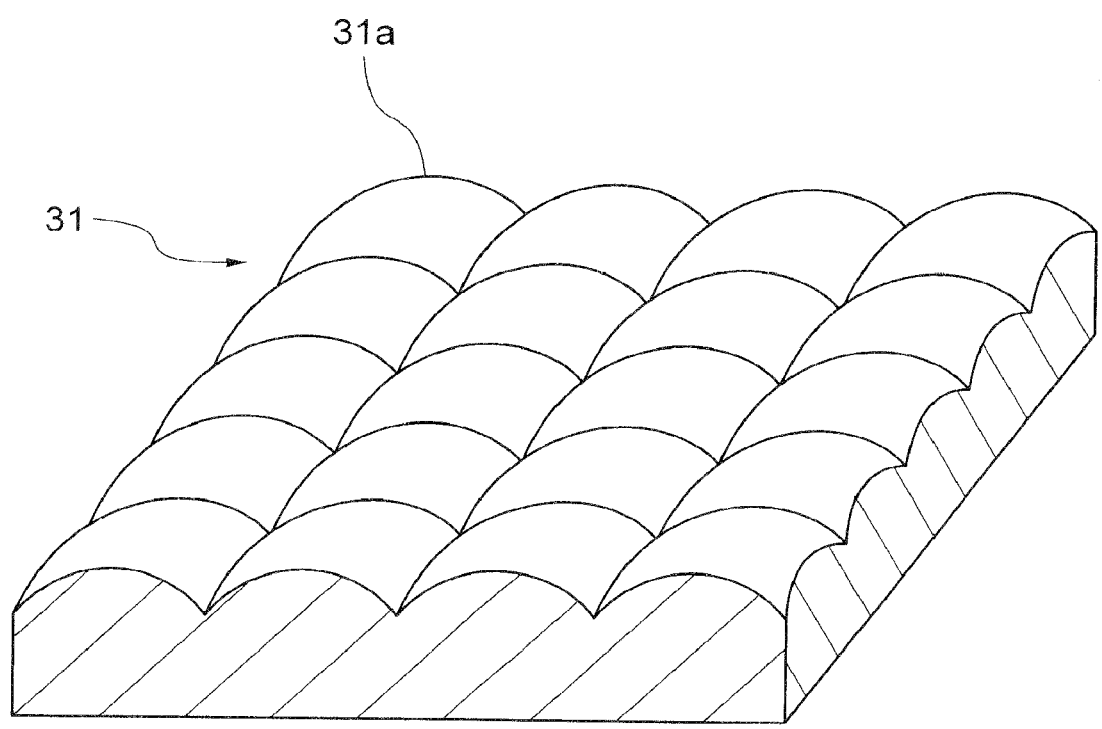
FIG. 31 is a perspective view of a fly eye lens that is an image distributing device according to an eleventh exemplary embodiment of the present invention.
Figure 32:
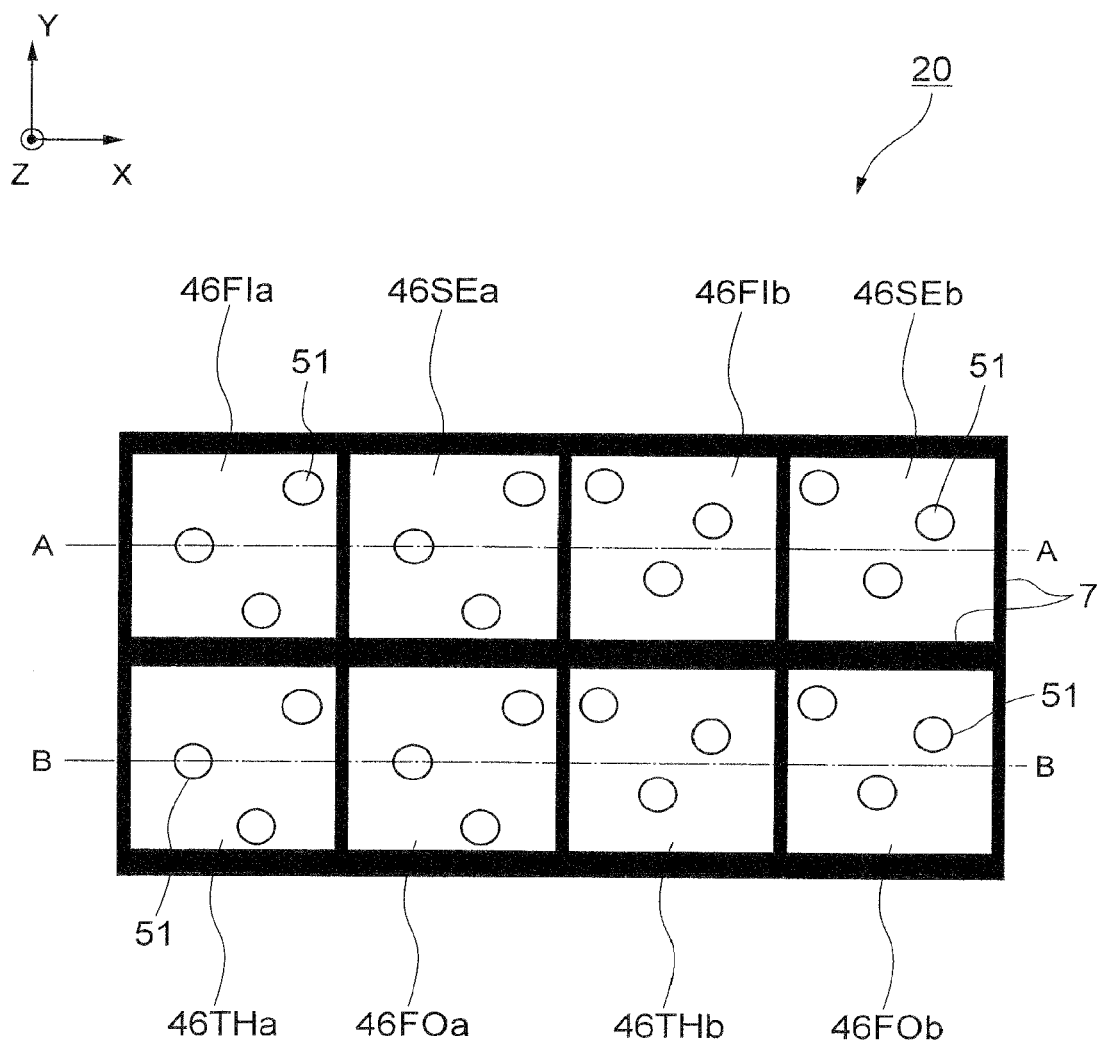
FIG. 32 is a top plan view showing pixels of a display panel according to the eleventh exemplary embodiment.
Figure 33:
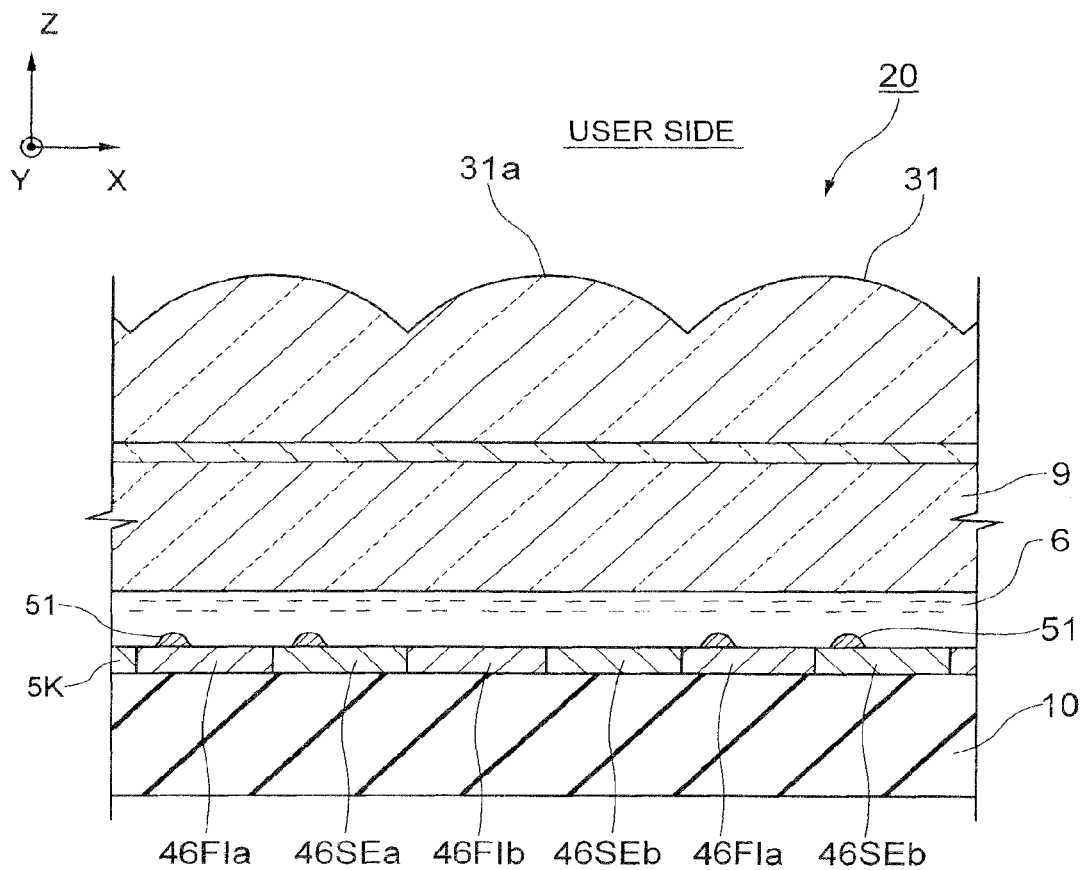
FIG. 33 is a sectional view showing the display panel taken along the line A-A shown in FIG. 32.
Figure 34:
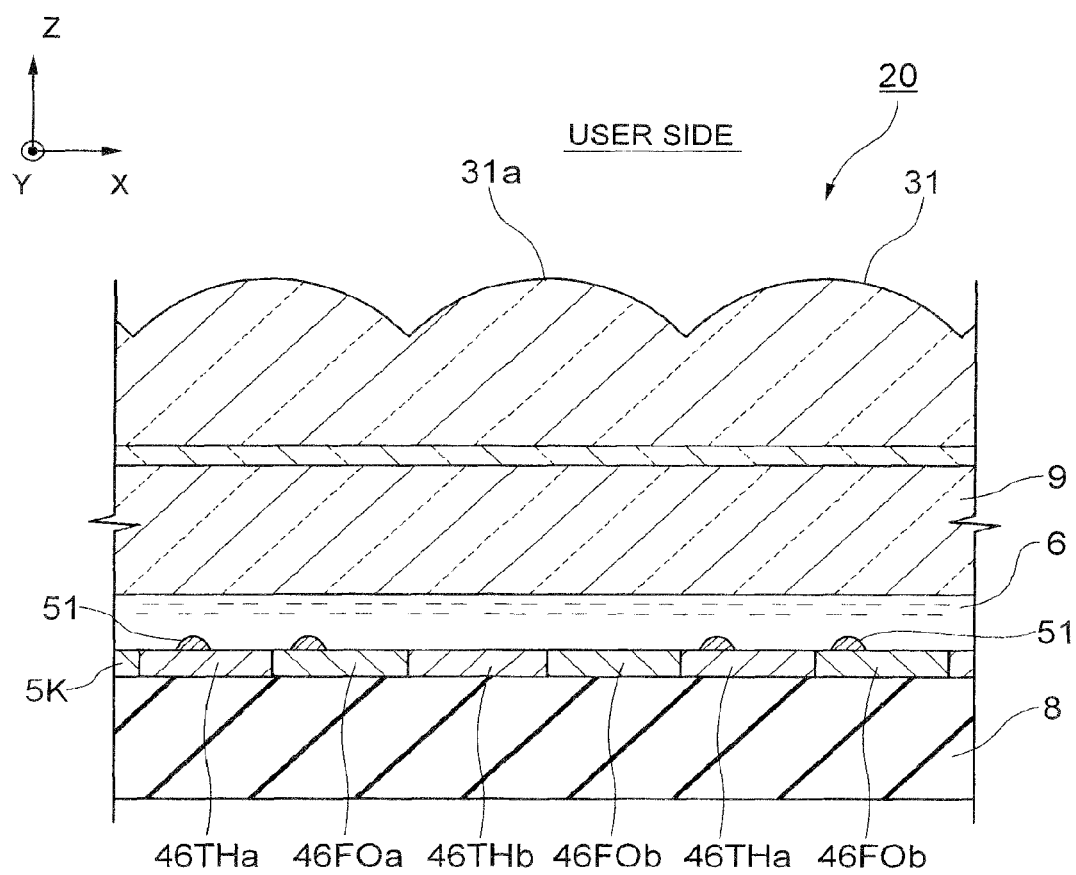
FIG. 34 is a sectional view showing the display panel taken along the line B-B shown in FIG. 32.

FIG. 31 is a perspective view showing a fly eye lens 31 that is an image distributing device according to the eleventh exemplary embodiment. FIG. 32 is a top plan view showing pixels of a display panel 20 according to this exemplary embodiment, FIG. 33 is a sectional view showing the display panel 20 taken along the line A-A shown in FIG. 32, and FIG. 34 is a sectional view showing the display panel 20 taken along the line B-B shown in FIG. 32.

The eleventh exemplary embodiment is different from the above-described first exemplary embodiment in respect that it uses the fly eye lens 31 as the image distributing device, whereas the first exemplary embodiment uses the lenticular lens 3.

As described above, the lenticular lens 3 is a lens array where cylindrical lenses 3a are arranged one dimensionally. The fly eye lens 31, however, is a lens array where lenses 31a are arranged two-dimensionally.

With the use of the fly eye lens 31, a two-dimensional image distribution effect can be exhibited. Further, it is configured to suppress deterioration of the image quality caused due to combining convex structures 51 of reflection plates 5K and the image distributing device so as to achieve two-dimensional compensation.

That is, as shown in FIG. 31-FIG. 34, in the display panel 20 of the eleventh exemplary embodiment, a first viewpoint pixel 46FIa, a second viewpoint pixel 46SEa, a third viewpoint pixel 46THa, and a fourth viewpoint pixel 46FOa are arranged by being corresponded to a prescribed lens 31a that configures the fly eye lens 31.

As a way of example, the second viewpoint pixel 46SEa is arranged next to the first viewpoint pixel 46FIa in the +X direction, and the third viewpoint pixel 46THa is arranged next to the first viewpoint pixel 46FIa in the −Y direction. Further, the fourth viewpoint pixel 46FOa is arranged next to the second viewpoint pixel 46SEa in the −Y direction. Those four pixels form a pixel unit, and the pixel unit is arranged by being corresponded to a lens 31a.

Further, looking into a lens 31a that is next to the aforementioned lens 31a in the +X direction, a first viewpoint pixel 46FIb, a second viewpoint pixel 46SEb, a third viewpoint pixel 46THb, and a fourth viewpoint pixel 46FOb are arranged in the same manner.

The patterns of the convex structures 51 on the reflection plates 5K differ between the first viewpoint pixel 46FIa and the first viewpoint pixel 46FIb, and it is configured to be able to suppress deterioration of the image quality caused due to combining the convex structures 51 and the image distributing device.

An example of such patterns may be a case where relative coordinates within each pixel are inconsistent with each other between the convex structures in the first viewpoint pixel 46FIa and the first viewpoint pixel 47FIb.

Further, the pixels other than the first viewpoint pixels are configured in the same manner as well.

Furthermore, a pixel unit including the first viewpoint pixel 46FIb, the second viewpoint pixel 46SEb, the third viewpoint pixel 46THb, and the fourth viewpoint pixel 46FOb are arranged as a pixel unit that is next to the pixel unit including the first viewpoint pixel 46FIa, the second viewpoint pixel 46SEa, the third viewpoint pixel 46THa, and the fourth viewpoint pixel 46FOa in the X-axis direction or the Y-axis direction. The two pixel units are arranged in a grid-like pattern.

Structures of the eleventh exemplary embodiment other than those described above are substantially the same as the structures of the above-described first exemplary embodiment.

The display panel 20 of the eleventh exemplary embodiment has the structures and functions such as those described above, so that the following effects can be achieved in addition to the effects substantially same as those described in (1)-(4).

(25) The display panel 20 of the eleventh exemplary embodiment uses the fly eye lens 31 that has the two-dimensional image distribution effect. Thus, when the user changes the viewing angle two-dimensionally, the user can visually recognize different images. This makes it possible to improve the display quality. Particularly, when displaying a stereoscopic image, it is possible to display images having parallax in the vertical direction as well. Thus, a more effective display can be achieved by changing the angles for viewing the display panel 20. Furthermore, it becomes possible to recognize the stereoscopic image even when the screen is rotationally placed. Therefore, the exemplary embodiment can be preferably applied to portable-type terminals such as portable telephones in particular.

The eleventh exemplary embodiment has been described by referring to the case of using the fly eye lens as the two-dimensional image distributing device. However, the exemplary embodiment of the present invention is not limited only to that. The exemplary embodiment can also be applied in the same manner to a case of using a parallax barrier in which pin holes are arranged two-dimensionally.

When the two-dimensional image distributing device is used as in the case of the eleventh exemplary embodiment, the non-separating effect in the Y-axis direction that is orthogonal to the X-axis direction, which is obtained when using the one-dimensional image distributing device, cannot be utilized. Thus, improvements in the image quality by the superposition effect in that direction cannot be expected. That is, in the case of using the one-dimensional image distributing device, there is a possibility of decreasing the influence of the convex structures 51 by the superposition effect in the Y-axis direction that is orthogonal to the X-axis direction through arranging the convex structure 51 at a certain point of a pixel. Meanwhile, in the case of using the two-dimensional image distributing device, the convex structure 51 gives an influence necessarily to a corresponding point on the observed surface.

Therefore, compensation with the neighboring pixel units works as an extremely important measure to improve the display quality.

Next, a twelfth exemplary embodiment of the present invention will be described by referring to FIG. 35 and FIG. 36.

Figure 35:
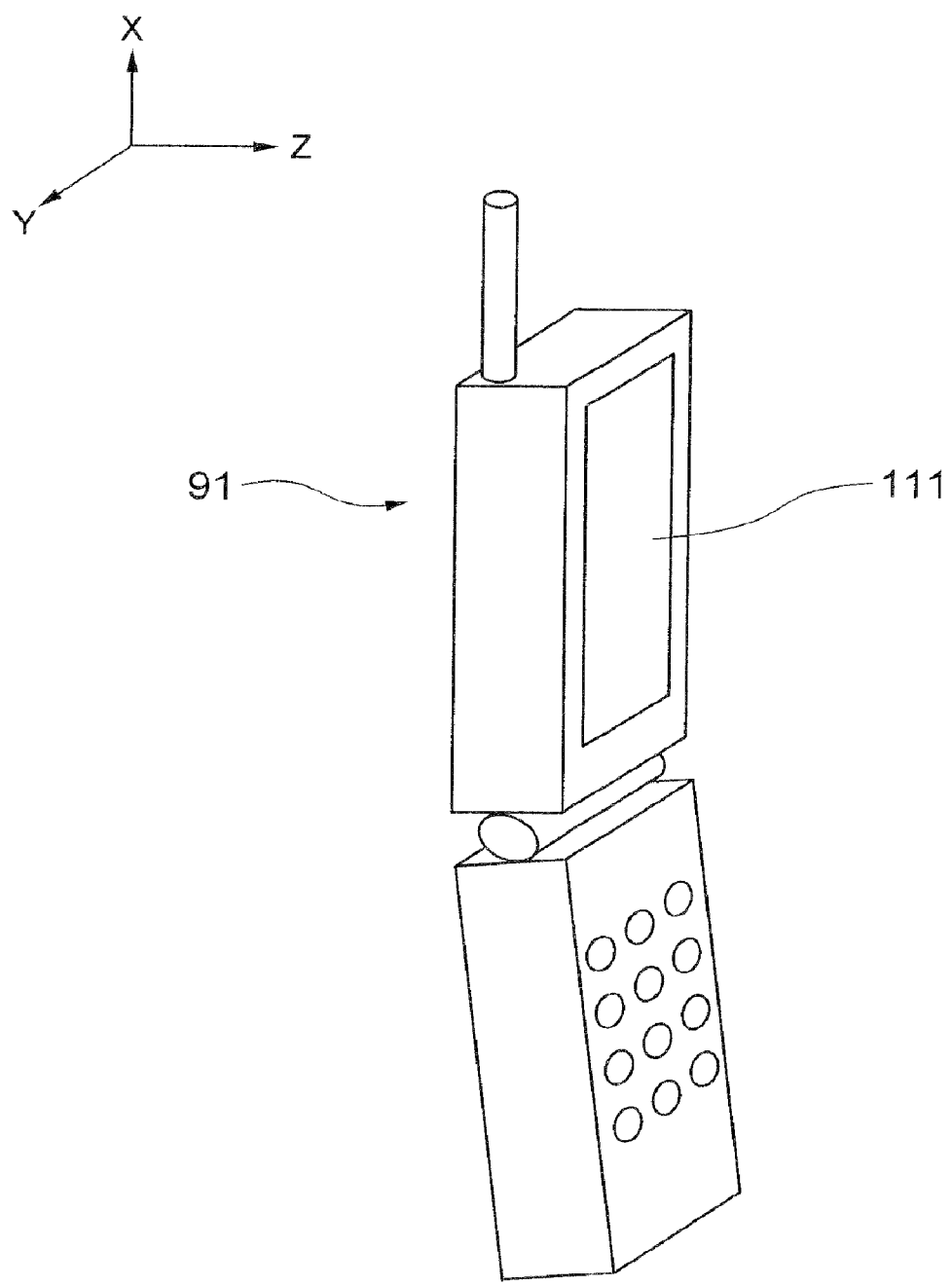
FIG. 35 is a perspective view showing a terminal device according to a twelfth exemplary embodiment of the present invention.
Figure 36:
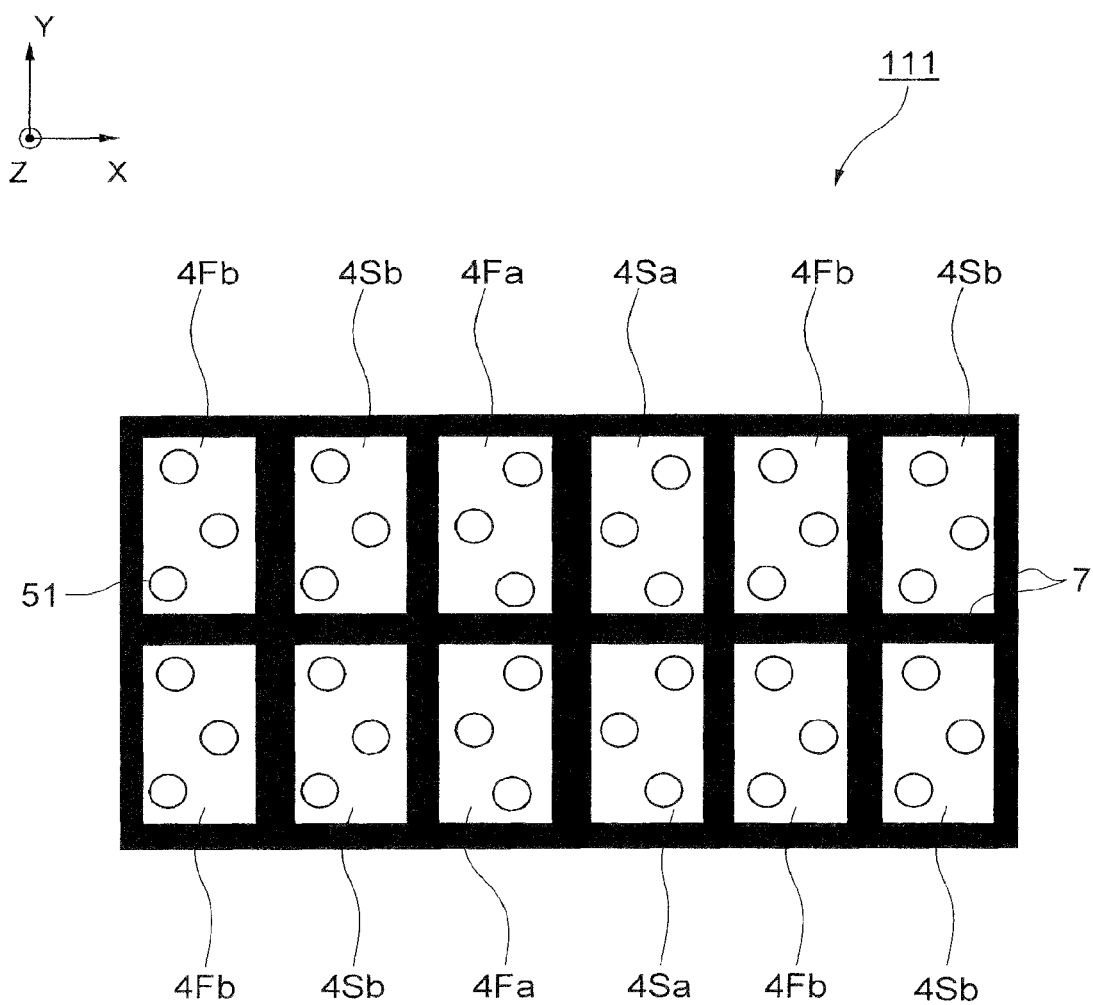
FIG. 36 is a top plan view showing pixels of a display panel according to the twelfth exemplary embodiment.

FIG. 35 is a perspective view showing a terminal device 91 according to the twelfth exemplary embodiment, and FIG. 36 is a top plan view showing pixels of a display panel 111 according to this exemplary embodiment As shown in FIG. 35 and FIG. 36, the display panel 111 of the twelfth exemplary embodiment is mounted into a portable telephone 91 that is a terminal device.

The twelfth exemplary embodiment is different from the above-described first exemplary embodiment in respect that the Y-axis direction that is the longitudinal direction of the cylindrical lenses 3a configuring the lenticular lens 3 is the lateral direction of the image display device (i.e. the horizontal direction of the image) and that the X-axis direction that is the arranging direction of the cylindrical lenses 3a is the vertical direction (i.e. the perpendicular direction of the image).

As shown in FIG. 36, in the display panel 111 according to the twelfth exemplary embodiment, a pixel unit including a first viewpoint pixel 4Fa and a second viewpoint pixel 4Sa is arranged by being corresponded to a certain cylindrical lens 3a of the lenticular lens 3.

The arranging direction of the first viewpoint pixel 4Fa and the second viewpoint pixel 4Sa of this pixel unit is the X-axis direction that is the arranging direction of the cylindrical lenses 3a, which is the vertical direction (perpendicular direction) of the screen. Further, a first viewpoint pixel 4Fb and a second viewpoint pixel 4Sb are arranged next to the first viewpoint pixel 4Fa and the second viewpoint pixel 4Sa in the X-axis direction. The structure of these pixels is the same as that of the pixels 4La, 4Ra, 4Lb, and 4Rb of the first exemplary embodiment described above.

Structures of the twelfth exemplary embodiment other than those described above are substantially the same as the structures of the above-described first exemplary embodiment.

Next, actions of an image display device according to the twelfth exemplary embodiment will be described. The basic actions thereof are the same as those of the first exemplary embodiment. However, the images to be displayed are different.

That is, the first viewpoint pixels 4Fa and 4Fb of the display panel 111 display the image for the first viewpoint, and the second viewpoint pixels 4Sa and 4Sb display the image for the second viewpoint. The image for the first viewpoint and the image for the second viewpoint are not stereoscopic images having parallax from each other but plane images. Further, both images may be images independent from each other or may be images showing information related to each other.

The display panel 111 of the twelfth exemplary embodiment has the structures and functions such as those described above, so that the following effects can be achieved in addition to the effects substantially same as those described in (1)-(4).

(26) In the display panel 111 of the twelfth exemplary embodiment, deterioration of the image quality caused due to combining the lenticular lens as the image distributing device and the convex structure of the reflection plate can be suppressed by compensating it with each other between the neighboring pixel units in the image distributing direction (X-axis direction). Therefore, in addition to enabling a high image quality, there is also an advantage that the user can select and observe either the image for the first viewpoint or the image for the second viewpoint by simply changing the angle of the portable telephone 91.

(27) Particularly, when there is relevance between the first viewpoint image and the second viewpoint image, each image can be switched and viewed alternately by a simple way such as changing the viewing angle. Therefore, it is possible to improve convenience greatly.

(28) In another case where the first viewpoint image and the second viewpoint image are arranged in the lateral direction, for example, it may happen that different images are observed by the right eye and the left eye depending on the observing position. In that case, the user becomes confused and cannot recognize the images at each viewpoint. However, images for a plurality of viewpoints can be arranged in the vertical direction with the twelfth exemplary embodiment. Thus, the user can always recognize the images for each viewpoint with both eyes, so that it is possible to achieve such an effect that those images can be easily recognized.

It is also possible to combine the twelfth exemplary embodiment with one of the third to eleventh exemplary embodiments described above or with one of thirteenth to sixteenth exemplary embodiments to be described later.

Further, the first to eleventh exemplary embodiment have been described by referring to the image display device loaded in a portable telephone or the like for displaying a stereoscopic image by supplying images having parallax from each other to the right and left eyes of a single user, or to the image display device for supplying a plurality of kinds of image to a single user simultaneously. However, the image display devices according to the exemplary embodiments of the present invention are not limited only to those. The image display device may include a large-scaled display panel, and supply a plurality of images that are different from each other to a plurality of observers. The same is true for the thirteenth to sixteenth exemplary embodiments to be described later.

Further, with the twelfth exemplary embodiment, both eyes recognize only the first viewpoint pixels or the second viewpoint pixels. Therefore, there is no problem even when the patterns of the uneven structures are different for the first viewpoint pixels and the second viewpoint pixels.

Furthermore, a backlight may be mounted to the display panels 1, 12 to 20, and 111 of the first exemplary embodiment and the third to twelfth exemplary embodiments as in the case of the terminal device according to the second exemplary embodiment.

Next, a thirteenth exemplary embodiment of the present invention will be described by referring to FIG. 37 and FIG. 38.

Figure 37:
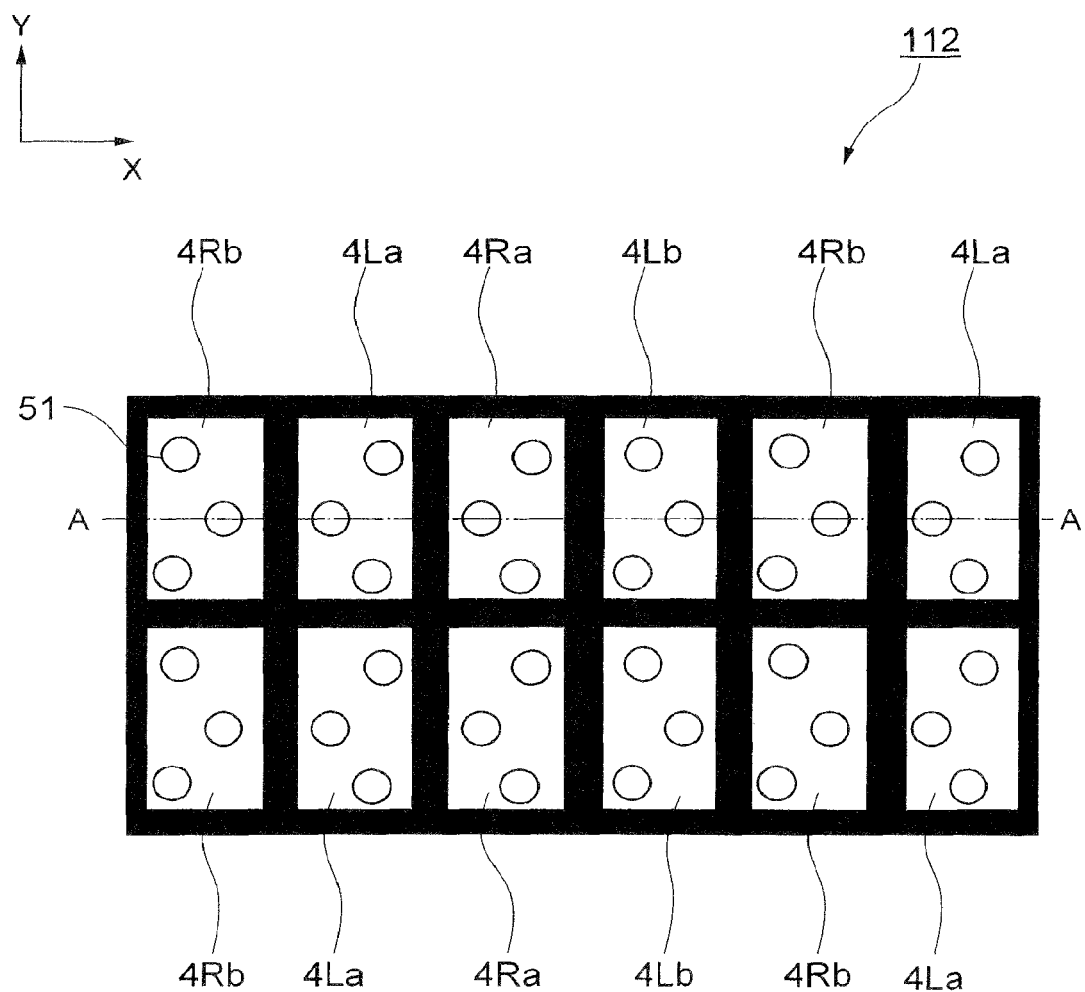
FIG. 37 is a top plan view showing pixels of a display panel according to a thirteenth exemplary embodiment of the present invention.
Figure 38:
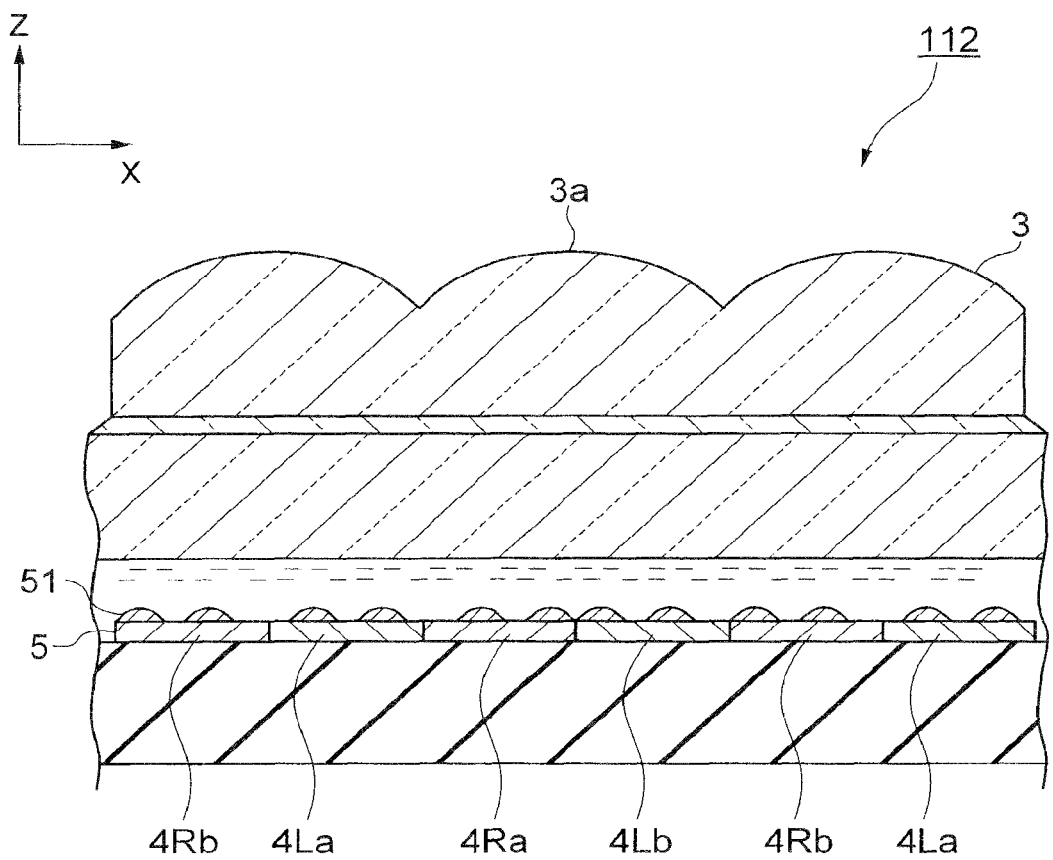
FIG. 38 is a sectional view showing the display panel taken along the line A-A shown in FIG. 37.

FIG. 37 is a top plan view showing pixels of a display panel according to the thirteenth exemplary embodiment, and FIG. 38 is a sectional view showing the display panel taken along the A-A line shown in FIG. 37.

Compared to the first exemplary embodiment of the present invention described above, the pixels configuring each pixel unit in the thirteenth exemplary embodiment include reflection plates having different convex structures. Looking into a certain pixel unit, the layout pattern of an uneven structure provided on the refection plate of a pixel for displaying an image for a specific viewpoint differs from the layout pattern of the uneven structure provided on the reflection plate of the pixel for displaying the image for the specific viewpoint in a pixel unit that is next to the certain pixel unit in the image distributing direction. When comparing the neighboring pixel units in the image distributing direction, substantially the same uneven structures are arranged on the reflection plates of the pixels that display images for different viewpoints. As described, the layout patterns of the uneven structures vary for each pixel unit in the thirteenth exemplary embodiment, whereas the layout patterns of the uneven structures in each pixel unit are substantially the same in the first exemplary embodiment described above. It is the feature of the thirteenth exemplary embodiment to achieve the compensation effect by using the neighboring pixel units.

That is, as shown in FIG. 37 and FIG. 38, in a display panel 112 according to the thirteenth exemplary embodiment, a pixel unit including a left-eye pixel 4Lb and a right-eye pixel 4Rb is arranged by being corresponded to a prescribed cylindrical lens 3a of a lenticular lens 3. As described above, the layout pattern of the convex structures 51 in the left-eye pixel 4Lb and the layout pattern of the convex structures 51 in the right-eye pixel 4Ra are different, and those are arranged to compensate with each other.

A pixel unit including a left-eye pixel 4La and a right-eye pixel 4Rb is arranged in the +X direction and the −X direction of the pixel unit mentioned above. That is, in the pixel units neighboring to each other in the X-axis direction, the uneven structures of the pixels for different viewpoints are substantially in the same layout patterns.

The display panel 112 of the thirteenth exemplary embodiment has the structures and functions such as those described above, so that the following effects can be achieved in addition to the effects substantially the same as those described in (1)-(4).

(29) In the display panel 112 of the thirteenth exemplary embodiment, the convex structures are arranged to compensate with each other between the neighboring pixel units, even though each pixel unit includes a reflection plate with different convex structures 51 from each other. Thus, a high image quality can be achieved by using the neighboring pixel units. Considering a single pixel unit alone, the user visually recognizes different reflection light by both eyes. However, it is rare in the actual use that only a single pixel unit is switched on, and similar information is displayed in the neighboring pixel units in most cases. Therefore, due to a compensation effect between the neighboring pixel units, the user can visually recognize the similar reflection light by both eyes.

This exemplary embodiment is particularly effective for a high-definition display panel. Further, it is particularly effective when the pitch of neighboring pixel units that compensate with each other, i.e. twice the pitch of the pixel unit, becomes equal to or less than the resolution power of the eyes within a stereoscopic radius.

In this exemplary embodiment, it has been described that the neighboring pixel units are used for achieving compensation. However, the present invention is not limited only to that. It is not essential for the pixel units to be next to each other. A same-structure pixel unit may be arranged by every plural numbers of units.

Figure 39:
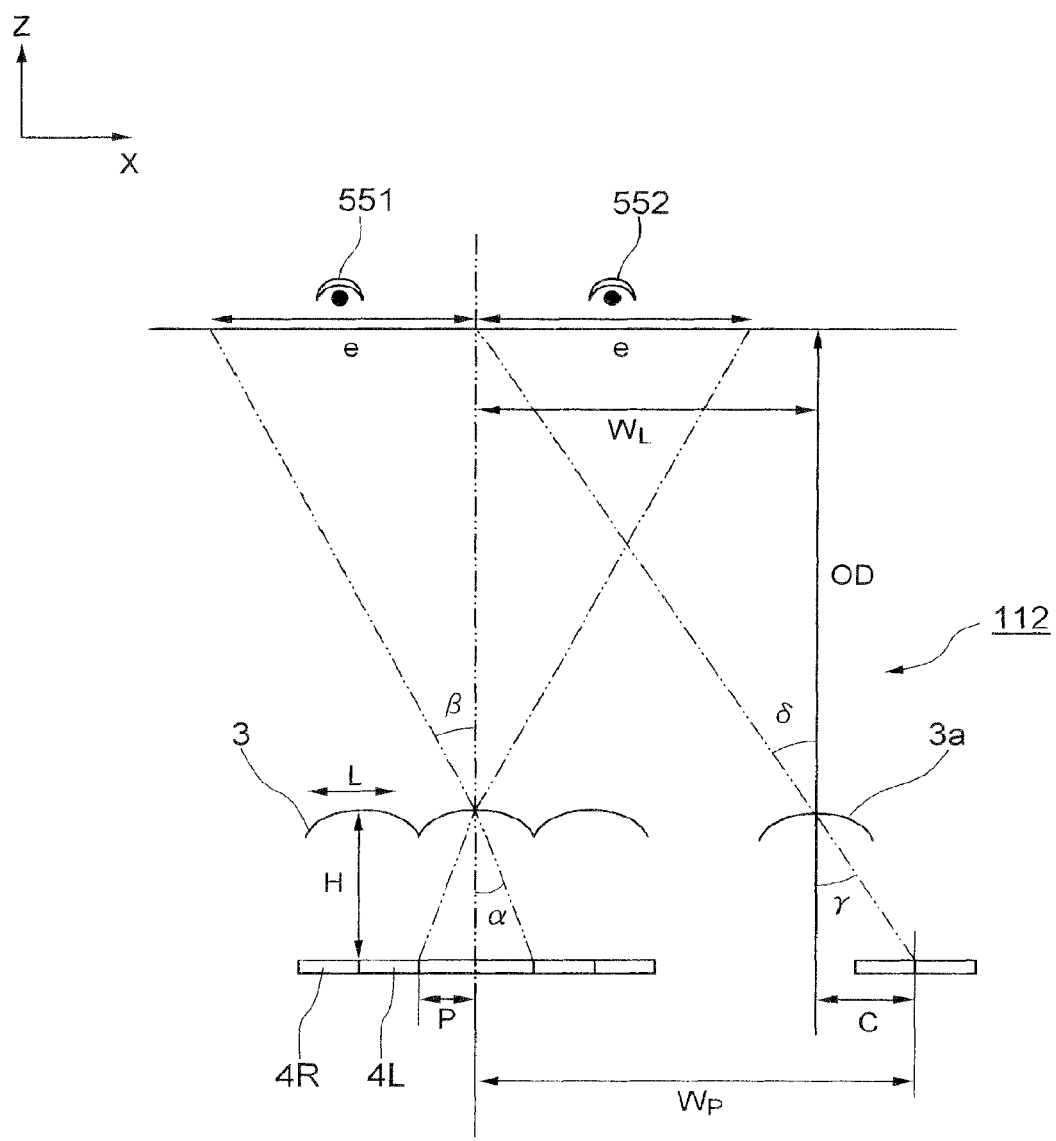
FIG. 39 is a sectional view showing an optical model when using a lenticular lens.

Now, the conditions for the lenticular lens to work as the image distributing device will be described in detail. In this exemplary embodiment, the image distributing device needs to distribute the light emitted from each pixel towards different directions from each other along the first direction (i.e. the X-axis direction) along which the left-eye pixels and the right-eye pixels are arranged. Thus, a case of exhibiting the image distribution effect to the maximum will first be described by referring to FIG. 39.

The principal point of the lenticular lens 3, i.e. the distance between the vertex and the pixel is defined as "H", the refractive index of the lenticular lens 3 is defined as "n", and the lens pitch is defined as "L". Further, the pitch of a single left-eye pixel 4L or a single right-eye pixel 4R is defined as "P". The layout pitch of a pixel unit including a single left-eye pixel 4L and a single right-eye pixel 4R is "2P" in this case.

Further, the distance between the lenticular lens 3 and an observer is defined as an optimum observing distance "OD", and the cycle of enlarged projected images of the pixels at the distance OD, i.e. each cycle of the projected image width of the left-eye pixel 4L and the right-eye pixel 4R on a virtual plane that is in parallel to a lens, which is away from the lenticular lens by the distance OD, is defined as "e". Furthermore, the distance from the center of the cylindrical lens 3a positioned at the center of the lenticular lens 3 to the center of the cylindrical lens 3a positioned at the edge of the lenticular lens 3 in the X-axis direction is defined as "WL", and the distance from the center of the display pixel including the left-eye pixel 4L and the right-eye pixel 4R positioned at the center of the reflective display panel 2 to the center of the display pixel positioned at the edge of the reflective liquid crystal panel in the X-axis direction is defined as "WP". Moreover, the incident angle and the exit angle of the light to/from the cylindrical lens 3a positioned at the center of the lenticular lens 3 are defined as "α" and "β", respectively, while the incident angle and the exit angle of the light to/from the cylindrical lens 3a positioned at the edge of the lenticular lens 3 in the X-axis direction are defined as "γ" and "δ", respectively. Furthermore, the difference between the distance "WL" and the distance "WP" is defined as "C", and the number of pixels contained in an area within the distance "WP" is defined as "2m".

Since the layout pitch L of the cylindrical lenses 3a and the layout pitch P of the pixels are mutually related, one is determined in accordance with the other. Normally, the lenticular lens is designed according to the display panel in many cases, so that the layout pitch P of the pixels is treated as a constant. Further, the refractive index n is determined through selection of a material for the lenticular lenses 3a. Meanwhile, desired values are set for the observing distance OD between the lens and the observer and for the cycle e of the pixel enlarged projection image at the observing distance OD. By using these values, the distance H between the vertex of the lens and the pixels as well as the lens pitch L are determined. Following Equations 1 to 6 apply based on Snell's law and geometrical relations. Further, following Equations 7 to 9 apply as well.

$n \times \sin \alpha = \sin \beta$ [Equation 1]

$OD \times \tan \beta = e$ [Equation 2]

$H \times \tan \alpha = P$ [Equation 3]

$n \times \sin \gamma = \sin \delta$ [Equation 4]

$H \times \tan \gamma = C$ [Equation 5]

$OD \times \tan \delta = WL$ [Equation 6]

$WP - WL = C$ [Equation 7]

$WP = 2 \times m \times P$ [Equation 8]

$WL = m \times L$ [Equation 9]

As described above, the case of exhibiting the image distribution effect to the maximum will first be considered. It is the case where the distance H between the vertex of the lenticular lens and the pixels is set equal to the focal distance f of the lenticular lens. In this case, following Equation 10 applies. Provided that the radius curvature of the lens as "r", the radius curvature r can be obtained by following Equation 11.

$f = H$ [Equation 10]

$r = H \times (n-1)/n$ [Equation 11]

The aforementioned parameters can be summarized as follows. That is, the layout pitch P of the pixels is a value determined based upon the display panel, and the observing distance OD and the cycle e of the pixel enlarged projection images are the values determined based upon the settings of the display device. The refractive index n is determined based upon the material of the lens or the like. The lens layout pitch L and the distance H between the lens and the pixels calculated from those values become the parameters for determining the position on the observing plane at which the light from each pixel is projected. The parameter for changing the image distribution effect is the curvature radius r of the lens. That is, when the distance H between the lens and the pixel is fixed, images of the pixels on the right and left sides become blurred and are not clearly separated if the curvature radius of the lens is changed from the ideal state. In other words, the range of curvature radius with which separation can become effective needs to be obtained.

Figure 40:
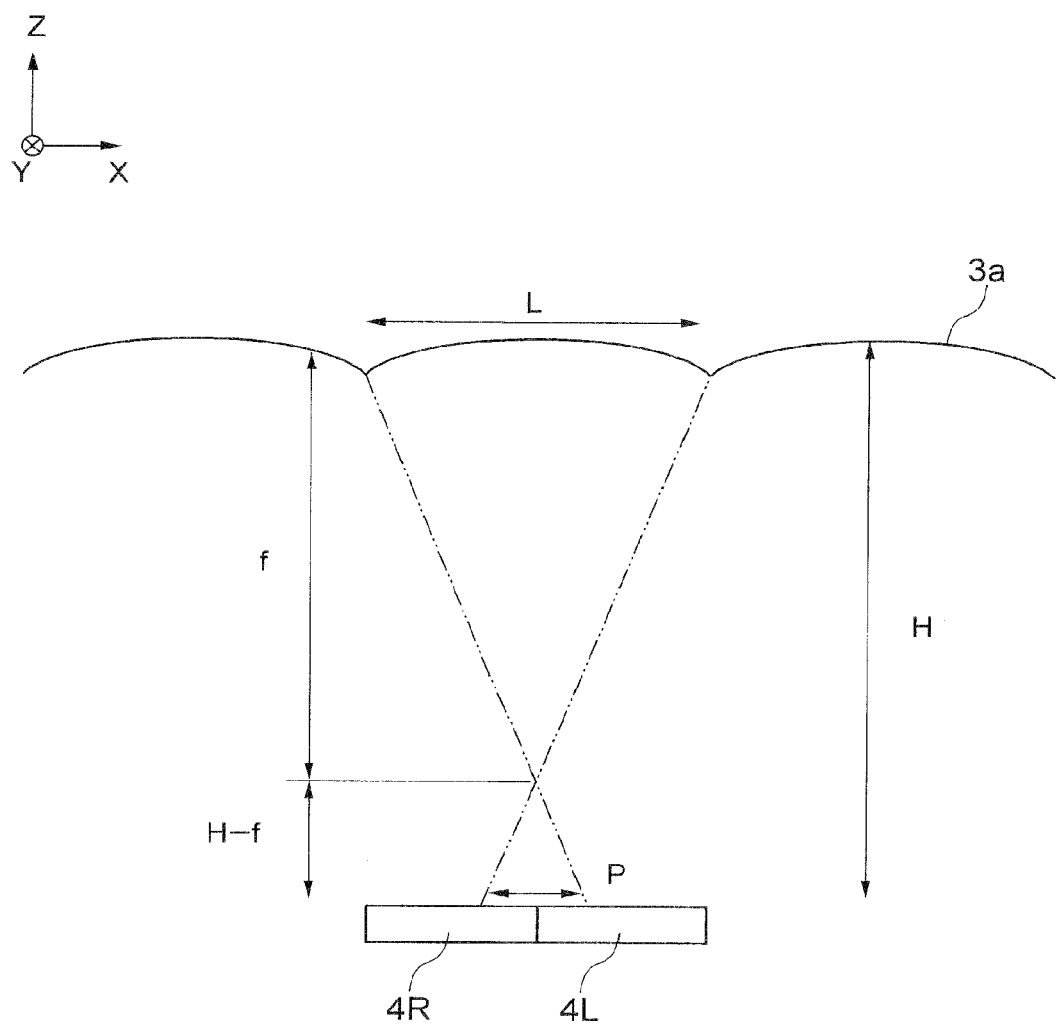
FIG. 40 is an illustration of an optical model showing the case of having the minimum radius curvature, for calculating image separating condition of the lenticular lens.

First, calculated is the minimum value of the radius curvature for having separation effect of the lens. As shown in FIG. 40, the separation effect can be exhibited when there applies a relation of similarity between a triangle having the lens pitch L as the base and the focal distance f as the height and a triangle having the pixel pitch P as the base and H−f as the height. With this, following Equation 12 applies, and the minimum value $f_{min}$ of the focal distance can be obtained.

$f_{min} = H \times L/(L+P)$ [Equation 12]

Then, the curvature radius is calculated from the focal distance. The minimum value $r_{min}$ of the curvature radius can be obtained as in following Equation 13 by using Equation 11.

$r_{min} = H \times L \times (n-1)/(L+P)/n$ [Equation 13]

Figure 41:
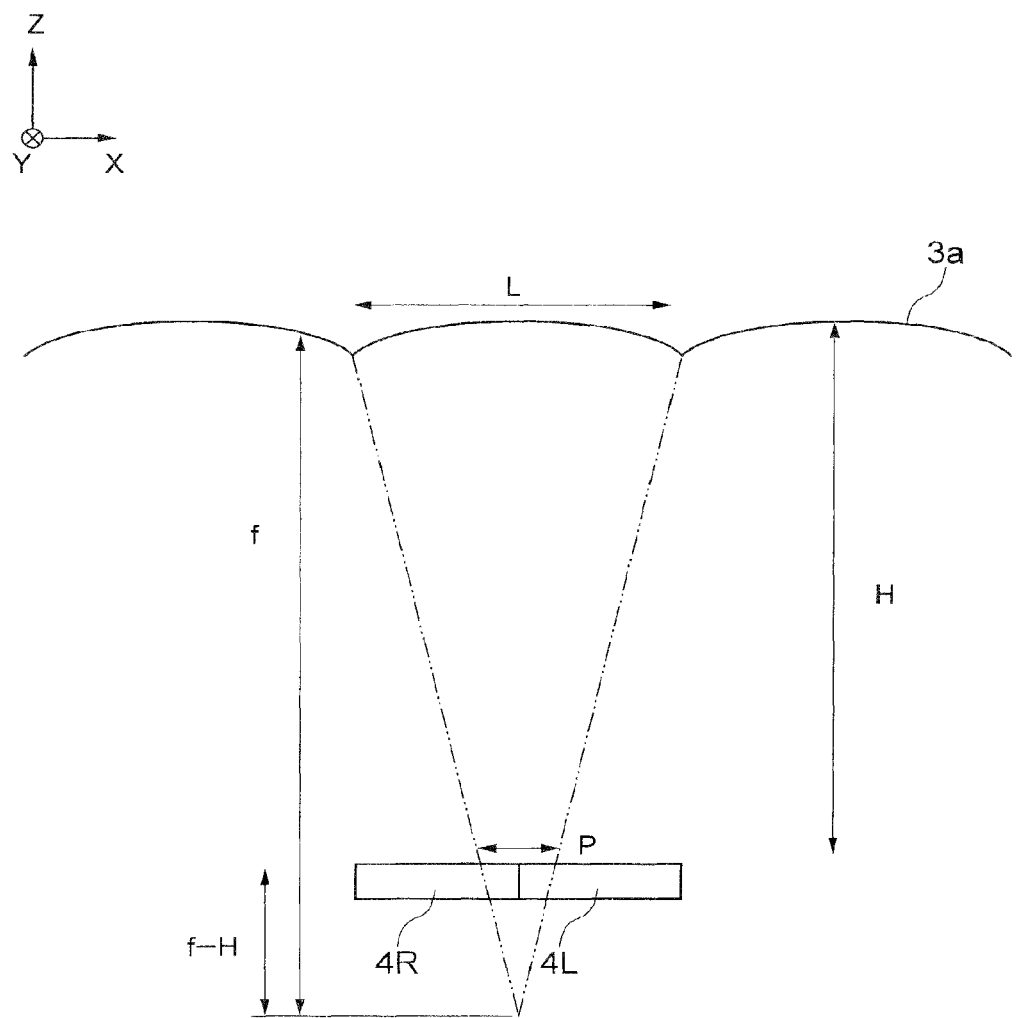
FIG. 41 is an illustration of an optical model showing the case of having the maximum radius curvature, for calculating image separating condition of the lenticular lens.

Then, the maximum value is calculated. As shown in FIG. 41, the separation effect can be exhibited when there applies a relation of similarity between a triangle having the lens pitch L as the base and the focal distance f as the height and a triangle having the pixel pitch P as the base and f−H as the height. With this, following Equation 14 applies, and the maximum value $f_{max}$ of the focal distance can be obtained.

$f_{max} = H \times L/(L-P)$ [Equation 14]

Then, the curvature radius is calculated from the focal distance. The maximum value $r_{max}$ of the curvature radius can be obtained as in following Equation 15 by using Equation 11.

$r_{max} = H \times L \times (n-1)/(L-P)/n$ [Equation 15]

In summary, it is necessary for the curvature radius of the lens to stay within the range of following Equation 16 obtained from Equation 13 and Equation 15 in order for the lens to exhibit the image distribution effect.

$H \times L \times (n-1)/(L+P)/n \leq r \leq H \times L \times (n-1)/(L-P)/n$ [Equation 16]

In the above, it has been described by referring to the twin-viewpoint stereoscopic image display device including the left-eye pixels and the right-eye pixels. However, the exemplary embodiment of the present invention is not limited only to that. For example, the present invention can also be applied to an N-viewpoint type display device in the same manner. In that case, the number of pixels contained within a range of the distance WP may be changed from "2m" to "N×m" in the definition of the distance WP described above.

Figure 42:
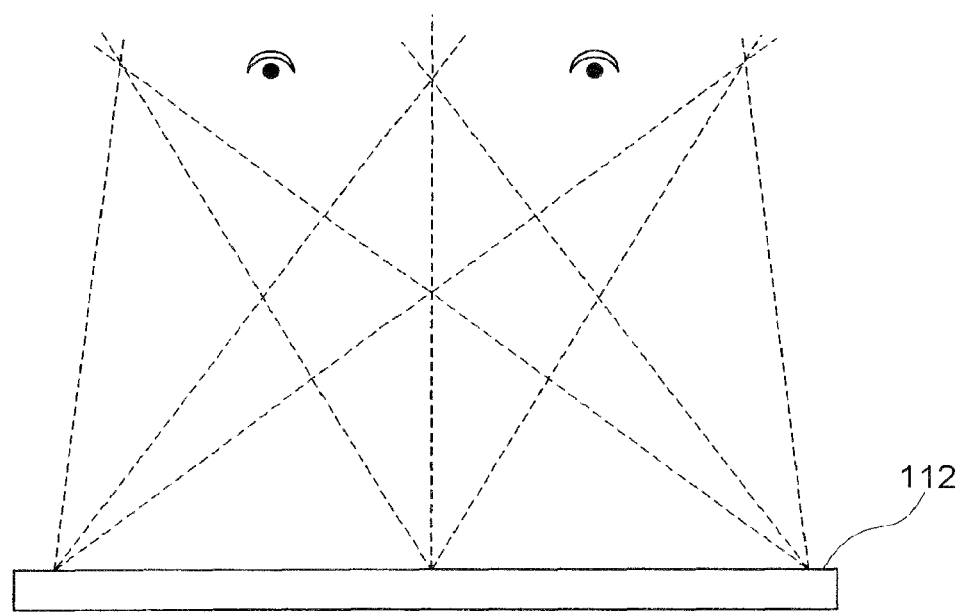
FIG. 42 is a conceptual diagram showing a converging method.

The above-described device is a type in which a plurality of numbers of viewpoints are set on the observing plane, and the light of the pixels from each viewpoint is emitted from all of the pixel units on the display face towards each of the set viewpoints. This type collects the light for the viewpoint that corresponds to a specific viewpoint, so that it is called a light converging type as well. The above-described two-viewpoint stereoscopic display device and multiple-viewpoint stereoscopic display device having more increased number of viewpoints are classified as the light converging type. FIG. 42 shows a conceptual diagram of the light converging type. It is a feature of the light converging type that the light rays that make incident on the eyes of the observer are regenerated and displayed. The exemplary embodiment of the present invention can be applied extremely effectively to such light converging type.

Figure 43:
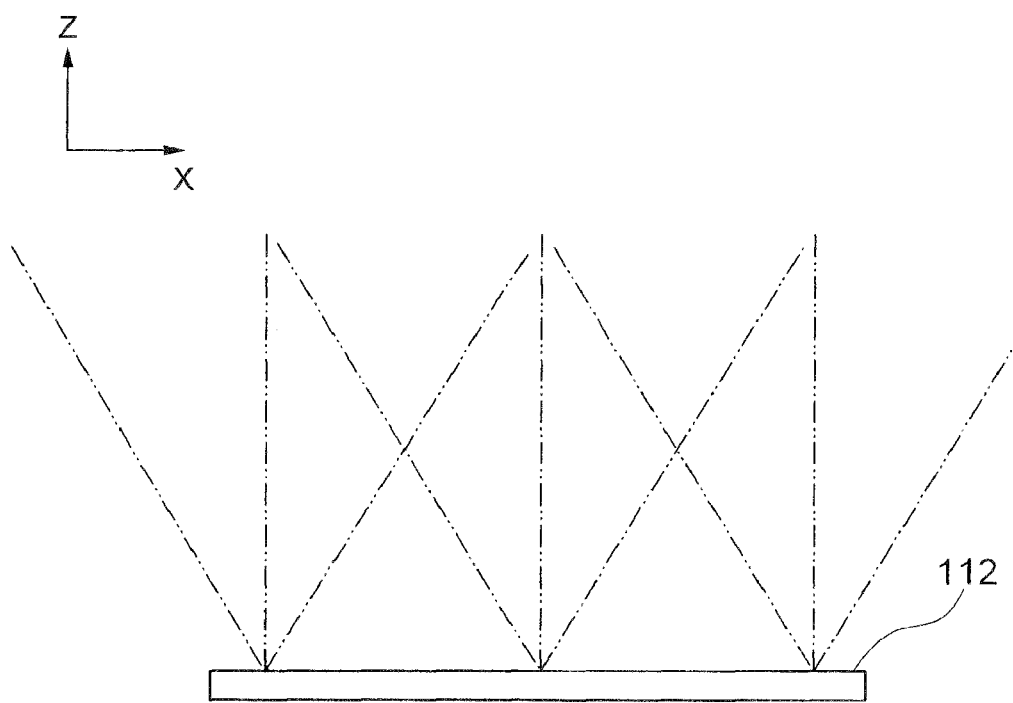
FIG. 43 is a conceptual diagram showing a spatial image method.

Further, as shown in FIG. 43, there have been proposed such types called a spatial image type, a spatial image reproducing type, a spatial image regenerating type, a spatial image forming type, and the like. Unlike the light converging type, there is no specific viewpoint set in the spatial image type. Further, it is different in respect that the light emitted by the object in the space is regenerated for display. That is, the observer positioned at a given place does not visually recognize the pixels for the same viewpoint on the entire display face. However, the observer visually recognizes a prescribed area formed by the pixels for the same viewpoint on the display face. Therefore, the exemplary embodiment of the present invention can also be applied effectively to such spatial image type.

Next, a fourteenth exemplary embodiment of the present invention will be described by referring to FIG. 44.

Figure 44:
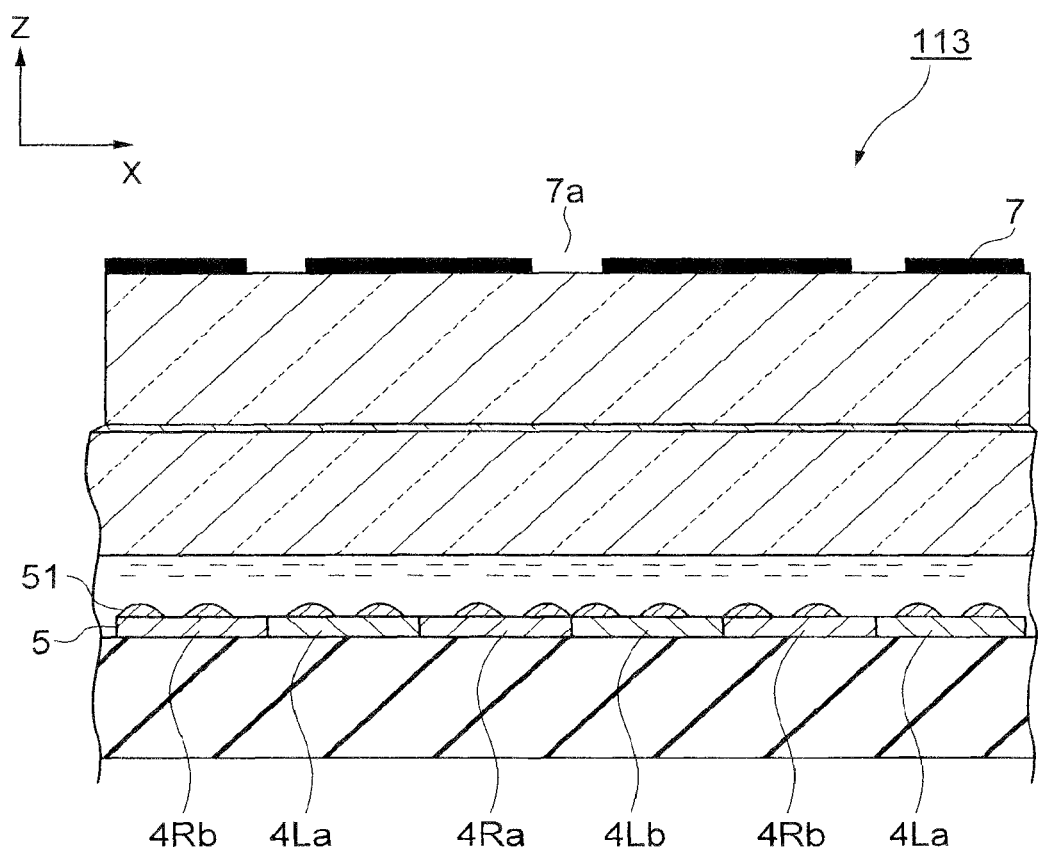
FIG. 44 is a sectional view showing a display panel according to a fourteenth exemplary embodiment of the present invention.

FIG. 44 is a sectional view showing a display panel according to the fourteenth exemplary embodiment of the present invention.

The fourteenth exemplary embodiment is different from the above-described thirteenth exemplary embodiment in respect that it uses a parallax barrier as the image distributing device instead of using the lenticular lens.

As shown in FIG. 44, a parallax barrier is a slit array in which a large number of slits 7a are arranged in the X-axis direction.

A display panel 113 of the fourteenth exemplary embodiment has the structures and functions such as those described above, so that the following effects can be achieved in addition to the effects substantially same as those described in (1)-(4).

(30) The parallax barrier can be manufactured easily by using photolithography, so that it is possible to reduce the cost.

Now, the conditions for the parallax barrier to work as the image dividing device will be described in detail. First, the parallax barrier method will be described by referring to FIG. 45.

The parallax barrier 7 is a barrier (light shielding plate) on which a large number of thin and long stripe type openings, i.e. slits 7a, are formed. In other words, the parallax barrier is an optical member on which a plurality of slits extending towards a second direction that is orthogonal to a first direction (to be a distributing direction) are formed to line along the first direction. The light emitted from a left-eye pixel 4L towards the parallax barrier 7 travels towards an area EL to form a light flux after transmitting through the slits 7a. Similarly, the light emitted from a right-eye pixel 4R towards the parallax barrier 7 travels towards an area ER to form a light flux after transmitting through the slits 7a. When the observer locates the left eye 552 within the area EL and the right eye 551 within the area ER, the observer can recognize a stereoscopic image.

Figure 45:
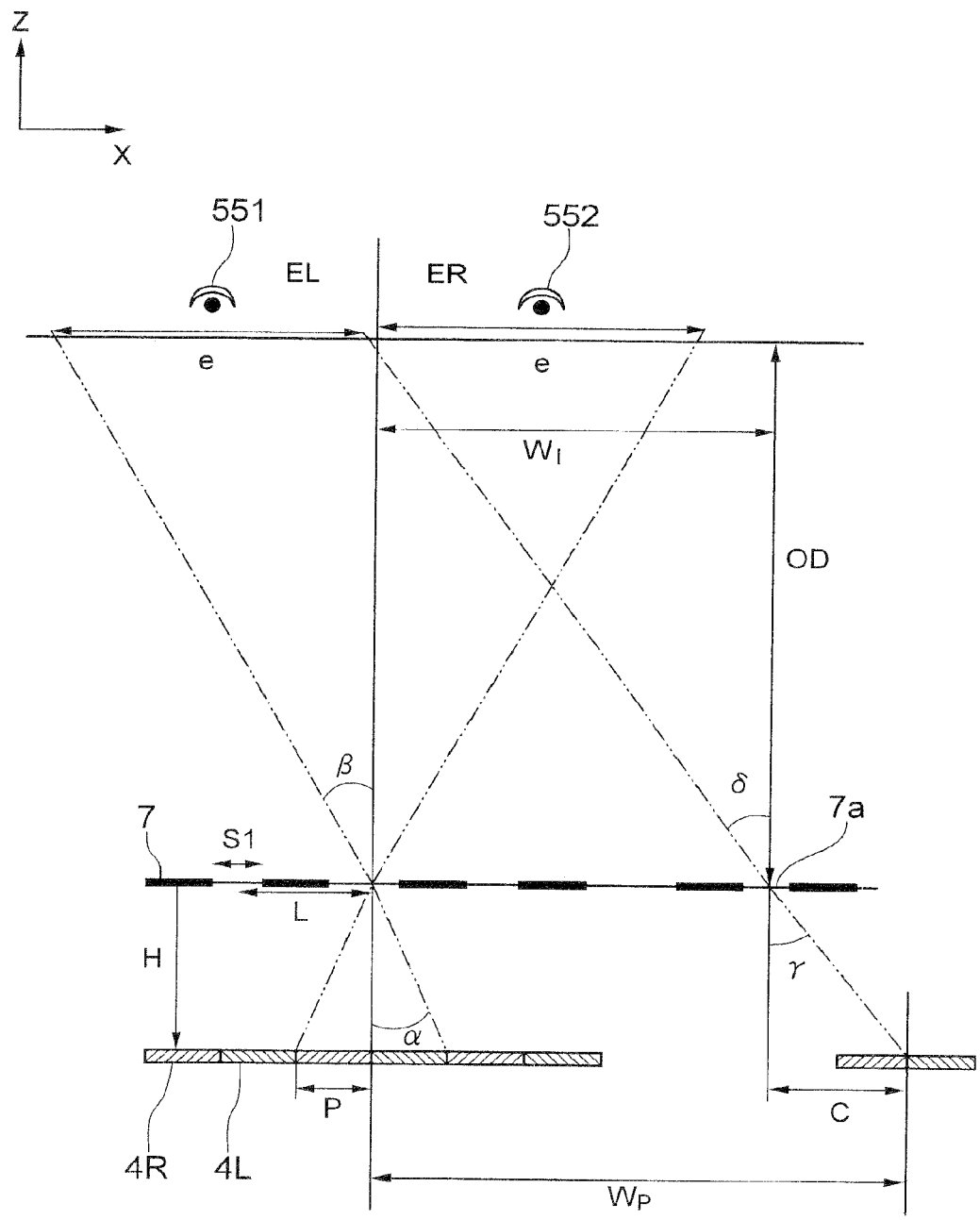
FIG. 45 is a sectional view showing an optical model when using a parallax barrier.

Next, described in detail are sizes of each part of a stereoscopic image display device that is provided with the parallax barrier having slit-type openings formed on the front face of the display panel. As shown in FIG. 45, the layout pitch of the slits 7a of the parallax barrier 7 is defined as "L", and the distance between the parallax barrier 7 and the pixel is defined as "H". Further, the distance between the parallax barrier 7 and the observer is defined as an optimum observing distance "OD". Furthermore, the distance from the center of the slit 7a positioned at the center of the parallax barrier 7 to the center of the slit 7a positioned at the edge of the parallax barrier 7 in the X-axis direction is defined as "WL. The parallax barrier 7 itself is a light shielding plate, so that the light making incident on the part other than the slits 7a is not transmitted. It is assumed that a substrate including a barrier layer is provided, and the refractive index of the substrate is defined as "n". If there is no supporting substrate, the refractive index n may be set as "1" that is the refractive index of air. With the conditions defined as above, the light emitted from the slits 7a is refracted according to Snell's law when emitted from the substrate that supports the barrier layer.

Thus, the incident angle and the exit angle of the light to/from the slits 7a positioned at the center of the parallax barrier 7 are defined as "α" and "β", respectively, while the incident angle and the exit angle of the light to/from the slit 7a positioned at the edge of the parallax barrier 7 in the X-axis direction are defined as "γ" and "δ", respectively. Furthermore, the opening width of the slit 7a is defined as S1. Since the layout pitch L of the slits 7a and the layout pitch P of the pixels are mutually related, one is determined in accordance with the other. Normally, the parallax barrier is designed according to the display panel in many cases, so that the layout pitch P of the pixels is treated as a constant. Further, the refractive index n is determined through selection of a material for the supporting substrate of the barrier layer. In the meantime, desired values are set for the observing distance OD between the parallax barrier and the observer and for the cycle e of the pixel enlarged projection image at the observing distance OD. By using these values, the distance H between the barrier and the pixels as well as the barrier pitch L are determined. Following Equations 17 to 22 apply based on Snell's law and geometrical relations. Further, following Equations 23 to 25 apply as well.

$$n \times \sin \alpha = \sin \beta \qquad \text{[Equation 17]}$$

$$OD \times \tan \beta = e \qquad \text{[Equation 18]}$$

$$H \times \tan \alpha = P \qquad \text{[Equation 19]}$$

$$n \times \sin \gamma = \sin \delta \qquad \text{[Equation 20]}$$

$$H \times \tan \gamma = C \qquad \text{[Equation 21]}$$

$$OD \times \tan \gamma = WL \qquad \text{[Equation 22]}$$

$$WP - WL = C \qquad \text{[Equation 23]}$$

$$WP = 2 \times m \times P \qquad \text{[Equation 24]}$$

$$WL = m \times L \qquad \text{[Equation 25]}$$

In the above, it has been described by referring to the twin-viewpoint stereoscopic image display device including the left-eye pixels and the right-eye pixels. However, the exemplary embodiment of the present invention is not limited only to that. For example, the present invention can also be applied to an N-viewpoint type display device in the same manner. In that case, the number of pixels contained within a range of the distance WP may be changed from "2m" to "N×m" in the definition of the distance WP described above.

The aforementioned parameters can be summarized as follows. That is, the layout pitch P of the pixels is a value determined based upon the display panel, and the observing distance OD and the cycle e of the pixel enlarged projection images are the values determined based upon the settings of the display device. The refractive index n is determined based upon the material of the supporting substrate or the like. The slit layout pitch L and the distance H between the parallax barrier and the pixels calculated from those values become the parameters for determining the position on the observing plane at which the light from each pixel is projected. The parameter for changing the image distribution effect is the opening width S1 of the slit. That is, when the distance H between the barrier and the pixel is fixed, images of the pixels on the right and left sides can be more clearly separated as the opening width S1 of the slits becomes smaller. It is the same principle as that of a pinhole camera. When the opening width S1 becomes wider, the images of the pixels on the right and left side become blurred and are not clearly separated.

Figure 46:
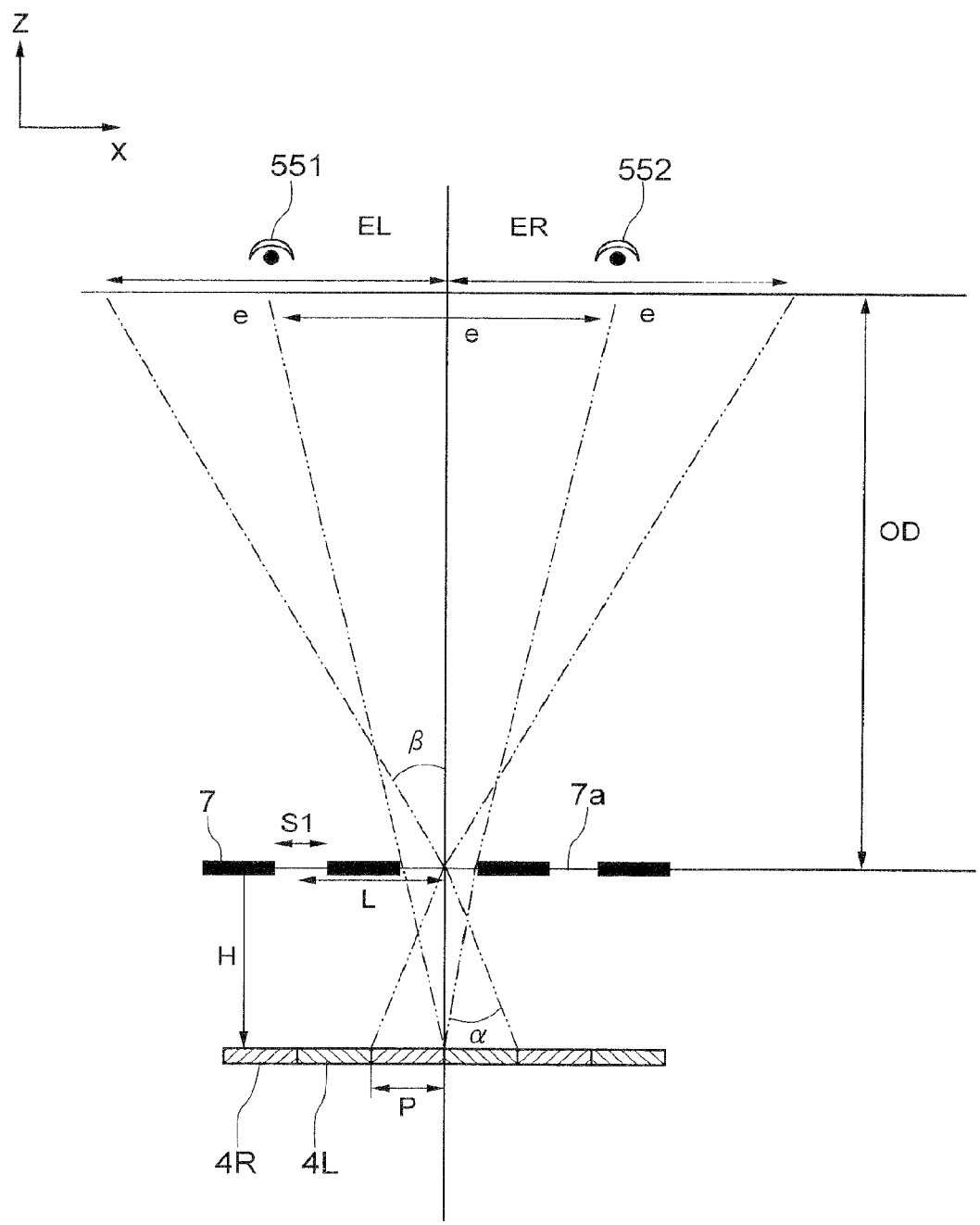
FIG. 46 is an illustration of an optical model when the opening width of slits is the maximum, for calculating an image separating condition of the parallax barrier.

The range of the slit width for enabling effective separation in the parallax barrier can be calculated more intuitively than the case of the lens type. As shown in FIG. 46, the light emitted from the boundary line between the left-eye pixel 4L and the right-eye pixel 4R is narrowed to the width S1 that is the opening width of the slit 7a when passing therethrough. Then, the light travels the distance OD and reaches the observing plane. For the separation effect to work, the width at the observing plane needs to be equal to the value of e or smaller. If the width is wider than e, it is larger than the projection cycle of the left and right pixels, so that the images are not separated. The opening width S1 of the slit 7a in that case is half the slit pitch L. That is, the range of the slit width with which the separation can become effective in the parallax barrier is equal to half the slit pitch or less.

Next, a fifteenth exemplary embodiment of the present invention will be described by referring to FIG. 47.

Figure 47:
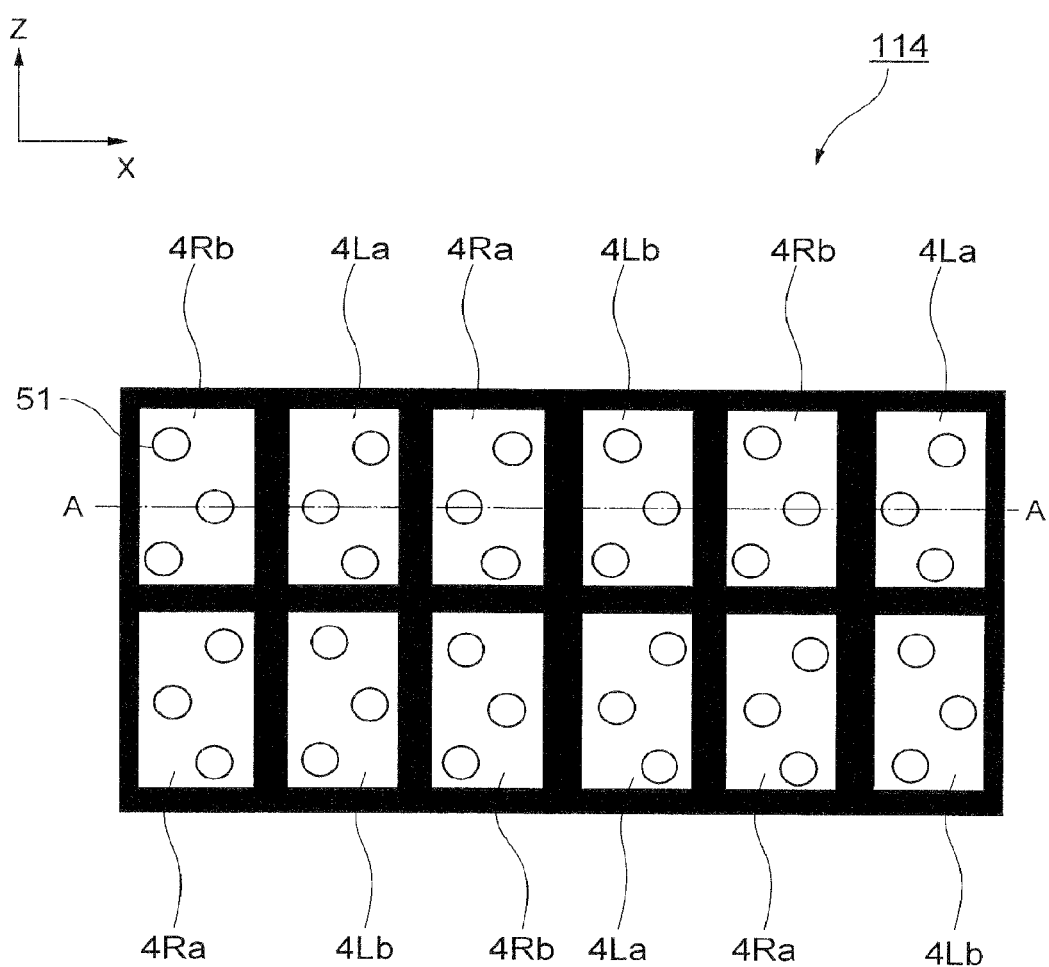
FIG. 47 is a top plan view showing pixels of a display panel according to a fifteenth exemplary embodiment of the present invention.

FIG. 47 is a top plan view showing pixels of a display panel according to the fifteenth exemplary embodiment of the present invention.

The fifteenth exemplary embodiment is different from the above-described thirteenth exemplary embodiment of the present invention in respect that not only the neighboring pixel units in the image distributing direction but also the neighboring pixel units in the direction orthogonal to the image distributing direction have different uneven structures.

That is, as shown in FIG. 47, in a display panel 114 according to the fifteenth exemplary embodiment, a pixel unit including a left-eye pixel 4Lb and a right-eye pixel 4Ra is arranged by being corresponded to a prescribed cylindrical lens 3a of a lenticular lens 3. Further, a pixel unit including a left-eye pixel 4La and a right-eye pixel 4Rb is arranged in the +X direction and the −X direction of the aforementioned pixel unit. Furthermore, the pixel unit including the left-eye pixel 4La and the right-eye pixel 4Rb is arranged in the +Y direction and the −Y direction as well. That is, the uneven structures of the pixels for different viewpoints are substantially in the same layout patterns in the pixel units neighboring not only in the X-axis direction but also in the Y-axis direction.

The display panel 114 of the fifteenth exemplary embodiment has the structures and functions such as those described above, so that the following effects can be achieved in addition to the effects substantially same as those described in (1)-(4).

(31) The layout patterns of the convex structures on the reflection plates are arranged to compensate with each other by using the neighboring pixel units in the X-axis direction and the Y-axis direction. With this, the compensation effect can be exhibited in a ckeckerwise pattern, which makes it possible to achieve a high image quality.

Further, this exemplary embodiment can be combined preferably with a fly eye lens or a two-dimensional pinhole array, which makes it possible to achieve a high image quality.

Next, a sixteenth exemplary embodiment of the present invention will be described by referring to FIG. 48.

Figure 48:
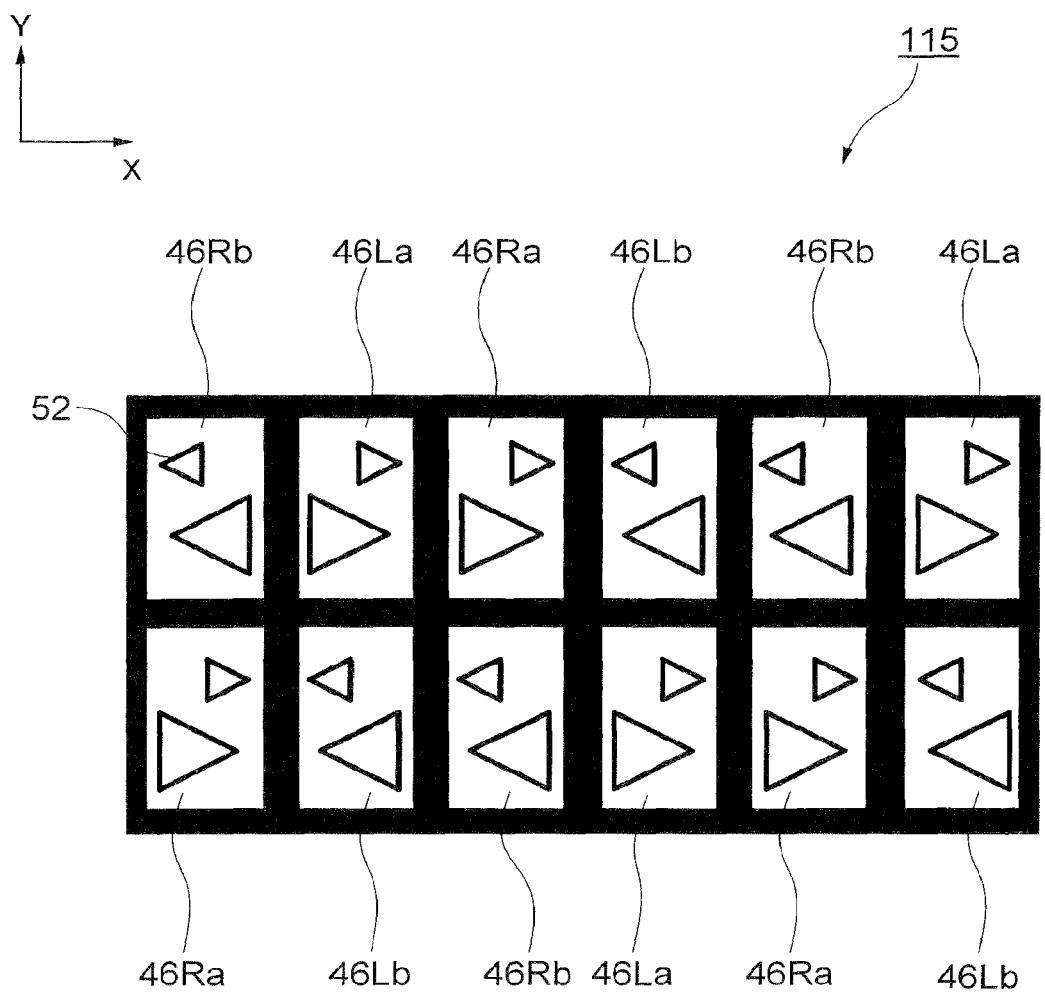
FIG. 48 is a top plan view showing pixels of a display panel according to a sixteenth exemplary embodiment of the present invention.

FIG. 48 is a top plan view showing pixels of a display panel according to the sixteenth exemplary embodiment of the present invention.

The sixteenth exemplary embodiment is different from the above-described thirteenth exemplary embodiment of the present invention regarding the uneven shapes of the reflection plate. The uneven shape in this exemplary embodiment is substantially a triangular shape, while it is an isolated convex shape in the above-described thirteenth exemplary embodiment.

That is, as shown FIG. 48, in a display panel 115 according to the sixteenth exemplary embodiment, each convex structure 52 on the reflection plates in left-eye pixels 46La, 46Lb and right-eye pixels 46Ra, 46Rb is basically a triangular shape.

The display panel 115 of the sixteenth exemplary embodiment has the structures and functions such as those described above, so that the following effects can be achieved in addition to the effects substantially the same as those described in (1)-(4).

(32) The triangular-shaped uneven structures can give distributions to the dispersions of the reflected light. That is, it can give anisotropy to the traveling directions of the reflected light. With this, the reflected light can be utilized more efficiently than the case of the uneven structures with isolated convex structures, and bright reflective display can be achieved.

In this exemplary embodiment, it has been described that the uneven structure is a triangular-shaped convex figure. However, the present invention is not limited only to that. For example, other than a substantially triangular shape, polygons such as a quadrilateral, a pentagon, and a hexagon, an oval, a U-letter shape, a V-letter shape, a rhombus, and flat figures of those may be used as the basic shape. These patterns can be arranged by being enlarged or reduced. The common point for those shapes is that they are anisotropic shapes whose major axis and minor axis are different, and those shapes may be in an isolated state or connected state. Further, only the side part of the triangular shape shown in FIG. 48 may be in a convex or concave figure.

Next, a seventeenth exemplary embodiment of the present invention will be described by referring to FIG. 49 and FIG. 50.

Figure 49:
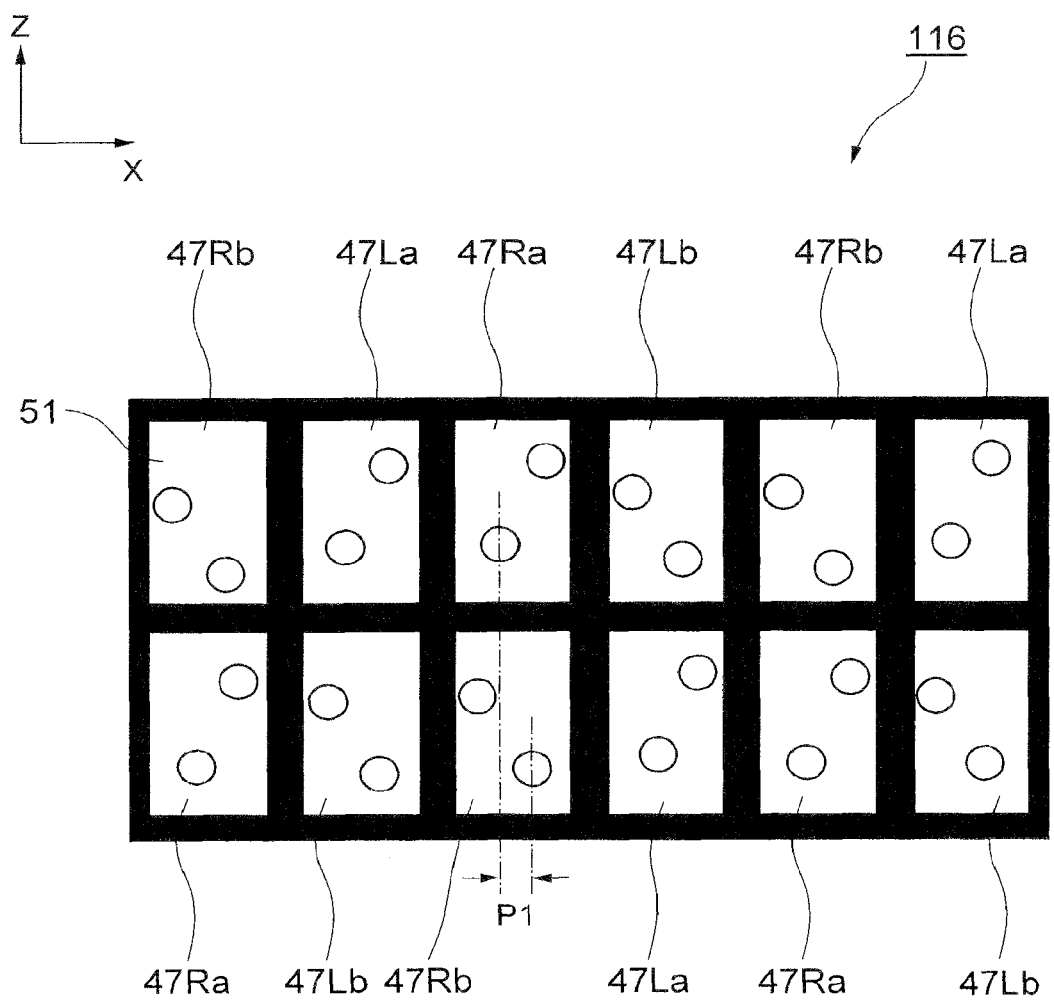
FIG. 49 is a top plan view showing pixels of a display panel according to a seventeenth exemplary embodiment of the present invention.
Figure 50:
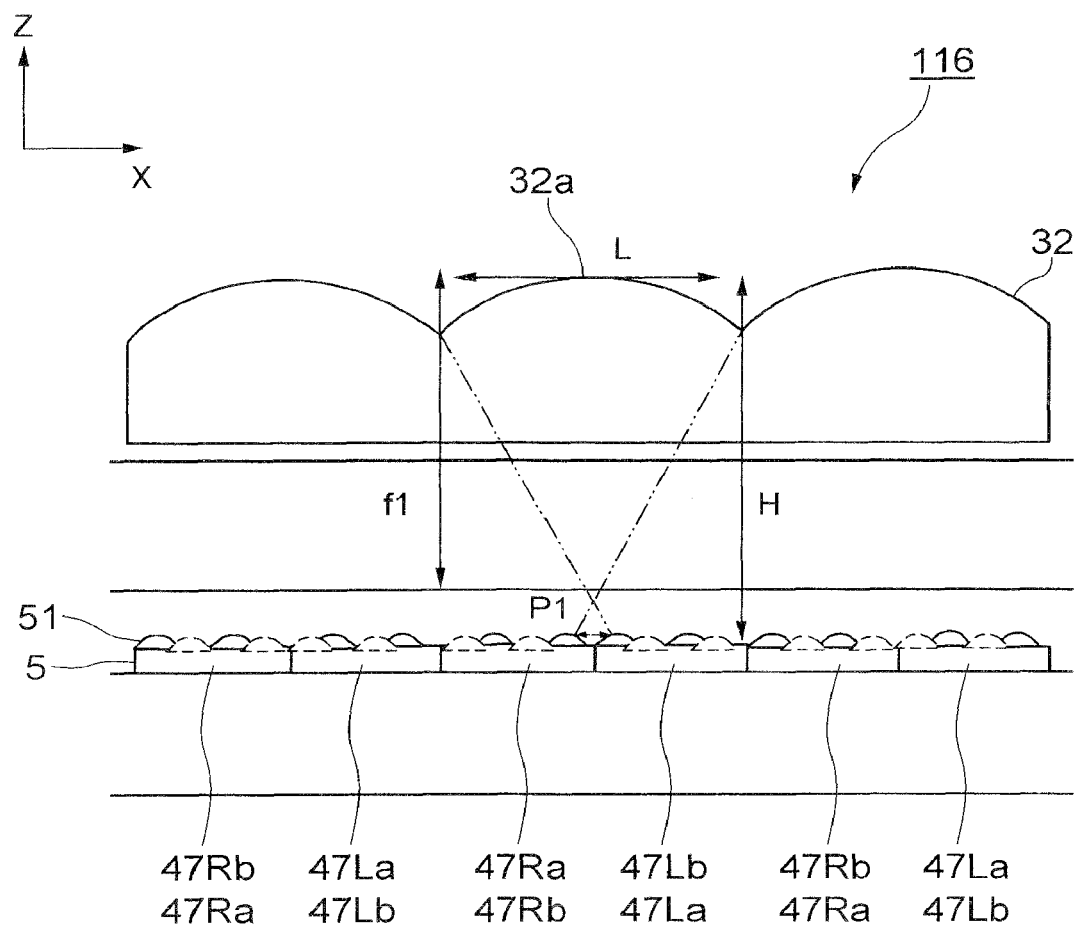
FIG. 50 is a sectional view showing the display panel of FIG. 49.

FIG. 49 is a top plan view showing pixels of a display panel according to the seventeenth exemplary embodiment of the present invention, and FIG. 50 is a sectional view showing the display panel.

The seventeenth exemplary embodiment is different from the above-described fifteenth exemplary embodiment in respect that the focal distance of the lens is different from the lens-pixel distance. That is, this exemplary embodiment is a form in which defocus of the lens is combined with the present invention.

As shown in FIG. 49 and FIG. 50, in a display panel 116 of the seventeenth exemplary embodiment, a lenticular lens 32 includes cylindrical lenses having focal distance f1. The focal distance f1 is set to be smaller than a lens-pixel distance H. Further, looking into the pixels that are neighboring to each other in the Y-axis direction, convex structures 51 on the reflection plate are arranged in such a manner that the relative positional coordinates in each pixel become different from each other. For example, considering a case of a right-eye pixel 47Ra and a right-eye pixel 47Rb, the convex structures 51 thereof are arranged to be shifted from each other by P1 in the X-axis direction. The other convex structures are also arranged to be shifted from each other at least by P1. In FIG. 50, the positional relation of the convex structures of two kinds of pixels is illustrated with a solid line and a broken line. In this case, a relation of similarity applies between a triangle having the lens pitch L as the base and the focal distance f1 as the height and a triangle having the shift amount P1 of the convex structures as the base and H−f as the height. From this, following Equation 26 can be obtained.

$$f1 = H \times L/(L+P1) \qquad \text{[Equation 26]}$$

This is the condition with which an effect can be obtained at least, when the focal distance of the lens is set smaller than the lens-pixel distance H, and layout of the pixels having different convex structures on the reflection plate is employed in combination. As the range for having the effective image distribution effect of the lens, the focal distance may be set to fall within the range of following Equation 27.

$$H \times L/(L+P) \leq f \leq H \times L/(L+P1) \qquad \text{[Equation 27]}$$

However, when the focal distance becomes too short, the separating effect is decreased as described above. Therefore, it is preferable to select a focal distance that is as small as possible within the range satisfying Equation 27.

The display panel 116 of the seventeenth exemplary embodiment has the structures and functions such as those described above, so that the following effects can be achieved in particular.

(33) This exemplary embodiment is capable of achieving a high image quality by setting the focal distance of the lens to be shorter than the lens-pixel distance in combination with the layout of the pixels having different convex shapes on the reflection plate. Particularly, it is a feature of this exemplary embodiment that the pixels having different convex shapes on the reflection plates are provided, and the focal distance of the lens is shortened in accordance with the difference between the positions of the convex shapes on those pixels. This makes it possible to achieve a high image quality without spoiling the separating effect of the lens compared to the conventional form, i.e. a case where the focal distance of the lens is shortened in accordance with the distance between the convex shapes in each pixel.

When the focal distance of the lens is set longer than the lens-pixel distance, it is possible to exhibit a blurring effect of the lens and maximize the separating performance through employing the focal distance f1 shown in following Equation 28.

$$f1 = H \times L/(L-P1) \qquad \text{[Equation 28]}$$

For the range within which the image distribution effect of the lens is effective, the focal distance may be set to fall within the range of following Equation 29.

$$H \times L/(L-P1) \leq f \leq H \times L/(L-P) \qquad \text{[Equation 29]}$$

Next, other exemplary embodiments of the invention will be described.

As an eighteenth exemplary embodiment of the invention, there may exist a pixel unit in which the layout pattern of the uneven structure on the reflection plate differs between the pixel for displaying the image for the first viewpoint and the pixel for displaying the image for the second viewpoint; and the layout pattern of the uneven structure of the pixel for displaying the image for the first viewpoint in a certain pixel unit may be substantially the same as the layout pattern of the uneven structure of the pixel for displaying the image for the second viewpoint in another pixel unit.

With this, the deterioration of the image quality caused due to combining the image distributing device and the uneven structures of the reflection plates can be compensated with each other between a plurality of pixel units. Therefore, the display quality can be improved.

Further, as a nineteenth exemplary embodiment of the invention, the layout patterns of the uneven structures on the reflection plates within the pixel unit may be set identical. With this, the reflected light from the right and left pixels can be made into a same condition when displaying a stereoscopic image in particular. As a result, a sense of discomfort felt by the user can be eased, thereby enabling a high image quality.

Furthermore, as a twentieth exemplary embodiment of the invention, the layout patterns of the uneven structures on the reflection plates may differ for the pixel units that are arranged towards the first direction of the image distributing device.

In this form, the pixel units arranged in the first direction of the image distributing device include the pixels with different layout patterns of the uneven structures on the reflection plates. Therefore, the pixels that are different from each other can be used to compensate the deterioration of the image quality with each other, which may be caused due to combining the image distributing device and the uneven structures of the reflection plates. As a result, a high image quality can be achieved, thereby providing an excellent display quality in reflective display.

Moreover, as a twenty-first exemplary embodiment of the invention, the layout patterns of the uneven structures on the reflection plates may differ for the pixel units that are arranged towards a second direction that is orthogonal to the first direction of the image distributing device on a display face of the display panel.

With this, the deterioration of the image quality caused due to combining the image distributing device and the uneven structures of the reflection plates can be compensated and controlled between the pixel units that are arranged in the second direction. As a result, a high image quality can be achieved.

Further, as a twenty-second exemplary embodiment of the invention, the layout patterns of the uneven structures on the reflection plates may differ for the pixel units that are arranged towards the first direction of the image distributing device, and the layout patterns of the uneven structures on the reflection plates may differ for the pixel units that are arranged towards the second direction that is orthogonal to the first direction of the image distributing device on the display face of the display panel.

With this, a plurality of kinds of layout patterns can be arranged into a checkerwise pattern, which makes it possible to achieve two-dimensional compensation effect. Therefore, the display quality can be improved further.

Furthermore, as a twenty-third exemplary embodiment of the invention, the display panel may include color pixel groups of a plurality of colors for achieving color display, wherein: the color pixels of same color may be arranged linearly; and an extending direction of this linear layout may be the second direction that is orthogonal to the first direction of the image distributing device on the display face of the display panel.

With this, the present invention can be preferably applied to the case particularly where the layout patterns of the uneven structures on the reflection plates differ for the pixel units that are arranged in the second direction that is orthogonal to the first direction of the image distributing device on the display face of the display panel. Therefore, the color layout and the pixel units can be arranged separately, so that an adverse effect to the color display can be suppressed.

Moreover, as a twenty-fourth exemplary embodiment of the invention, the display panel may include color pixel groups of a plurality of colors for achieving color display, wherein: the color pixels of same color may be arranged linearly; and an extending direction of this linear layout may be the second direction that is orthogonal to the first direction of the image distributing device on the display face of the display panel.

With this, the present invention can be preferably applied to the case particularly where the layout patterns of the uneven structures on the reflection plates differ for the pixel units that are arranged in the first direction of the image distributing device, and differ for the pixel units that are arranged in the second direction that is orthogonal to the first direction of the image distributing device on the display face of the display panel. Therefore, it becomes possible to achieve a high-quality color display having two-dimensional compensation effect.

Moreover, as a twenty-fifth exemplary embodiment of the invention, the display panel may include color pixel groups of a plurality of colors for achieving color display, wherein: the color pixels of same color may be arranged linearly; and an extending direction of this linear layout may be the first direction of the image distributing device.

With this, the present invention can be preferably applied to the case particularly where the layout patterns of the uneven structures on the reflection plates differ for the pixel units that are arranged in the first direction of the image distributing device. Therefore, the color layout and the pixel units can be arranged separately, so that an adverse effect to the color display can be suppressed.

In addition, the proportion of the area used for display can be increased in each pixel, which makes it possible to provide a bright display. Furthermore, manufacture of the image distributing device becomes easy, and a margin of error for aligning it with the pixels can be secured sufficiently large. Therefore, the yield of the display panels can be improved and the cost therefore can be reduced.

Further, as a twenty-sixth exemplary embodiment of the invention, the display panel may include color pixel groups of a plurality of colors for achieving color display, wherein: the color pixels of same color may be arranged linearly; an extending direction of this linear layout may be the first direction of the image distributing device; and the layout patterns of the uneven structures on the reflection plates may be the same within the color pixel group.

With this, the present invention can be preferably applied to the case particularly where the layout patterns of the uneven structures on the reflection plates differ for the pixel units that are arranged in the second direction that is orthogonal to the first direction of the image distributing device on the display face of the display panel. Therefore, it becomes possible to achieve an excellent display having no influence imposed upon the color display.

Furthermore, as a twenty-seventh exemplary embodiment of the invention, the display panel may include color pixel groups of a plurality of colors for achieving color display, wherein: the color pixels of same color may be arranged linearly; and an extending direction of this linear layout may be the first direction of the image distributing device.

With this, the present invention can be preferably applied to the case particularly where the layout patterns of the uneven structures on the reflection plates differ for the pixel units that are arranged in the first direction of the image distributing device, and differ for the pixel units that are arranged in the second direction that is orthogonal to the first direction of the image distributing device on the display face of the display panel. Therefore, it is possible to achieve a display panel capable of achieving a bright and excellent image quality.

Further, as a twenty-eighth exemplary embodiment of the invention, the neighboring pixels of the display panel may include the pixels whose layout patterns of the uneven structures on the reflection plates are in a linearly symmetrical relation with respect to a segment that extends towards the second direction that is orthogonal to the first direction of the image distributing direction.

This makes it possible not only to compensate the deterioration of the image quality caused due to combining the image distributing device and the uneven structures of the reflection plates but also to design the layout patterns of the uneven structures easily. As a result, the cost can be reduced.

Furthermore, as a twenty-ninth exemplary embodiment of the invention, the neighboring pixels of the display panel may include the pixels whose layout patterns of the uneven structures on the reflection plates are in a rotationally symmetrical relation.

This makes it possible not only to compensate the deterioration of the image quality caused due to combining the image distributing device and the uneven structures of the reflection plates but also to design the layout patterns of the uneven structures easily. As a result, the cost can be reduced.

Furthermore, as a thirtieth exemplary embodiment of the invention, each of the pixels on the display panel may have a parallelogram shape, and a boundary line between the pixels neighboring to each other in the first direction of the image distributing device may be tilted from the second direction that is orthogonal to the first direction.

This makes it possible to decrease the influence of non-display areas exiting between the neighboring pixels, so that the visibility can be improved.

Further, it becomes possible to design the length of the display area (when the pixel is cut along a segment extending towards the second direction that is orthogonal to the first direction) to be constant at an arbitrary position in the first direction. In that case, the influence of the non-display areas can be eliminated completely regardless of the observing positions, so that a high-quality display can be achieved.

Furthermore, as a thirty-first exemplary embodiment of the invention, a tilted direction of the boundary line between the pixels may be opposite for the pixels neighboring to each other in the second direction that is orthogonal to the first direction of the image distributing device.

With this, the pixels that are neighboring to each other in the second direction that is orthogonal to the first direction can be arranged in parallel to the second direction that is orthogonal to the first direction. Therefore, a sense of discomfort felt by the user can be eased.

Moreover, as a thirty-second exemplary embodiment of the invention, each of the pixels on the display panel may have a trapezoid shape; a boundary line between the pixels neighboring to each other in the first direction of the image distributing device may be tilted from the second direction that is orthogonal to the first direction; and the neighboring pixels may be arranged to be rotationally symmetrical.

This makes it possible to provide a bright display.

Further, as a thirty-third exemplary embodiment of the invention, the image distributing device may be a lenticular lens in which cylindrical lenses are formed to be lined in the image distributing direction of the image distributing device.

With this, the light can be utilized effectively, thereby making it possible to provide a bright display.

Furthermore, as a thirty-fourth exemplary embodiment of the invention, the image distributing device may be a parallax barrier in which slits are formed to be lined in the image distributing direction of the image distributing device.

Since the parallax barrier can be easily fabricated by using photolithography, the cost can be reduced.

Moreover, as a thirty-fifth exemplary embodiment of the invention, the image distributing device may be a fly eye lens in which lenses are formed to be lined two-dimensionally.

Since the fly eye lens having a two-dimensional image distribution effect is used, the user can visually recognize different images by changing the viewing angle two-dimensionally, and the display quality can be upgraded. In a case of displaying a stereoscopic image in particular, it is possible to display images having parallax in the vertical direction as well. Therefore, a more effective display can be achieved by changing the angles to observe the display panel.

Further, it is possible to recognize a stereoscopic image even when the screen is rotationally placed. Thus, the present invention can be applied preferably to a portable terminal such as a portable telephone in particular.

Furthermore, as a thirty-sixth exemplary embodiment of the invention, the image distributing device may be a parallax barrier in which openings with a limited width are formed to be lined two-dimensionally.

This makes it possible to fabricate, at a low cost, a display panel capable of displaying images that are different two-dimensionally.

Moreover, as a thirty-seventh exemplary embodiment of the invention, the display panel may be a transflective display panel.

In the transflective display panel, it is necessary to provide transmissive display area. Therefore, the reflective display area becomes smaller, and the layout patterns of the uneven structures on the reflection plate are limited. However, the present invention can achieve a high image quality by using compensation between a pixel and another pixel. Thus, the present invention can be preferably applied to a display panel having a small area for the reflection plate, and can exhibit a large effect.

Further, as a thirty-eighth exemplary embodiment of the invention, the display panel may be a slight reflective display panel in which a reflective display area in the pixel is formed smaller than a transmissive display area.

Furthermore, as a thirty-ninth exemplary embodiment of the invention, the display panel may be a liquid crystal display panel.

Moreover, as a fortieth exemplary embodiment of the invention, the display panel may be a liquid crystal display panel of a lateral electric field mode or of a multi-domain vertical alignment mode.

The display panel according to the forty-first exemplary embodiment of the invention may be mounted to a display device.

The display device according to the forty-second exemplary embodiment of the invention may be mounted to a display terminal.

The display device according to the forty-third exemplary embodiment of the invention may be mounted to terminal devices such as portable telephones, personal information terminals, game machines, digital cameras, video cameras, video players, notebook personal computers, cash dispensers, and vending machines.

Each of the above-described exemplary embodiments may be executed by itself or may be executed in combinations as appropriate.

Additionally, the display panel may include color pixel groups of a plurality of colors for achieving color display. In this case, the color pixels of same color are arranged linearly.

In addition, an extending direction of this linear layout is the second direction that is orthogonal to the first direction of the image distributing device on the display face of the display panel.

Moreover, the image distributing device may be a parallax barrier in which openings with a limited width are formed to be lined two-dimensionally.

Further, the display panel may be a slight reflective display panel in which a reflective display area in the pixel is formed smaller than a transmissive display area.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A display panel comprising:
a plurality of pixel units arranged in matrix, each containing at least a pixel for displaying an image for a first viewpoint and a pixel for displaying an image for a second viewpoint; and an image distributing device for distributing light emitted from each of the pixels towards different directions from each other along an arranging direction (a first direction) of the pixel for displaying the image for the first viewpoint and the pixel for displaying the image for the second viewpoint within the pixel unit, wherein
a reflection plate including an uneven structure is formed in each of the pixels, and there exists a pixel unit in which a layout pattern of the uneven structure on the reflection plate differs between the pixel for displaying the image for the first viewpoint and the pixel for displaying the image for the second viewpoint,
wherein the layout patterns of the uneven structure of the pixel for displaying the image for the first viewpoint in one of the pixel units is substantially same as the layout pattern of the uneven structure of the pixel for the displaying the image for the second viewpoint in another one of the pixel units.

2. The display panel as claimed in claim 1, wherein the layout patterns of the uneven structures on the reflection plates differ for the pixel units that are arranged towards the first direction of the image distributing device.

3. The display panel as claimed in claim 1, wherein the layout patterns of the uneven structures on the reflection plates differ for the pixel units that are arranged towards a second direction that is orthogonal to the first direction of the image distributing device on a display face of the display panel.

4. The display panel as claimed in claim 2, wherein the layout patterns of the uneven structures of the reflection plates differ for the pixel units that are arranged towards the first direction of the image distributing device, and the layout patterns of the uneven structures of the reflection plates differ for the pixel units that are arranged towards a second direction that is orthogonal to the first direction of the image distributing device on a display face of the display panel.

5. The display panel as claimed in claim 3, further comprising color pixel groups of a plurality of colors for achieving color display, wherein:
the color pixels of same color are arranged linearly; and
an extending direction of this linear layout is the second direction that is orthogonal to the first direction of the image distributing device on the display face of the display panel.

6. The display panel as claimed in claim 2, further comprising color pixel groups of a plurality of colors for achieving color display, wherein:
the color pixels of same color are arranged linearly; and
an extending direction of this linear layout is the first direction of the image distributing device.

7. The display panel as claimed in claim 4, further comprising color pixel groups of a plurality of colors for achieving color display, wherein:
the color pixels of same color are arranged linearly; and
an extending direction of this linear layout is the first direction of the image distributing device.

8. The display panel as claimed in claim 1, wherein each of the pixels on the display panel has a parallelogram shape, and a boundary line between the pixels neighboring to each other in the first direction of the image distributing device is tilted from the second direction that is orthogonal to the first direction.

9. The display panel as claimed in claim 8, wherein a tilted direction of the boundary line between the pixels is opposite for the pixels neighboring to each other in the second direction that is orthogonal to the first direction of the image distributing device.

10. The display panel as claimed in claim 1, wherein the image distribution device is a lenticular lens in which cylindrical lenses are formed to be lined in the first direction of the image distributing device.

11. The display panel as claimed in claim 1, wherein the image distribution device is a parallax barrier in which slits are formed to be lined in the first direction of the image distributing device.

12. The display panel as claimed in claim 1, wherein the image distribution device is a fly eye lens in which lenses are formed to be lined two-dimensionally.

13. The display panel as claimed in claim 1, wherein the display panel is a transflective display panel.

14. The display panel as claimed in claim 1, wherein the display panel is a liquid crystal display panel.

15. A display device comprising the display panel claimed in claim 1.

16. A terminal device comprising the display device claimed in claim 15.

17. A display panel comprising:
a plurality of pixel units arranged in matrix, each containing at least a pixel for displaying an image for a first viewpoint and a pixel for displaying an image for a second viewpoint; and an image distributing device for distributing light emitted from each of the pixels towards different directions from each other along an arranging direction (a first direction) of the pixel for displaying the image for the first viewpoint and the pixel for displaying the image for the second viewpoint within the pixel unit, wherein
a reflection plate including an uneven structure is formed in each of the pixels, and there exists a pixel unit in which a layout pattern of the uneven structure on the reflection plate differs between the pixel for displaying the image for the first viewpoint and the pixel for displaying the image for the second viewpoint,
wherein the neighboring pixels of the display panel include the pixels whose layout patterns of the uneven structures of the reflecting plates are in a linearly symmetrical relation with respect to a segment that extends towards the second direction that is orthogonal to the first direction of the image distributing device.

18. A display device comprising the display panel claimed in claim 17.

19. A display panel comprising:
a plurality of pixel units arranged in matrix, each containing at least a pixel for displaying an image for a first viewpoint and a pixel for displaying an image for a second viewpoint; and an image distributing device for distributing light emitted from each of the pixels towards different directions from each other along an arranging direction (a first direction) of the pixel for displaying the image for the first viewpoint and the pixel for displaying the image for the second viewpoint within the pixel unit, wherein
a reflection plate including an uneven structure is formed in each of the pixels, and there exists a pixel unit in which a layout pattern of the uneven structure on the reflection plate differs between the pixel for displaying the image for the first viewpoint and the pixel for displaying the image for the second viewpoint,
wherein the neighboring pixels of the display panel include the pixels whose layout patterns of the uneven structures of the reflecting plates are in a rotationally symmetrical relation.

20. A display device comprising the display panel claimed in claim 19.

21. A display panel comprising:
a plurality of pixel units arranged in matrix, each containing at least a pixel for displaying an image for a first viewpoint and a pixel for displaying an image for a second viewpoint; and an image distributing device for distributing light emitted from each of the pixels towards different directions from each other along an arranging direction (a first direction) of the pixel for displaying the image for the first viewpoint and the pixel for displaying the image for the second viewpoint within the pixel unit, wherein
a reflection plate including an uneven structure is formed in each of the pixels, and there exists a pixel unit in which a layout pattern of the uneven structure on the reflection plate differs between the pixel for displaying the image for the first viewpoint and the pixel for displaying the image for the second viewpoint,
wherein:
each of the pixels on the display panel has a trapezoid shape;
a boundary line between the pixels neighboring to each other in the first direction of the image distributing device is tilted from the second direction that is orthogonal to the first direction; and
the neighboring pixels are arranged to be rotationally symmetrical.

22. A display device comprising the display panel claimed in claim 21.

* * * * *